US008005888B2

(12) United States Patent
Lamport

(10) Patent No.: US 8,005,888 B2
(45) Date of Patent: Aug. 23, 2011

(54) CONFLICT FAST CONSENSUS

(75) Inventor: Leslie B. Lamport, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1561 days.

(21) Appl. No.: 10/750,601

(22) Filed: Dec. 30, 2003

(65) Prior Publication Data

US 2005/0149609 A1    Jul. 7, 2005

(51) Int. Cl.
G06F 15/16 (2006.01)
(52) U.S. Cl. ...................................... 709/201
(58) Field of Classification Search .......... 709/201–207; 714/100, 2, 11, 21, 31
See application file for complete search history.

(56) References Cited

U.S. PATENT DOCUMENTS

| | | | |
|---|---|---|---|
| 5,261,085 A * | 11/1993 | Lamport | 714/4 |
| 6,449,641 B1 * | 9/2002 | Moiin et al. | 709/220 |
| 6,463,532 B1 * | 10/2002 | Reuter et al. | 709/224 |
| 6,532,494 B1 * | 3/2003 | Frank et al. | 709/224 |
| 6,671,821 B1 | 12/2003 | Castro et al. | |
| 7,191,357 B2 * | 3/2007 | Holland et al. | 714/5 |
| 2002/0112198 A1 * | 8/2002 | Lim et al. | 714/7 |
| 2003/0023680 A1 * | 1/2003 | Shirriff | 709/204 |
| 2003/0227392 A1 * | 12/2003 | Ebert et al. | 340/825.49 |
| 2004/0254984 A1 * | 12/2004 | Dinker | 709/205 |
| 2005/0132154 A1 * | 6/2005 | Rao et al. | 711/162 |

OTHER PUBLICATIONS

Guerraoui, Rachid et al.; *Reducing the Cost for Non-Blocking in Atomic Commitment*; Département d'Informatique, Ecole Polytechnique Fedérale de Lausanne, pp. 1-11, May 1996.

Hayashibara, Noahiro et al.; *Performance Comparison Between the Paxos and Chandra-Toueg Consensus Algorithms*; Département d'Informatique, Ecole Polytechnique Fedérale de Lausanne; Technical Report IC-2002-61, pp. 1-11, Aug. 2002.
Awerbuch, Baruch et al.; *Maintaining Database Consistency in Peer to Peer Networks*; Department of Computer Science, John Hopkins University; Technical Report CNDS-2002-1, pp. 1-14, Feb. $6^{th}$, 2002.
Birrell, Andrew D. et al.; *The Echo Distributed File System*; Digital Equipment Corp. Systems Research Center; Technical Report 111, pp. 1-22, Sep. 10, 1993.
Liskov, Barbara et al.; *Replication in the Harp File System*; Proceedings of the $13^{th}$ Symposium on Operating System Principles, 13 pp., Oct. 1991.
Hisgen, Andy et al.; *New-Value Logging in the Echo Replicated File System*; Digital Equipment Corp. Systems Research Center, Research Report 104, pp. 1-39, Jun. 1993.

(Continued)

*Primary Examiner* — Jeffrey Pwu
*Assistant Examiner* — Scott M Sciacca
(74) *Attorney, Agent, or Firm* — Woodcock Washburn LLP

(57) ABSTRACT

A conflict tolerant message delay reducing consensus algorithm is presented for operating a distributed computing system. The devices of the distributed computing system can directly receive client requests, and can execute the requests and respond directly to the clients, saving message delays. If there is a conflict, the ultimately selected request can be the request submitted by the client with the highest client identifier. A device can change its vote, and execute a different request, if it is made by a client having a more dominant client identifier. All but one of the clients can also be a device implementing the system. A device that has executed a requested function may no longer submit a request in the same step. Consequently, a request is executed by the system when all devices have executed the request. If one or more devices fails, any fault tolerant consensus algorithm can be used.

33 Claims, 36 Drawing Sheets

OTHER PUBLICATIONS

Long, Darrell D.E. et al.; *Voting with Regenerable Volatile Witnesses*; University of California Computer and Information Sciences; Technical Report, pp. 1-20, Apr. 1990.
Swart, Garret et al.; *Availability in the Echo File System*; Digital Equipment Corp. Systems Research Center, Research Report 112, pp. 1-43, Sep. 1993.
Adya, A., et al.; FARSITE: Federated, Available, and Reliable Storage for an Incompletely Trusted Environment.; *In Proc. 5th OSDI*, Boston, MA, pp. 1-14, Dec. 2002.
Castro, M., *Practical Byzantine Fault Tolerance*; Ph.D. Thesis Technical Report MIT-LCS-TR-817, MIT, Jan. 2001.
Chockler, G. V., et al., Group Communication Specifications: A Comprehensive Study, *ACM Computing Surveys*, pp. 33(4):427-469, Dec. 2001.
Deprisco, R., et al., Revisiting the Paxos Algorithm; *In Proc. 11th Int'l. Workshop on Distributed Algorithms*, pp. 111-125, Sep. 1997.
Lamport, L., Using Time Instead of Timeout for Fault Tolerance in Distributed Systems; *ACM Transaction on Programming Languages and Systems (TOPLAS)*, pp. 6(202):264-280, Apr. 1984.
Lamport, L., et al., Cheap Paxos; *In Proc. International Conference on Dependable Systems and Networks (DSN)*, Florence, Italy, 2004.
Lynch, N., et al., RAMBO: A Reconfigurable Atomic Memory Service for Dynamic Networks; *In Proc. 16th International Symposium on Distributed Computing*, Toulouse, France, pp. 173-190, Oct. 2002.
Narasimhan, P., et al., *Replica Consistency of CORBA Objects in Partitionable Distributed Systems*, 1997.
Oki, B.M., *Viewstamped Replication for Highly Available Distributed Systems*; Ph.D. Thesis Technical Report MIT/LCS/TR-423, MIT, Aug. 1988.
Oki, B.M., et al., Viewstamped Replication: A New Primary Copy Method to Support Highly-Available Distributed Systems; *In Proc. 7th Symposium on Principles of Distributed Computing*, Aug. 1988, pp. 8-17.
Rodrigues, R., et al., BASE: Using Abstractions to Improve Fault Tolerance; *In Proc. 18th ACM Symposium on Operating System Principles*, Bantt, Canada, pp. 15-28, Oct. 2001.
Schneider, F.B., Synchronization in Distributed Programs; ACM Transactions on Programming Languages and Systems (TOPLAS; pp. 4(2):125-148.), Apr. 1982.
Yu, H., et al., Consistent and Automatic Replica Regeneration; *In Proc. 1st NSDI*, San Francisco, CA, pp. 323-236, 2004.
Pedone, F., et al., Handling Message Semantics with Generic Broadcast Protocols, *Distributed Computing* 15, pp. 97-107, 2002.
Cukier, M., et al., AQuA: An Adaptive Architecture that Provides Dependable Distributed Objects, *In Proc. 17th Symposium on Reliable Distributed Systems*, pp. 245-253, West Lafayette, IN, Oct. 1998.
Cukier, M., et al., AQuA: An Adaptive Architecture that Provides Dependable Distributed Objects, *IEEE Transactions on Computers*, vol. 52, No. 1, pp. 31-50, Jan. 2003.
Charron-Bost, Bernadette, et al., Uniform Consensus is Harder than Consensus (extended abstract), *Technical Report DSC/2000/028*, Switzerland, May 2000.
DePrisco, Robert, et al., Revisiting the PAXOS Algorithm, *Theroretical Computer Science*, 243:35-91, 2000.
Fischer, Michael J., et al., Impossibility of Distributed Consensus with One Faulty Process, *Journal of the ACM*, 32(2):374-382, Apr. 1985.
Lamport, Leslie, Lower Bounds for Asynchronous Consensus, in *Future Distributed Computing, vol. 2584 of Lecture Notes in Computer Science*, pp. 22-23, Spring, 2003.
Mazurkiewicz, A., *Semantics of Concurrent Sytems; A Modular Fixed-Point Trace Approach*; Institute of Computer Science, Poland, pp. 353-375, (1984).
Lamport, Leslie, "Time, Clocks, and the Ordering of Events in a Distributed System", *Communication of the ACM*, 21(7):558-565, Jul. 1978.
Lamport, Leslie, "The Part-Time Parliament", *ACM Transactions on Computer Systems* 16, 2 (May 1998), pp. 133-169. Also appeared as SRC Research Report 49.
Lamport, Leslie, "Paxos Made Simple", *ACM SIGACT* News (Distributed Computing Column), 32,4 (Whole No. 121, Dec. 2001) pp. 18-25.
Lampson, Butler W., "The ABCD's of Paxos", Presented at *Principles of Distributed Computing*, 2001, as one of the papers celebrating Leslie Lamport's 60th Birthday, retrieved from http://research.microsoft.com/lampson/65-ABCDPaxos/Acrobat.pdf.
Castro, Miguel, et al., "Practical Byzantine Fault Tolerance", appears in *Proceedings of the Third-Symposium on Operating Design and Implementation*, New Orleans, USA, Feb. 1999, pp. 1-14.
Castro, Miguel, et al., "Proactive Recovery in a Byzantine-Fault-Tolerant System", appears in the *Proceedings of the Fourth Symposium on Operating Systems Design and Implementation* (OSDI '00), San Diego, USA, Oct. 2000, pp. 1-15.
Huang, Yennun, et al., "Software Rejuvenation: Analysis, Module and Applications", *Proc. International Symposium on Fault Tolerant Computing*, pp. 381-390, (1995).
Bracha, Gabriel, "An asynchronous $\lfloor(\eta-1)/3\rfloor$-resilient consensus protocol" this paper was presented at the *ACM Symposium on Principles of Distributed Computing* 1984, pp. 154-162.
Keidar, Idit, et al., "Moshe: A Group Membership Service for WANs" to appear in *ACM Transactions on Computer Systems (TOCS)*, Aug. 2002, pp. 1-47.
Khazan, Roger, I., "A One-Round Algorithm for Virtually Synchronous Group Communication in Wide Area Networks", Ph.D. dissertation, Department of Electrical Engineering and Computer Science. MIT., May 22, 2002. Thesis Supervisors: Prof. Nancy A. Lynch and Dr. Idit Keidar. Retrieved from http://theory.1cs.mit.edu/~roger/Research/Papers/khazan-phd.pdf.
Anceaume et al., "Converging Toward Decision Conditions" *6th International Conference on Principles of Distributed Systems*, France, pp. 53-63 (Dec. 11-13, 2002).
Mostefaoui et al., "IRISA Research Report No. 1355" (Oct. 2000).
Brasileiro et al., "IRISA Research Report No. 1321" (Apr. 2000).
Schneider, F.; Implementing Fault-tolerant Services Using the State Machine Approach: A Tutorial; *Computing Surveys*, 22(3):299-319, Sep. 1990.
Deswarte, Y. et al; Intrusion Tolerance in Distributed Computing Systems; *Proceedings of the 1991 IEEE Symposium on Research in Security and Privacy*; pp. 110-121, May 1991.
Canetti, R. et al.; Fast asynchronous Byzantine agreement with optimal resilience; *Proc. 25th Annual ACM Symposium on Theory of Computing (STOC)*, pp. 42-51, 1993.
Reiter, M; How to Securely Replicate Services; *ACM Transactions on Programming Languages and Systems*, vol. 16, No. 3, pp. 986-1009, May 1994.
Reiter, M.K.; Secure Agreement Protocols: Reliable and Atomic Group Multicast in Rampart; *Proceedings of the 2nd ACM Conference on Computer and Communications Security*, pp. 68-80, Fairfax, Virginia, Nov. 1994.
Gong, L. et al.; Byzantine Agreement With Authentication: Observations and Applications in Tolerating Hybrid and Link Faults; *Dependable Computing for Critical Applications*—5, pp. 79-90, IFIP WG 10.4, preliminary proceedings, 1995.
Reiter, M. K.; The Rampart toolkit for building high-integrity services; *Theory and Practice in Distribued Systems, International Workshop, Selected Papers, Lecture Notes in Computer Science*, vol. 938, K. P. Birman, F. Mattern, and A. Schiper, Eds., Springer-Verlag, Berlin, 99-110, 1995.
Reiter, M. K.; Distributing Trust With the Rampart Toolkit; *Communications of the ACM*; 39, 4 pp. 71-74, Apr. 1996.
Malkhi, D. et al.; A High-Throughput Secure Reliable Multicast Protocol; *Proceedings of the 9th Computer Security Foundations Workshop*, Kenmore, Ireland, pp. 9-17, Jun. 1996.
Malkhi, D. et al.; A High-Throughput Secure Reliable Multicast Protocol; *Journal of Computer Security*. Also in *Proceedings of the 9th IEEE Computer Security Foundations Workshop*, pp. 9-17, Jun. 1996.
Malkhi, D. et al.; Byzantine Quorum Systems; *Proceedings of the 29th ACM Symposium on Theory of Computing*, May 1997.
Malkhi, D. et al.; The Load and Availability of Byzantine Quorum Systems; *Proceedings 16th ACM Symposium on Principles of Distributed Computing (PODC)*, pp. 249-257, Aug. 1997.

Kihlstrom, K. P. et al.; *Solving Consensus in a Byzantine Environment Using an Unreliable Fault Detector;* Proceedings of the International Conference on Principles of Distribued Systems (*OPODIS '97*), Hermes, Chantilly, France 61-76, 1997.

Kihlstrom, K. P. et al.; The SecureRing Protocols for Securing Group Communication; *Proceedings of the 31st Hawaii International Conference on System Sciences*, vol. 3, pp. 317-326, Jan. 1998.

Malkhi, D. et al.; Secure and Scalable Replication in Phalanx; *Proceedings of the 17th IEEE Symposium on Reliable Distributed Systems*; p. 51-58, West Lafayette, Indiana, USA, Oct. 1998.

Malkhi, D. et al.; Byzantine Quorum Systems; *Distributed Computing*; vol. 11, No. 4, p. 203-213, 1998.

Goldberg, A. et al.; Towards an Archival Intermemory; *International Forum on Research and Technology Advances in Digital Libraries*; IEEE, pp. 147-156, 1998.

Hartman, J.H. et al.; The Swarm Scalable Storage System; *19th ICDCS*; pp. 74-81, 1999.

Keidar, Idit, et al.; On the Cost of Fault-Tolerant Consensus When There Are No Faults—A Tutorial; SIGACT News 32(2), *Distributed Computing* column, pp. 45-63; Jun. 2001.

Dwork, Cynthia, et al.; Consensus in the Presence of Partial Synchrony; *Journal of the ACM*, 35(2):288-323, Apr. 1988.

Lampson, Butler W.; How to Build a Highly Available System Using Consensus; http://www.research.microsoft.com., (pub. 1996).

Lamport, Leslie; The Implementation of Reliable Distributed Multiprocess Systems; *Computer Networks*, 2:95-114, 1978.

Lamport, Leslie, et al.; The Byzantine Generals Problem; *ACM Transactions on Programming Languages and Systems*, vol. 4, No. 3, Jul. 1982, pp. 382-401.

\* cited by examiner

CONFLICT FAST CONSENSUS

FIELD OF THE INVENTION

This invention relates generally to distributed computing and, more particularly, relates to fault tolerant distributed computing that can reduce message delays and efficiently tolerate conflicts.

BACKGROUND

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to provide more reliable access to data and computational resources.

In addition to providing a useful mechanism for using excess computing capacity, distributed systems can also be composed of dedicated inexpensive computing devices in order to achieve the performance and storage capabilities of a larger, more-expensive computing device. A further advantage of distributed systems is the ability to continue to operate in the face of physical difficulties that would cripple a single, larger computing device. Such difficulties could include: sustained power outages, inclement weather, flooding, terrorist activity, and the like.

To compensate for the increased risk that individual member computing devices may become disconnected from the network, turned off, suffer a system malfunction, or otherwise become unusable, redundancy can be used to allow the distributed computing system to remain operational. Thus, the information stored on any one personal computing device can be redundantly stored on at least one additional personal computing device, allowing the information to remain accessible, even if one of the personal computing devices fails.

A distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system.

However, distributed computing systems can be difficult to maintain due to the complexity of properly synchronizing the individual devices that comprise the system. Because timekeeping across individual processes can be difficult at best, a state machine approach is often used to coordinate activity among the individual devices. A state machine can be described by a set of states, a set of commands, a set of responses, and client commands that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose a given client command for execution by every device in the system. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given client command be executed by the devices, using the proposal number suggested in the earlier message. Each device can, at that stage, determine whether to vote for the action or reject it. A device should only reject an action if it has responded to another leader's suggestion of a different proposal number. If a sufficient number of devices, known as a quorum, vote for the proposal, the proposed action is said to have been agreed upon, and each device performs the action and can transmit the results. In such a manner, each of the devices can perform actions in the same order, maintaining the same state among all of the devices.

Generally, the Paxos algorithm can be thought of in two phases, with an initial phase that allows a leader to learn of prior proposals that were voted on by the devices, as described above, and a second phase in which the leader can propose client commands for execution. Once the leader has learned of prior proposals, it need not continually repeat the first phase. Instead, the leader can continually repeat the second phase, proposing a series of client commands that can be executed by the distributed computing system in multiple steps. In such a manner, while each client command performed by the distributed computing system for each step can be thought of as one instance of the Paxos algorithm, the leader need not wait for the devices to vote on a proposed client command for a given step before proposing another client command for the next step.

The distributed computing system, as a whole, can be modeled as a state machine. Thus, a distributed computing system implementing complete redundancy can have each of the devices replicate the state of the overall system. Such a system requires that each device maintain the same state. If some devices believe that one client command was executed, while a second group of devices believes that a different client command was executed, the overall system no longer operates as a single state machine. To avoid such a situation, a majority of the devices can be generally required to select a proposed client command for execution by the system. Because any two groups of devices, each having a majority, must share at least one device, mechanisms, such as the Paxos algorithm, can be implemented that rely on the at least one common device to prevent two groups, each containing a majority of devices, from selecting different proposed client commands.

However, the Paxos algorithm adds message delays between when a client sends a request for the distributed system to execute a command, and when the client receives the results from the execution that command. Specifically, even if the client transmits a request to a leader, and even if the leader has already learned of previously voted on proposals, and thus has completed the first phase of the Paxos algorithm, there can still be two or more message delays between the transmission of the request from the client, and the transmission of the results to the client. Furthermore, the Paxos algorithm can require the presence of a leader device that receives client requests and determines the appropriate functions to submit for a vote to the devices of the distributed computing system. Should such a leader device fail, a new leader may not take its place immediately, leaving the distributed computing system idle and the client waiting for a response to its requests.

One mechanism for implementing a distributed fault tolerant algorithm having fewer message delays is a Fast Paxos algorithm in which the first phase of the standard Paxos algorithm is performed by a leader and the second phase is performed directly by clients of the distributed system. Thus, a leader device can learn of previously voted on proposals, and can ensure that devices in the distributed computing system have agreed on a common state. Once the leader learns of no further pending proposals, it can signal to the other devices that they treat messages received directly from the clients of the system as proposals using the proposal number the leader learned of while performing the first phase. A client can then send proposals directly to the devices which, unless they have previously voted for a proposal, can vote for the client's proposal. Because there is no leader device to collect votes, the devices can execute the proposed function instead of voting for it. Once the client receives responses from a sufficient number of devices, it can determine that the system has executed the function it proposed. In such a manner the client can receive a response without any message delays between the transmission of the client's proposal, and the devices' responses.

However, the Fast Paxos algorithm cannot tolerate a conflict among two or more clients. Specifically, if two or more clients propose different functions at approximately the same time, the devices may be unable to choose between the different functions. In such a case, the system must stop using the Fast Paxos algorithm and return to the regular Paxos algorithm, with the leader beginning with the first phase, in an effort to resolve the discrepancy among the devices in the system. In such a case, the two or more clients that submitted the conflicting proposals may experience an even greater delay in receiving their responses than if the system had never attempted to operate using the Fast Paxos algorithm.

BRIEF SUMMARY OF THE INVENTION

Therefore, in one embodiment of the present invention, a conflict tolerant algorithm can implement a reduced-message-delay fault tolerant system in which the devices of the system are also the clients.

In another embodiment, a conflict tolerant algorithm is presented, in which devices can provisionally execute different proposed functions in a single system step.

In a further embodiment, at least one client of a distributed computing system implementing a conflict tolerant algorithm need not also be a device in the distributed computing system.

In a further embodiment, the devices of a distributed computing system can determine whether to provisionally execute a proposed function based on the identity of the device that proposed the function.

In a still further embodiment, function identifiers can be used to avoid having the distributed computing system execute the same function repeatedly.

In a yet further embodiment, any consensus algorithm can be used to resolve those conflicts among the devices in the distributed computing system that could not otherwise be resolved.

Although the description herein focuses primarily on the operation of computing devices in a distributed computing system, it will be appreciated that the description is equally applicable to processes running on a single computing device, such as on separate processors or in separate memory spaces. Thus, additional embodiments include the operation of the conflict tolerant algorithm in multiple processor environments, whether the multiple processors are physically located in one or more computing devices, and in multiple virtual machine environment, whether the multiple virtual machines are being executed by one or more computing devices. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
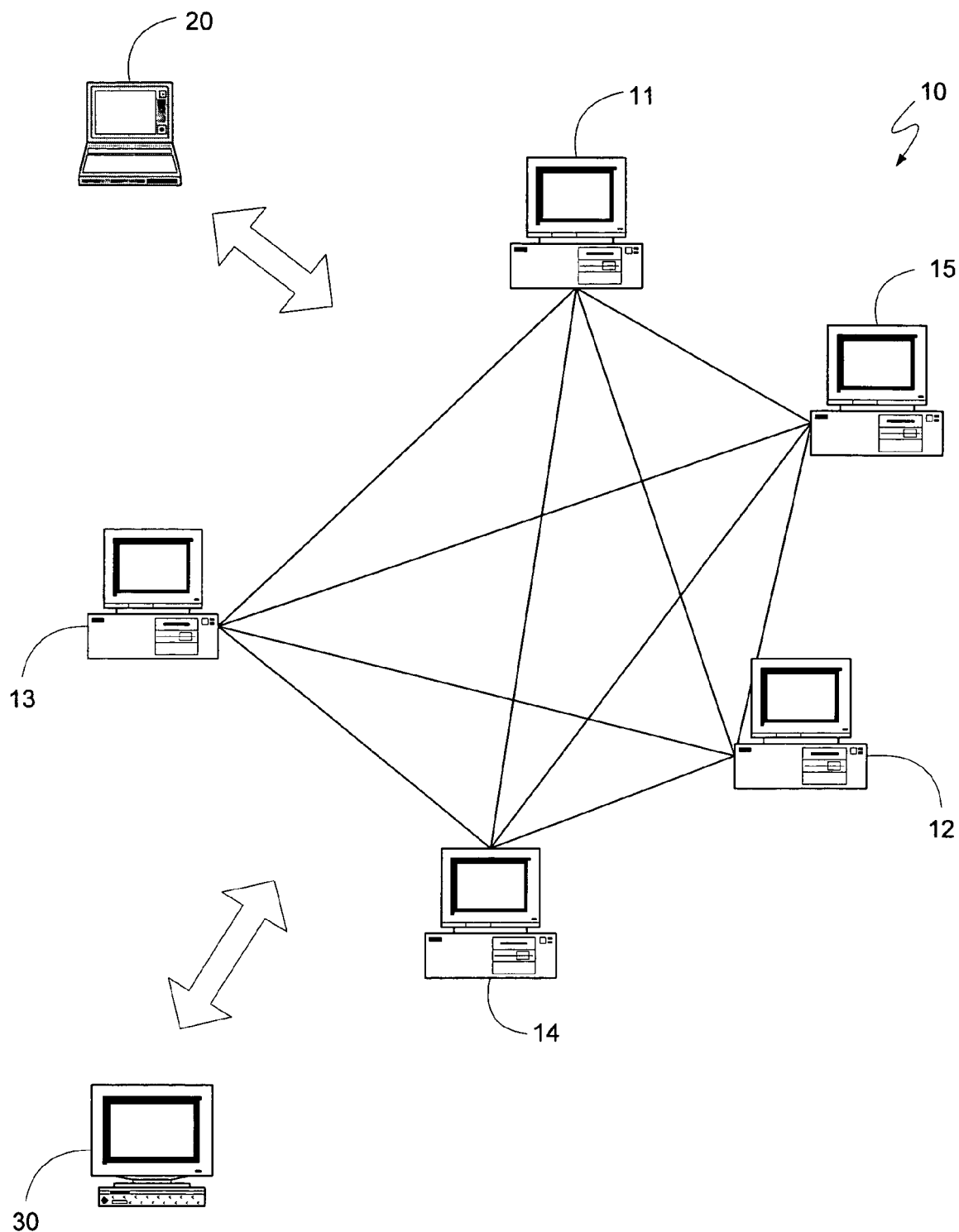
FIG. 1 is a block diagram generally illustrating an exemplary distributed computing system with which an embodiment of the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server that can act as a central storage repository for various forms of information. Such a distributed system seeks to replicate the central store on all of its constituent devices so that every client seeking to communicate with the central storage can find a convenient and efficient device with which to communicate. Furthermore, because of the distributed nature of the system, local events such as power outages, floods, political unrest, and the like may only affect a few computing devices, allowing the overall system to continue to operate properly and provide access to information and other services to clients.

Such a distributed computing system can be thought of as a state machine, with the future state of the machine defined by the current state and the action to be taken. Each constituent device of the distributed computing system can then independently execute the state machine of the overall system. The state-machine approach can be implemented asynchronously; so that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of the functions that were executed. In such a manner, every device can have the same state and if a device fails it need only determine the last function it executed, identify, from the list, any functions that have been agreed upon since that last function, and execute those functions.

A distributed computing system acting as a server can be especially useful for serving a large amount of information to a diverse set of clients, such as a central database for a multinational corporation, or a popular World Wide Web site. In such situations, a large number of clients can request information from the distributed computing system acting as a server. By implementing the server functionality across multiple devices, more clients can be serviced in parallel, thereby increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the proposal having the largest proposal number for which that device has already voted or an indication that the device has not voted for any previous proposals. Once the leader receives the responses from the other devices, it can determine which function to propose and request a vote for a proposed function. Each device will vote for the proposal unless it has, at some time after the initial transmission of the proposal and prior to the requested vote, responded to a suggestion for a higher proposal number. If a quorum of devices votes for the proposal, then the proposal is accepted, and the leader can transmit a message to all of the devices requesting that they execute the agreed upon function.

The Paxos algorithm, however, introduces a series of message delays between the receipt of the client's request, and the transmission, to the client, of the results. Specifically, upon receipt of a client's request, and assuming that the first phase of the Paxos algorithm was previously completed and the leader now knows the appropriate proposal number to use, the leader can send a request for a vote, using an appropriate proposal number, to the other devices executing the Paxos algorithm. This step can introduce one message delay. Subsequently, the other devices executing the Paxos algorithm can return their votes to the leader, which can introduce a second message delay. Once the leader receives votes from a quorum of devices, it can instruct the devices to execute the client's request. Simultaneously, the leader itself can execute the client's request and can return the results to the client. Thus, not counting the transmissions between the client and the leader, the Paxos algorithm can introduce two or more message delays between the client's request and the response.

An alternative version of the Paxos algorithm, called the Fast Paxos algorithm, eliminates message delays between the transmission of the client's request and the transmission of a response to the client by providing direct communication between the client and the devices of the distributed computing system. Specifically, a leader can perform the first phase of the standard Paxos algorithm, learn of any pending proposals, and then instruct the devices to treat requests from the clients as proposals for subsequent steps. The clients can then send their proposals directly to the devices of the distributed computing system, and rather than voting for the proposals, the devices can provisionally execute the proposed functions and transmit the results directly back to the client, eliminating any message delays. Once a client receives a sufficient number of responses, it can be assured that the system has executed the requested function. However, if two or more clients submit proposals at approximately the same time, a conflict can arise because some devices of the distributed computing system have executed one proposed function, while others have executed a different proposed function. To resolve this conflict, a leader can initiate the first phase of the regular Paxos algorithm, and proceed accordingly. However, by reverting back to the standard Paxos algorithm, the Fast Paxos algorithm can often be slower, in practice, than the standard Paxos algorithm.

As will be shown in detail below, by allowing the devices of a distributed computing system to change the functions which they execute, conflicts in many instances can be avoided, enabling the distributed computing system to continue to operate using a consensus algorithm that avoids introducing message delays between a client's request and the system's response. In a distributed computing system in which the constituent devices may also be the system's clients, a proposed function can be accepted and provisionally executed by a device if it has not already executed another function proposed by a device having a more dominant device identifier than the device that proposed the first function. Additionally, once a device has accepted and provisionally executed a proposed function, it may not propose a different function for the same system step. Such guidelines can enable a distributed computing system to reach a consensus and respond to clients' proposals without any message delays, as will be described in detail below.

Distributed Computing Environment

Turning to the drawings, wherein like reference numerals refer to like elements, the invention is illustrated as being implemented in a distributed computing system, such as the exemplary distributed computing system 10 shown in FIG. 1. For ease of presentation only, the present invention will be described with reference to distributed computing system 10, comprising computing devices 11 through 15, which are all interconnected as shown in FIG. 1. As will be understood by those skilled in the art, the present invention is applicable to all distributed computing environments and is not intended to be limited in any way by the exemplary distributed computing system of FIG. 1, which has been simplified for presentation purposes.

FIG. 1 also illustrates a single client computing device 20 that is not part of the distributed computing system 10. The present invention can operate in environments having any number of client computing devices that are also devices in the distributed computing system, and at least one additional client that is not a device in the system. Client computing device 20 is illustrated as having a generic communicational connection to the distributed computing system 10, and as will be known by those skilled in the art, such a communicational connection can use any communication medium and protocol, and can allow the client computing device 20 to communicate with one or more of the computing devices in the distributed computing system 10.

Additionally, FIG. 1 illustrates a computing device 30 that is not shown as part of the distributed computing system 10, but which also maintain a generic communicational connection to system 10. As above, the communicational connection can use any communication medium and protocol, and can allow the computing device 30 to communicate with one or more of the computing devices in the distributed computing system 10. As will be described in further detail below, computing device 30 can monitor the results of executions performed by the system 10 without being part of the system 10. The computing device 30 can also stop the operation of a conflict tolerant reduced message delay consensus algorithm and initiate the operation of any consensus algorithm to resolve conflicts among the devices of the system 10.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
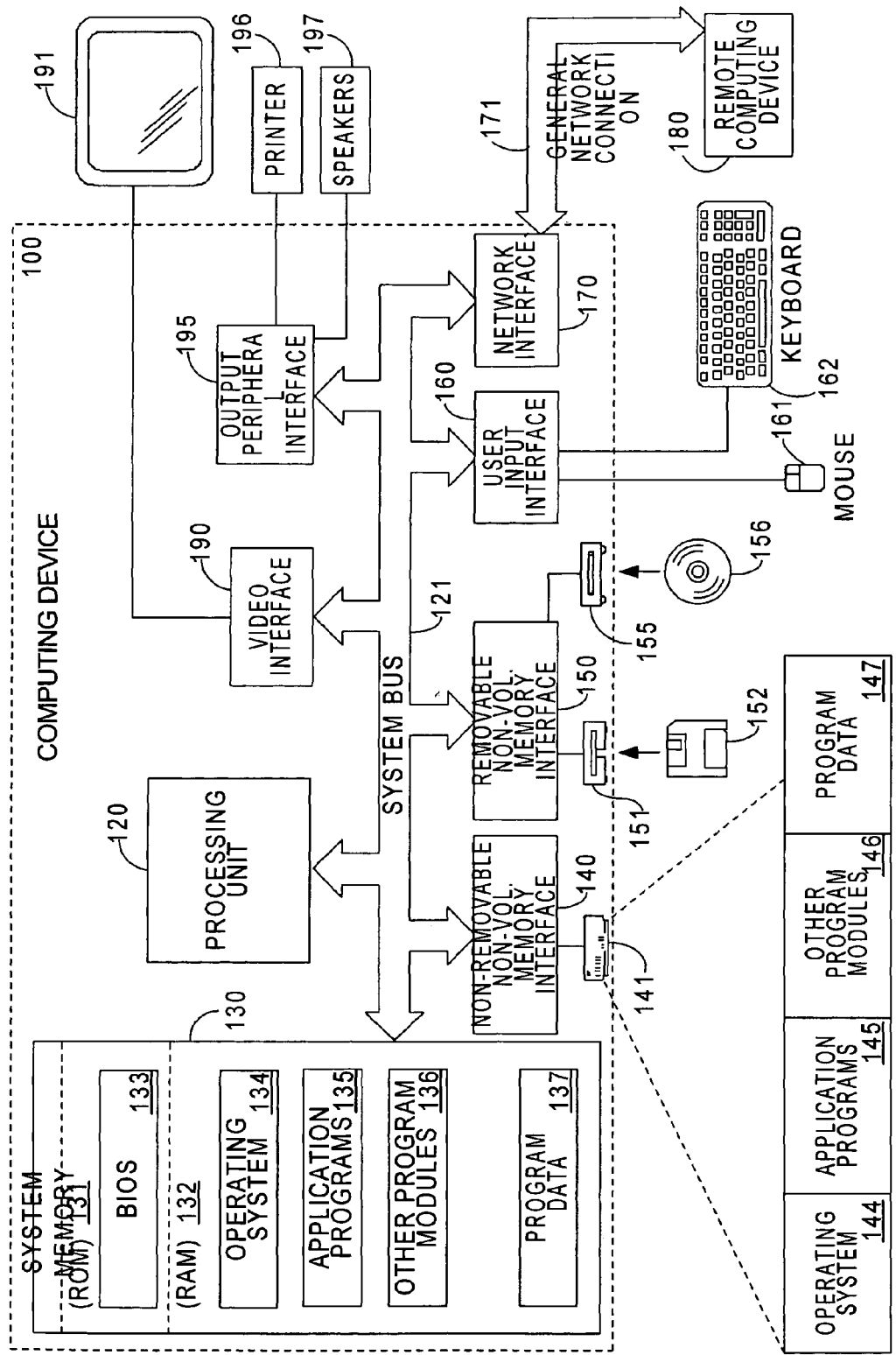
FIG. 2 is a block diagram generally illustrating an exemplary computing device with which an embodiment of the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not intended to exactly represent any of the computing devices 11-15, 20, or 30 illustrated in FIG. 1. The exemplary computing device 100 can implement one or more of these computing devices, such as through memory partitions, virtual machines, multiple processors, or similar programming techniques allowing one physical computing structure to perform the actions described below as attributed to multiple computing devices. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment, such as that shown in FIG. 1, using logical connections to one or more remote computers. FIG. 2 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a conflict tolerant message delay reducing consensus algorithm can be implemented in a distributed computing system comprising devices that can also act as the system's clients and one client that may not be a device of the system. Initially, the first phase of the standard Paxos algorithm, or any other consensus algorithm, can be performed to ensure that the devices of the distributed computing system share the same state and that pending functions are voted upon and executed. Subsequently, the clients can send requests directly to the devices of the distributed computing system. If the device can vote for the client's request, it can also provisionally execute the client's request and return a result to the client. A client receiving result messages from all of the devices can be assured that the system has executed the client's request. In a similar manner, each client can inform the other clients of the distributed computing system that it has provisionally voted for the client's request. A device that has voted for the client's request, and that has received messages from every other device indicating that those other devices also voted for the client's request, can be assured that the system has executed the client's request. In such a manner one or more of the devices of the distributed computing system can maintain the system's state.

Because all but one of the clients of the distributed computing system may also be a constituent device of the system, the number of conflicting proposals can be limited by allowing clients to make a proposal only if they have not already voted, in their capacity as a device of the system, for a different proposal. While this can limit some conflicting proposals, an additional mechanism may be necessary to account for the remaining conflicting proposals. One such mechanism can be to allow devices to undo one provisionally executed function and perform a different function instead or, in different terms, vote for more than one proposal. Specifically, a device can change its vote and vote for a different proposal if the proposal is sent by a client having a more dominant client identifier than the client that sent the first proposal. By enabling devices to change their votes, and by limiting further proposals to only those devices that have not already voted, the system can reach a consensus even in the face of conflicts.

If one or more of the devices of the distributed computing system were to fail, a consensus may not be reached using the conflict tolerant reduced message delay algorithm generally described above. In such a case, any consensus algorithm, including the Paxos algorithm generally described above, can be used to reach a consensus. Specifically, the consensus algorithm could poll the operational devices to learn of proposals that may have been accepted, and can then attempt to achieve a consensus on one of those proposals. In addition, once all of the devices of the distributed computing system are operational, the consensus algorithm can allow the system to return to using the conflict tolerant reduced message delay algorithm.

State Machines

In a distributed environment, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the functions from the ordered list that the device has not yet performed. Such a state machine approach was initially proposed in the article "Time, Clocks, and the Ordering of Events in a Distributed System," by Leslie Lamport published in The Communications of the ACM, Volume 21, Number 7, July 1978, the contents of which are hereby incorporated by reference in their entirety.

Paxos Algorithm

By using a state machine approach, the synchronization of the constituent devices 11 through 15 of the distributed computing system 10, shown in FIG. 1, can be achieved by agreeing on the functions to be performed and the order in which to perform them. One method for agreeing upon a function to be performed is known as the Paxos algorithm. The Paxos algorithm allows the system 10 to operate properly even in the face of failures, where devices can stop operating without advanced warning. The Paxos algorithm requires that at least a quorum of devices agree to a function before the system as a whole performs that function. With the Paxos algorithm, a quorum can be a simple majority, or it can include more devices than that, depending upon the particular requirements of the system. However defined, a quorum can be sufficiently large such that any two quorums have at least one properly functioning device in common.

To maintain consistency, the system 10 can limit the performance of functions to a single function per step. Therefore, it can be desirable to select only a single function for a given step. Since any two quorums have at least one properly functioning device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multi-step process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader soliciting the votes the highest proposal number, that is less than the current proposal number, for which the device has previously promised to vote for. In such a manner the leader can always learn of previous proposals.

Figure 3A:
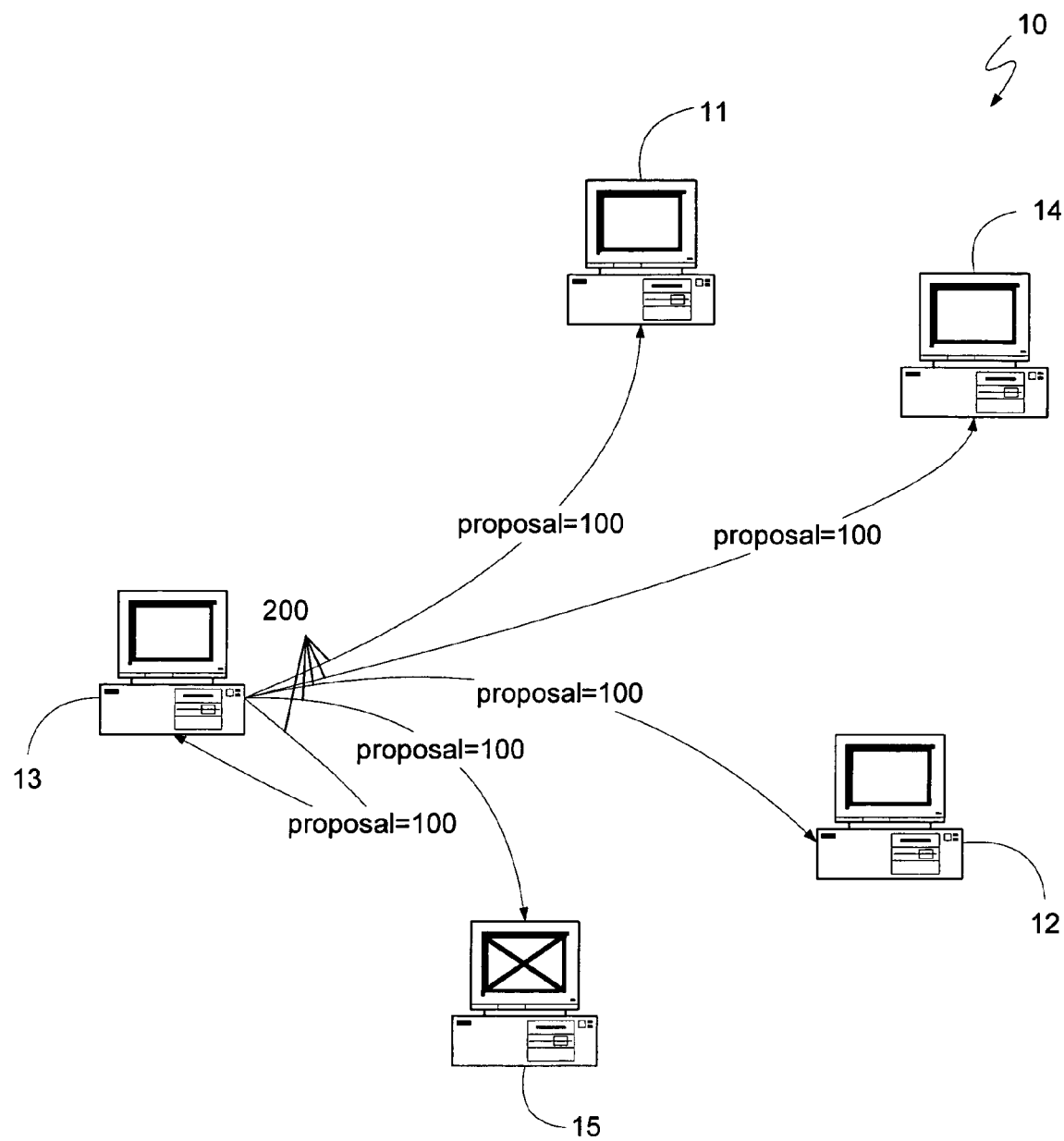
FIGS. 3a-e generally illustrate the operation of a consensus algorithm contemplated by an embodiment of the present invention.

Turning to FIG. 3a, the Paxos algorithm is explained in greater detail using the exemplary distributed computing system 10, comprising the five devices 11 through 15, shown. In such an environment, a quorum can be defined as any group of three or more devices because such a definition will ensure that every quorum has at least one device in common. As stated above, the Paxos algorithm is fault-tolerant, in that it can provide for the proper operation of a distributed computing system in the face of failures of some of its constituent devices. To illustrate the fault-tolerant nature of the Paxos algorithm, device 15 is shown in FIGS. 3a-3e as a failed device.

As shown in FIG. 3a, device 13 can assume a leadership position and transmit message 200 to devices 11-15, suggesting a proposal number for a proposal that the system execute a given function. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Figure 3B:
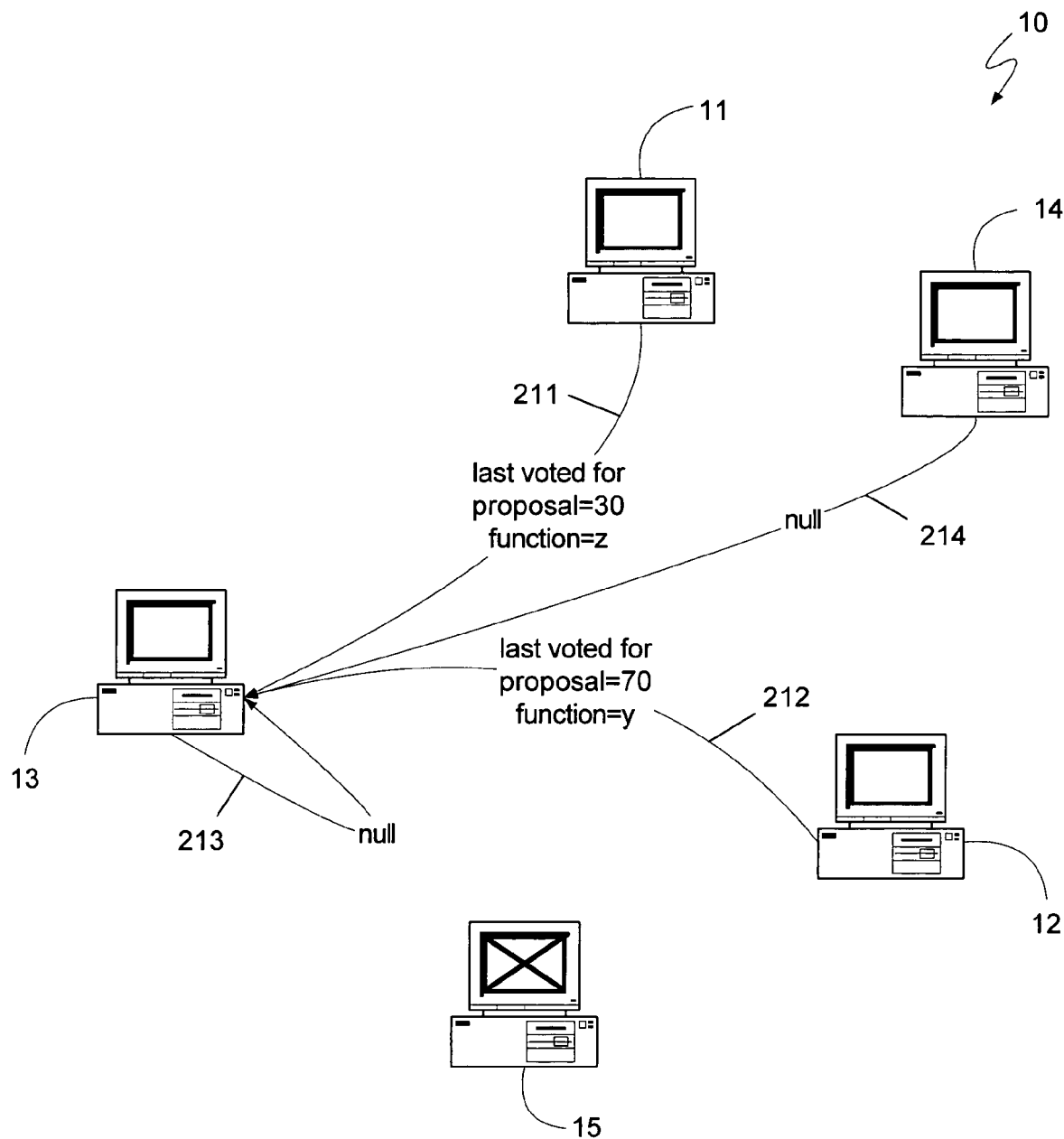

Turning to FIG. 3b, upon receipt of a message, such as message 200, suggesting a new proposal number, each of the devices 11-14 can respond with messages indicating the largest proposal number, that is still less than the proposal number suggested by message 200, and the function proposed by it, for which that device has cast a vote. If the device has cast a vote for a proposal number that is greater than the proposal number used by the leader, the device can ignore the message from the leader, or, as will be explained below, the device can respond with the last vote information despite the larger proposal number. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, device 11 previously voted for proposal number 30, which had proposed that the system 10 execute a function identified by the variable "z". Message 211 can, therefore, convey this last vote information of device 11 back to device 13. Devices 13 and 14 may not have received any proposals and have, therefore, not previously cast votes for any proposal. They can, therefore, return a null response as indicated by messages 213 and 214. Again, as above, messages sent from device 13 to itself can be handled internally by device 13, but are illustrated for explanatory purposes.

Figure 3C:
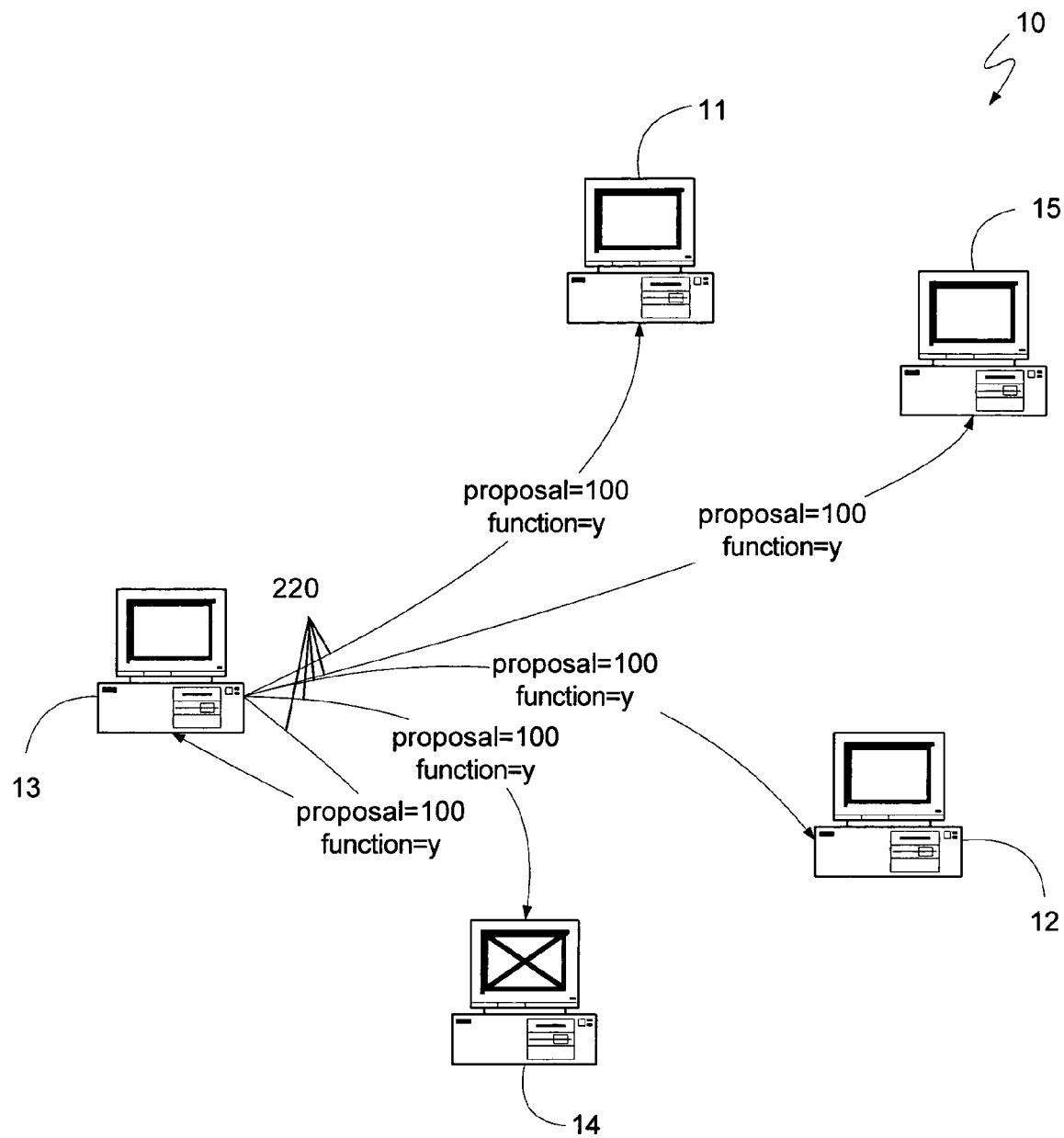

Turning to FIG. 3c, when the leader 13 receives messages 211-214, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-214 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains five devices, a quorum can be as few as three devices. Thus, it is sufficient for the leader 13 to solicit votes for a proposal from devices 11, 13 and 14 only. In such a case, the leader 13 need not propose the function "y" because device 12 is not a member of the selected quorum. Instead, the leader 13 can propose the function "z" as that function was voted for by device 11 as part of proposal number 30. Because proposal number 30 is the largest proposal number voted on by devices in the quorum, the leader can select function "z" to be submitted to a vote.

Because the message 200, suggesting a proposal number, acts as a mechanism by which the leader 13 can determine an appropriate proposal number to select, and enables the leader to learn of all lower numbered proposals that were previously proposed, it can be necessary for the leader 13 to send multiple messages, such as message 200, increasingly suggesting larger proposal numbers if the earlier messages having have too low a proposal number. Rather than requiring the leader to send a multitude of messages, each device can respond with the largest numbered proposal for which it has voted irrespective of whether the proposal number suggested by the leader is larger or smaller than the previously voted for proposal. In such a manner, the leader 13 can more efficiently learn of previous votes and can more accurately select a proposal number with which to propose a function.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-15 had received and responded to another suggestion for a new proposal, having a proposal number greater than 100, prior to leader 13 sending message 220 as shown in FIG. 3c, then that device may not vote for the function for which a vote was solicited by message 220.

Figure 3D:
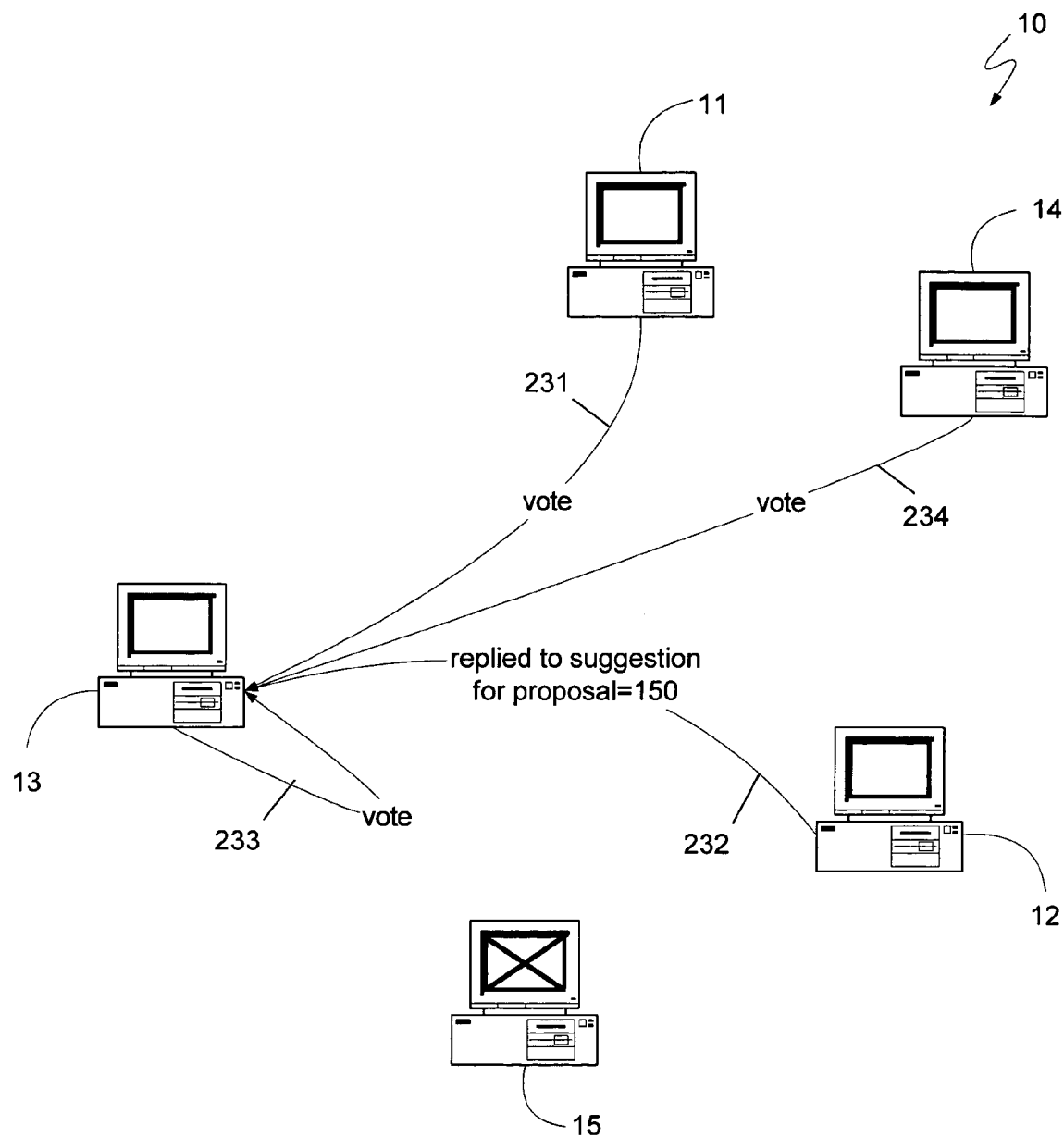

Turning to FIG. 3d, each of the devices 11-15 can independently determine that they have replied to no other suggestions for new proposals with proposal numbers greater than 100. Therefore, because the last suggestion for a new proposal to which they responded is not for a proposal with a larger number than the current proposal, devices 11, 13 and 14 can vote for the proposal and indicate their votes in messages 231, 233 and 234, respectively. As before, message 233 is shown for illustration purposes, and can be handled internally to device 13. Device 12, however, may have, sometime prior to the transmission of message 220, received and responded to a suggestion for a new proposal with a proposal number greater than 100. Therefore, upon receipt of message 220, device 12 can determine that it had already responded to a suggestion for a new proposal with a number greater than 100 and could not, therefore, vote for proposal 100. As a result, as shown in FIG. 3d, device 12 responds with message 232 informing the leader 13 that it has responded to suggestion for a proposal with a proposal number of 150. If leader 13 determines that it needs the vote of device 12, it can send another message, similar to message 220, except with a proposal number greater than 150. Alternatively, device 12 need not respond to message 220, and device 13 can, if it needs device 12's vote, attempt another vote with a proposal with an arbitrarily large proposal number. As can be seen, if device 12 does not indicate the larger proposal number to leader 13, the leader may have to guess and could waste resources guessing, through multiple messages, an appropriately large proposal number.

Figure 3E:
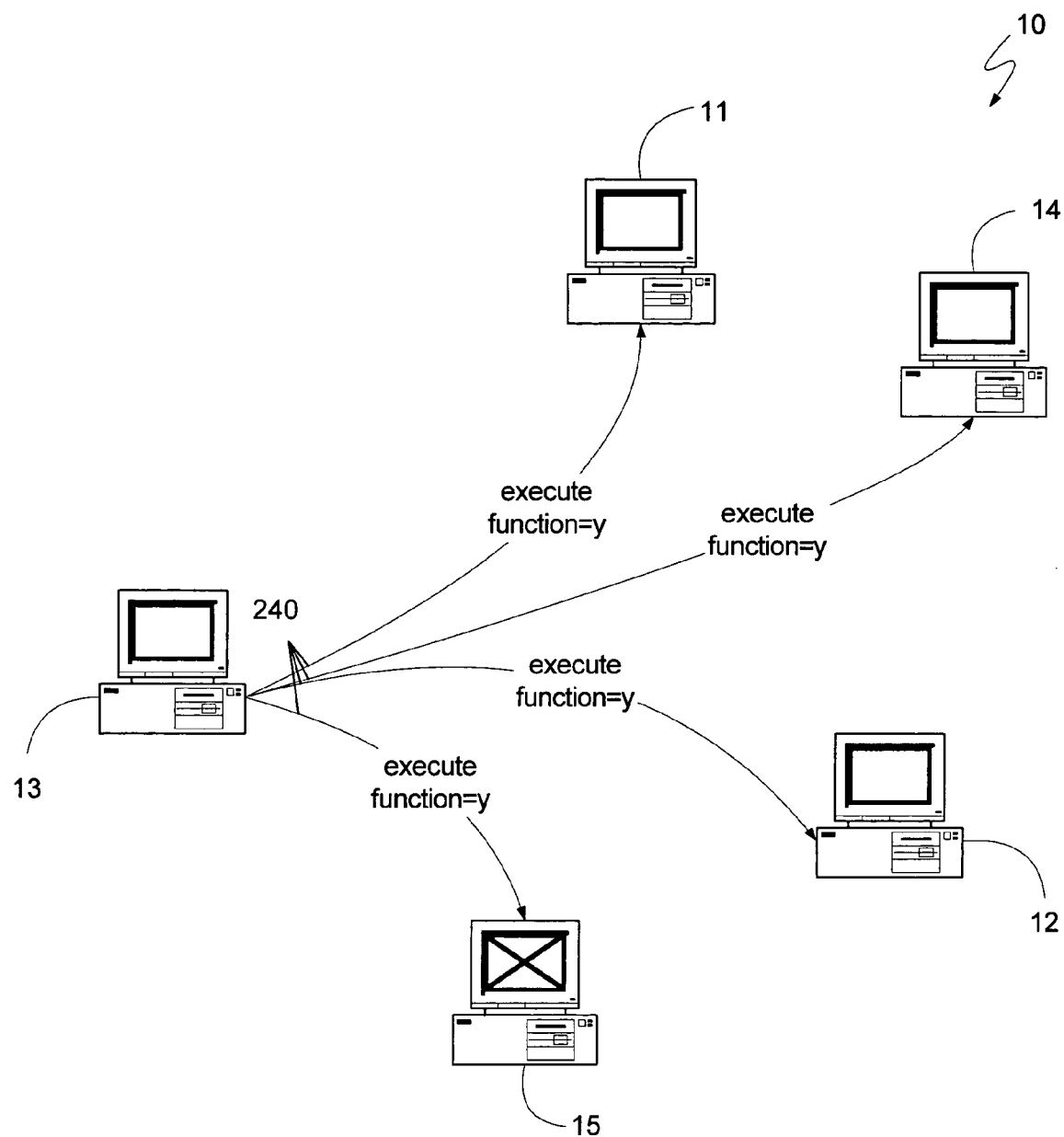

However, because devices 11, 13 and 14 are sufficient to constitute a quorum, the leader 13 can determine that the proposal has been accepted, even without the vote of device 12, and can request, with message 240 as shown in FIG. 3e, that each of the devices 11, 12, 14 and 15 execute function "y". While devices 11, 13 and 14 do constitute a quorum, it is not the same quorum to which leader 13 submitted the proposal to a vote, which included device 12. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation. For example, if another device that was previously non-operational, became operational and re-joined the system 10, it might try to propose a function different from "y" for the same step for which the system had selected and executed "y". If such a device sent a proposal with a proposal number less than 100, it could be ignored by devices 11, 13 and 14, since they had already voted on proposal number 100 as shown in FIG. 3*d*. On the other hand, if the device sent a proposal with a proposal number greater than 100, such as proposal number 130, devices 11, 13 and 14 would return a message indicating that they had voted for function "y" in proposal number 100. Device 12, because it may not have voted, as illustrated in FIG. 3*d*, might respond with message 212, indicating that it had voted for function "z" in proposal number 30.

The new device could then select the largest proposal among a quorum, which, by definition would include at least some of the devices 11, 13 and 14, and submit the function proposed in that proposal for voting. Thus, for proposal 130, the new device would submit function "y" for a vote. Each device could then vote on proposal 130 following the algorithm set forth above. Either proposal 130 would be selected, which would not change the prior decision to execute the function "y" for the particular step, or proposal 130 would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

The application of the Paxos algorithm, described above, can enable a distributed computing system to select a function to execute for a given step. By repeating the steps described above, a distributed computing system can agree upon a series of functions to be performed as a series of steps, and can thereby form a continuously operating system. In such a manner the distributed computing system can receive requests from one or more clients, can execute those requests, and can return the results to the clients.

Figure 4A:
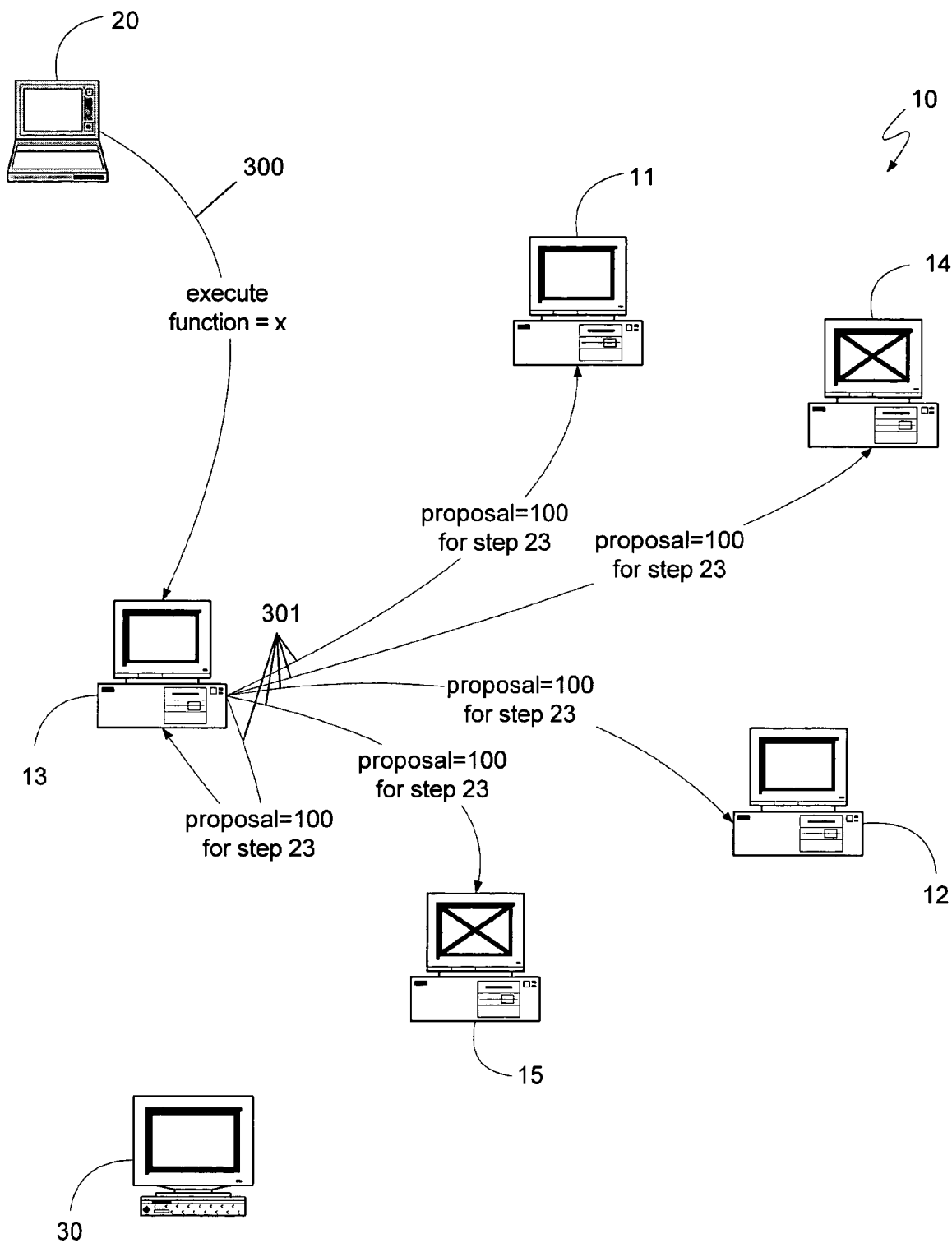
FIG. 4a-g generally illustrate the operation of a multi-step consensus algorithm contemplated by an embodiment of the present invention.

Turning to FIG. 4*a*, the system 10 can have already been operational for a number of steps. For example, in the exemplary system 10 illustrated in FIG. 4*a*, the most recently executed step can be step 24, and step 25 can be the current step. However, the device that was previously acting as a leader may have failed, or simply not received any client requests. Client 20 can send a request to execute a function, represented by the variable "x" in FIG. 4*a*, to device 13 using message 300, as shown. Device 13 can, according to any number of mechanisms, such as those described above, determine that it should attempt to become a leader. As such, device 13 can send message 301 suggesting the use of proposal number 100 for the next proposal, and including the step for which the proposal is being made. In the exemplary distributed computing system 10 of FIG. 4*a*, device 13 is not aware that steps 23 and 24 have already been decided upon and executed by the other devices 11 and 12. Thus, message 301 indicates that it is suggesting a proposal numbered 100 for step 23.

To expedite the operation of the algorithm in a system executing multiple steps, a message, such as message 301, can be understood to suggest a proposal numbered 100 for all steps greater than or equal to step 23. In such a manner, the leader 13 need not continually transmit messages, such as message 301, until it learns of every step that has already been decided. Instead, the leader 13 can learn of the already executed steps through only a single message round trip, as will be shown.

Figure 4B:
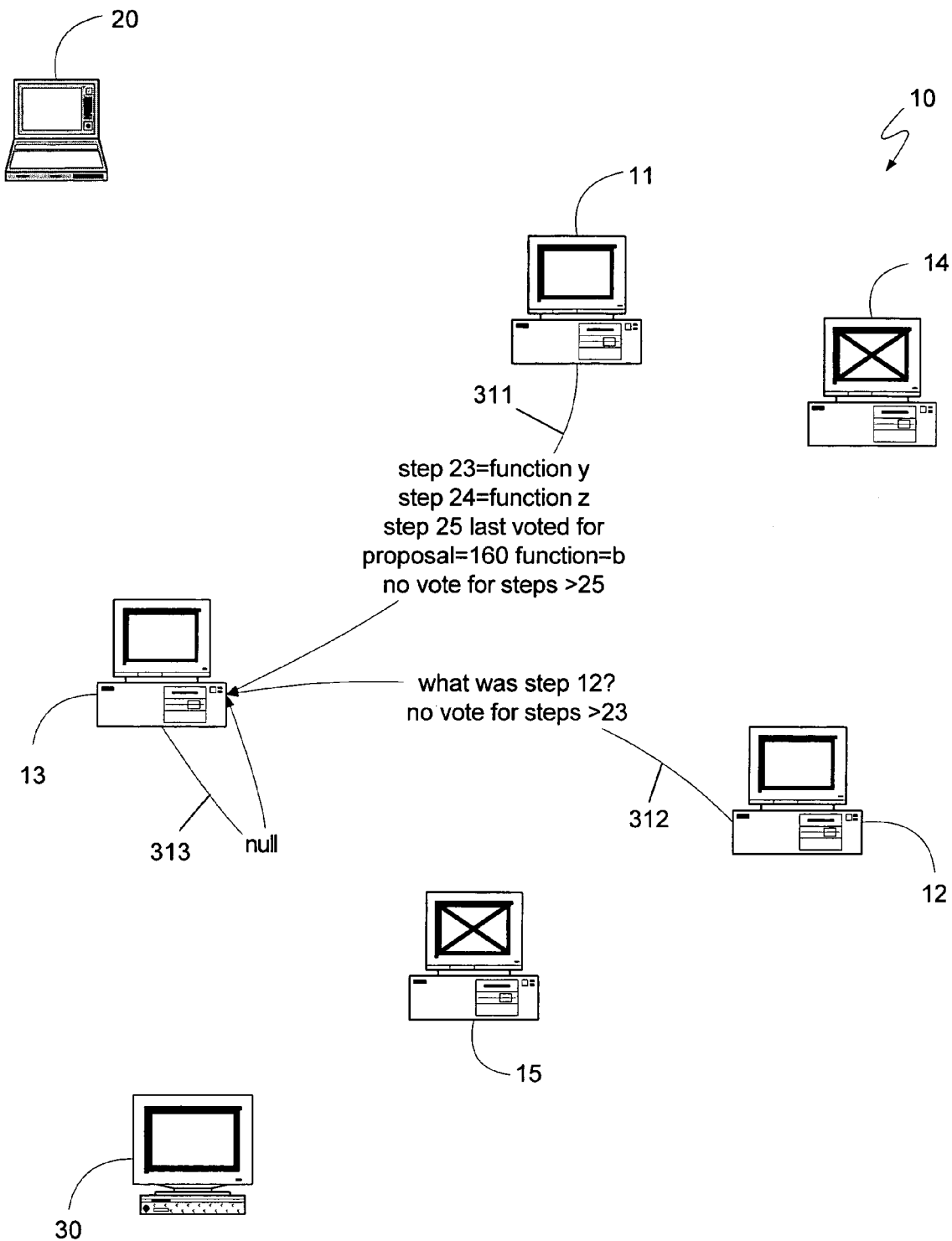

Turning to FIG. 4*b*, response messages 311-313 from the devices 11-13 of distributed computing system 10 are shown. Devices 14 and 15 are shown as having failed in order to provide an alternative illustration of the fault-tolerant nature of the Paxos algorithm. Upon receipt of message 301, device 11 can respond with message 311 indicating the functions it has stored as being performed for all steps greater than or equal to 23; in this case steps 23 and 24. In addition, device 11 can provide an indication of the proposals with the largest proposal numbers for which it has voted for steps greater than or equal to 25. Thus, in the example illustrated in FIG. 4*b*, message 311, can also indicate that device 11 did not vote for any proposals for steps greater than 25, and that it voted for proposal number 160, proposing function "b" for step 25. To decrease the number of messages being transmitting within the system 10, devices need only respond with their highest proposal number votes if they do not know of a function that has been executed for the given step. Thus, because device 11 was aware that functions were executed for steps 23 and 24, but not step 25, it responded with the functions executed for steps 23 and 24 and the highest numbered proposal for which it voted for step 25.

As before, device 13 can act as both a leader and a voting device. As such, device 13 can send itself messages, such as message 301, and it can respond to itself with messages such as message 313. Such messages are shown in the figures for illustrative purposes only, as they would likely be transmitted internally to device 13. Furthermore, because device 13 can check what is the step with the largest step number for which it knows the function executed, and it can check what the largest proposal number is for the proposals for all steps above that which device 13 voted for, message 313 should rarely contain any information other than a null indicator.

The current state of a state machine may depend, not only on the functions that were executed, but on the order in which those functions were executed. Therefore, if a device does not know which function was executed for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were executed for a step that the device missed. When device 13 sends message 301, as shown in FIG. 4*a*, it is an implicit statement that device 13 believes that step 23 is the next step and that it has executed the agreed upon functions through step 22. A device that is missing a function for a step below step 23, therefore, knows that device 13 has executed all of the functions through step 22, and it can request that function from device 13.

Returning to FIG. 4*b*, device 12 does not know what function was executed for step 12. As a result, device 12 may have been unable to execute any functions since step 11, even though it may know the functions executed for steps 13-23. Thus, in message 312, device 12 can request the function for step 12 from the leader 13. In addition, device 12 can indicate that it has not voted on any proposals for steps numbered higher than step 23.

If a device has missed too many steps, it can be more efficient to simply inform the device of the current state rather than transmitting all of the functions for all of the steps it has missed. One mechanism for ensuring that a device does not miss too many steps is to enable each device, or a collection of devices, to periodically take a snapshot of the various parts of the state, or the whole state. The state of another device could, therefore, be updated by sending it the appropriate snapshot together with the functions that were executed since the latest snapshot. Additionally, by using checksums of individual parts of the state, the state of another device could be updated by just sending that other device the parts of the state that differ from its current copy.

As a result of receiving messages 311 through 313, the leader 13 can execute steps 23 and 24, of which it did not previously know, attempt to determine the appropriate function to propose for step 25, and can attempt to update other devices that also had not already executed all of the steps through step 25. Originally, the leader 13 suggested a proposal number of 100 in message 301, but device 11 responded with message 311 indicating that it had already voted for a proposal with a larger proposal number than 100 for step 25. Consequently, leader 13 can select a proposal number greater than the largest proposal number of which the leader is aware of and transmit another suggestion message such as message 320 shown in FIG. 4c. Alternatively, device 11 could have simply ignored the suggestion for proposal number 100 in message 301 because the proposal number was less than the proposal number of the proposal for which device 11 had already voted for. In such a case, the leader could have retried by increasing the proposal number in an attempt to account for devices that ignored the initial suggestion.

Figure 4C:
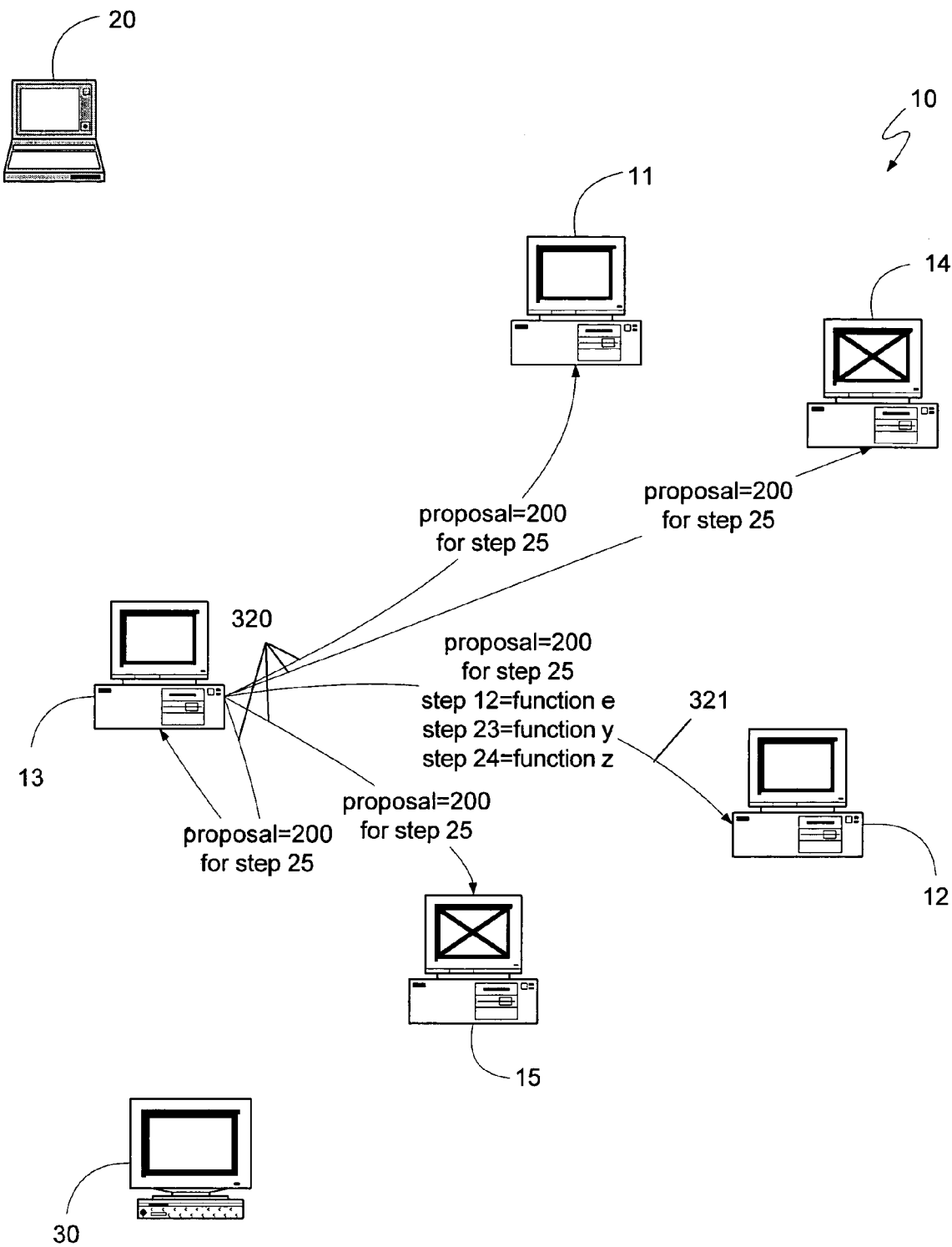

Turning to FIG. 4c, the leader 13 can suggest a larger proposal number, such as proposal number 200 as shown in message 320, in an attempt to suggest a proposal number that is larger than the number of any proposal which leader 13 has learned that a device has previously voted for. In addition, the leader 13 can also provide information regarding previously executed functions to any device that has not already executed all of the selected functions up until step 25. Therefore, as shown, the leader 13 can also send a message 321, indicating to device 12 that a function represented by the variable "e" was executed for step 12, and that functions represented by the variables "y" and "z" were executed for steps 23 and 24, respectively.

Figure 4D:
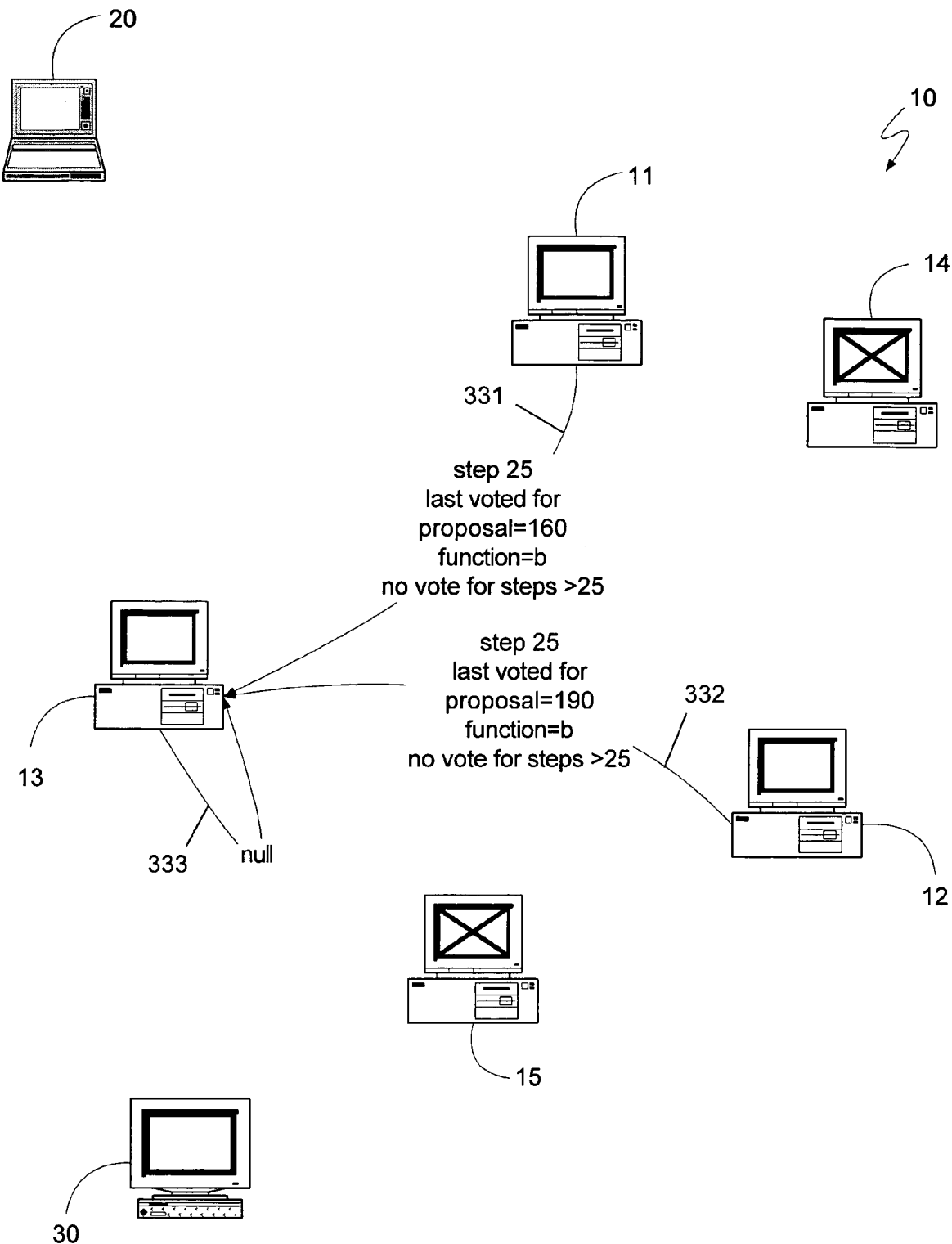

In FIG. 4d, then, the devices 11-13 can respond, in a manner similar to that shown above in FIG. 4b, with the exception that devices 11-13 need not inform device 13 of executed functions for steps 23 and 24, as device 13 has already learned of these steps and has sent proposal messages 320 and 321 referencing step 25. Furthermore, messages 331-333 can contain additional information, such as for additional proposals for which the devices may have voted for. For example, device 12 may have, sometime between the transmission of message 312 and message 332, voted for a proposal with a proposal number 190. Consequently, message 312 can indicate that device 12 may not have previously cast a vote for any proposal for step 25, but message 332 can indicate that device 12 has voted for proposal 190 for step 25, though it has still not voted for any proposal for steps greater than 25. However, because each of the proposal numbers are less than the suggested proposal number the leader 13 sent in message 320, the leader can proceed to propose a function with the proposal number 200 specified in message 320.

Figure 4E:
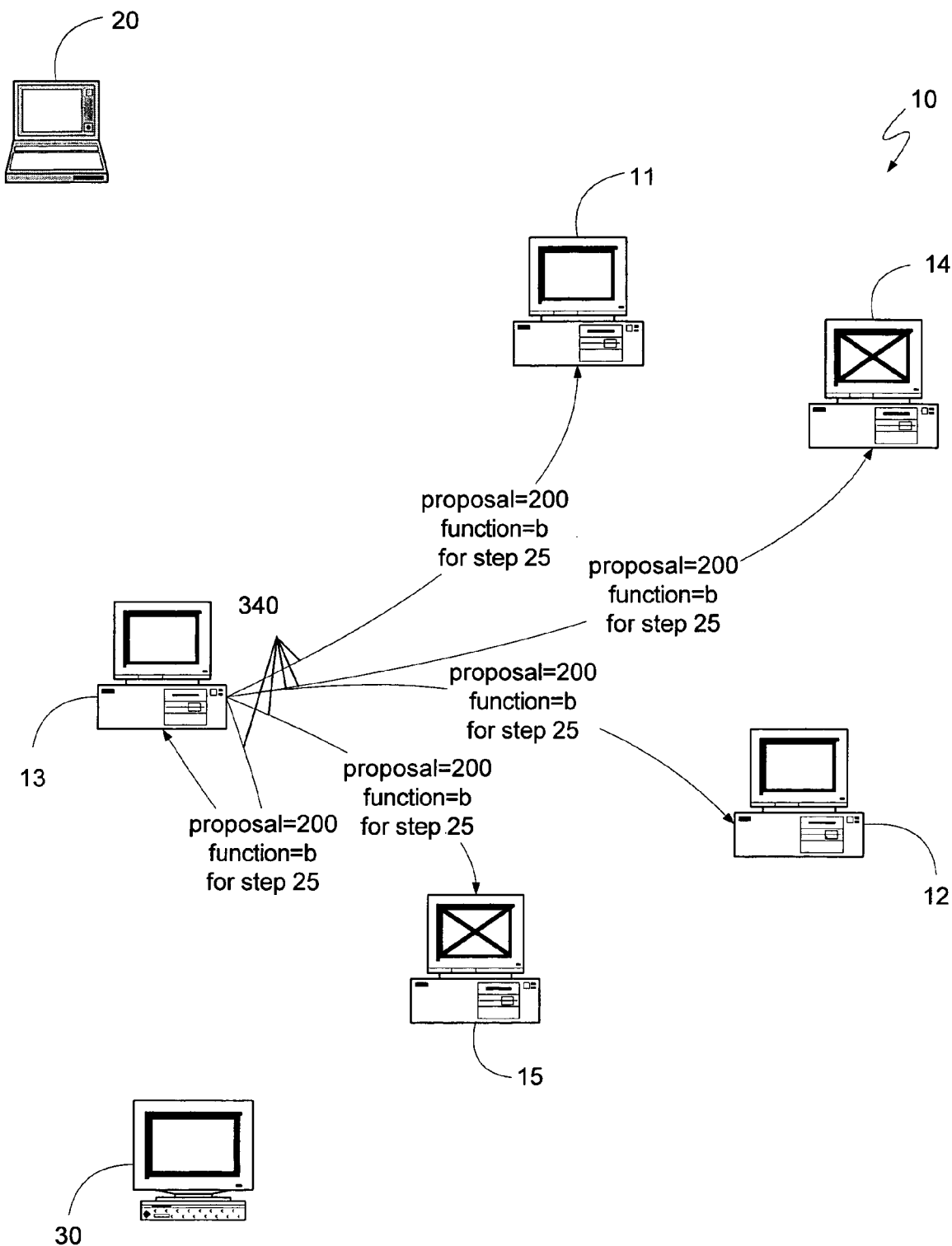

Turning to FIG. 4e, the leader 13 now has sufficient information with which to select a proposal to submit as proposal number 200, as illustrated by message 340, which requests that devices 11-15 vote on proposal 200, proposing that the system execute function "b" for step 25. As before, because devices 11 and 12, both members of a quorum, have previously voted for a proposal proposing the execution of function "b", and no other member of the quorum has voted for any larger numbered proposals, the leader 13 can propose function "b" for proposal number 200, despite the fact that the client 20 requested the execution of function "x" in message 300. In such a manner, the Paxos algorithm insures that previous functions that were proposed but not completed, such as because of a failure of one or more devices or their communications, can be executed in the proper order.

Figure 4F:
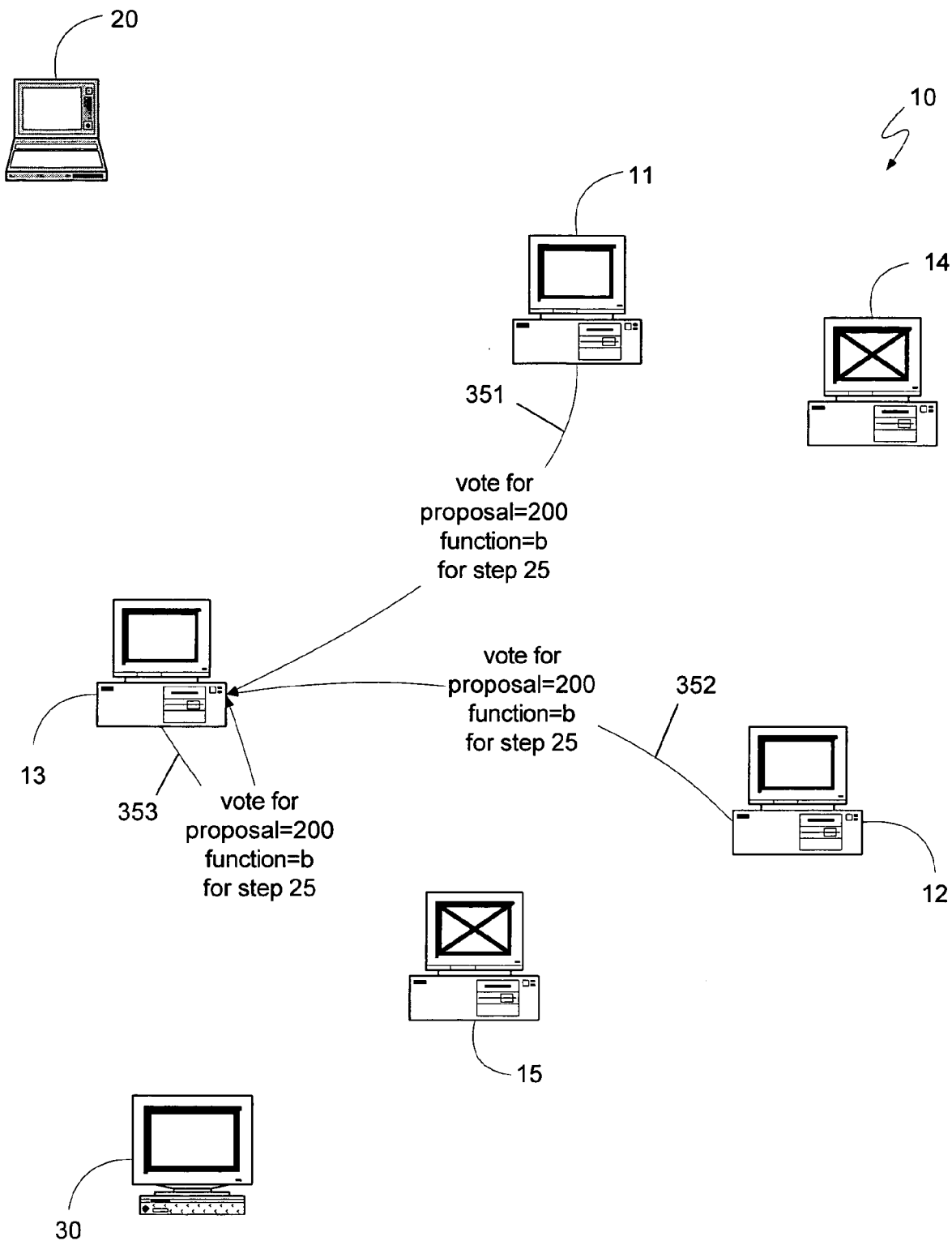
Figure 4G:
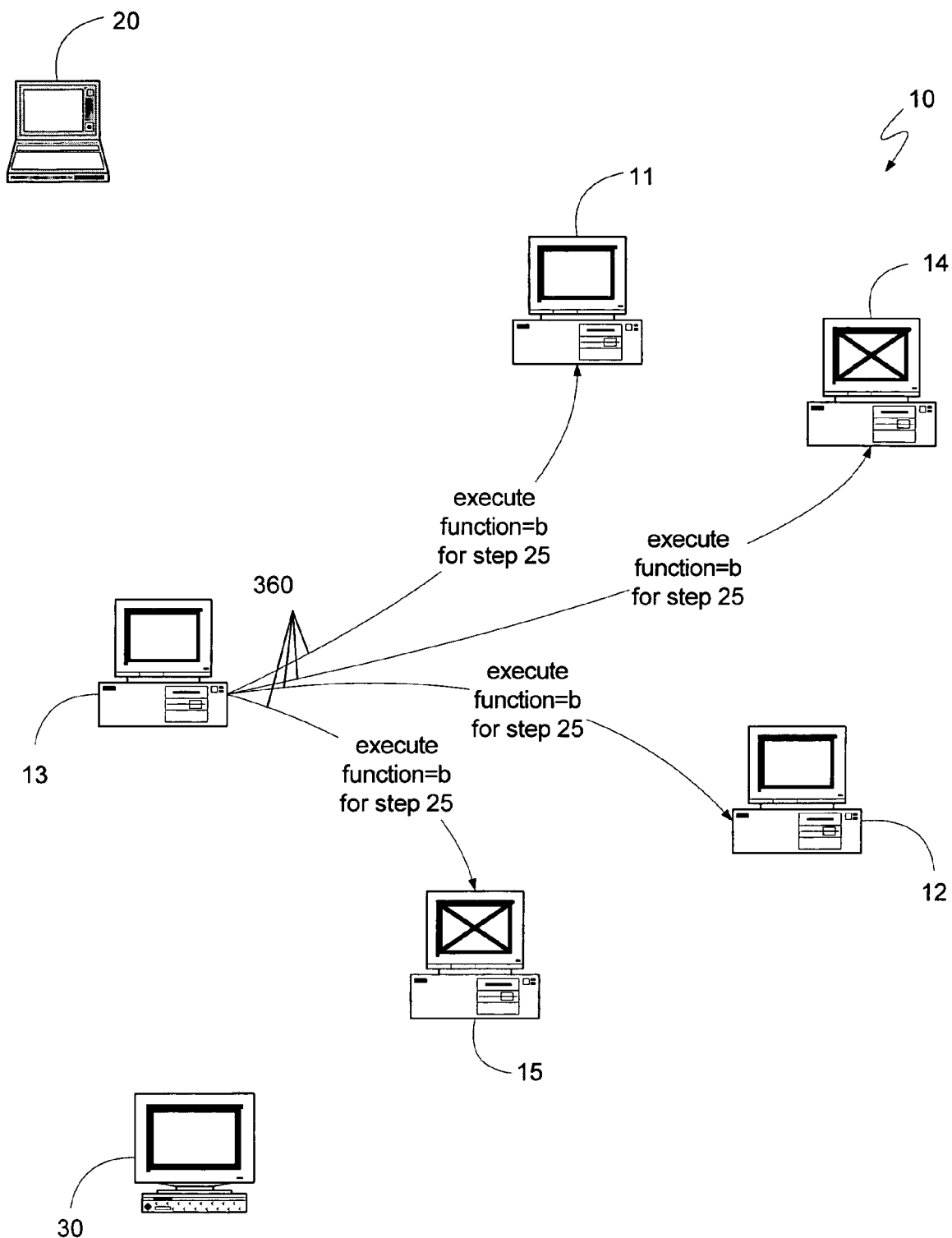

FIG. 4f illustrates devices 11-13 voting, for step 25, for proposal 200 proposing function "b" with messages 351-353, respectively. As before, a device can vote for a proposal so long as it has not promised to vote for a different proposal with a larger proposal number between the receipt of messages 320 and message 340. Once the leader 13 receives messages 351-353, it can transmit a message 360, as shown in FIG. 4g, instructing devices 11, 12, 14 and 15 to execute function "b" for step 25. The leader 13 can also execute the function itself, since it now knows that the function was selected by a quorum.

However, the function requested by the client 20 in message 300 has not yet been executed by the system 10 at the point in time illustrated in FIG. 4g. To have the system 10 execute the client's request, the leader 13 can perform an abbreviated version of the complete Paxos algorithm illustrated by FIGS. 3a-e and 4a-g above.

Conceptually, the Paxos algorithm described above can be divided into two general phases. The first phase comprises the leader learning of previous proposals that were voted for by the devices in the quorum. The first phase can contain one iteration of a proposal number suggestion by the leader and responses by other members of the quorum, as illustrated by FIGS. 3a and 3b, or multiple iterations of proposal number suggestions and responses, as illustrated by FIGS. 4a-d. The second phase comprises the leader submitting a proposed function for a vote, receiving the votes, and, if the proposal was voted on by a sufficient number of devices, instructing the devices to execute the agreed to function. Examples of the second phase are illustrated by FIGS. 3c-e and 4e-g.

Once the leader learns of other proposals, and finds a proposal number that is safe for all of the current and future steps, it does not need to solicit further information unless it fails, or another device attempts to become a leader. Therefore, the first phase of the Paxos algorithm may be performed less frequently, while the second phase may be performed repeatedly, with ever increasing step numbers, allowing a distributed computing system to agree upon and execute a series of functions and maintain an active running state.

Figure 5A:
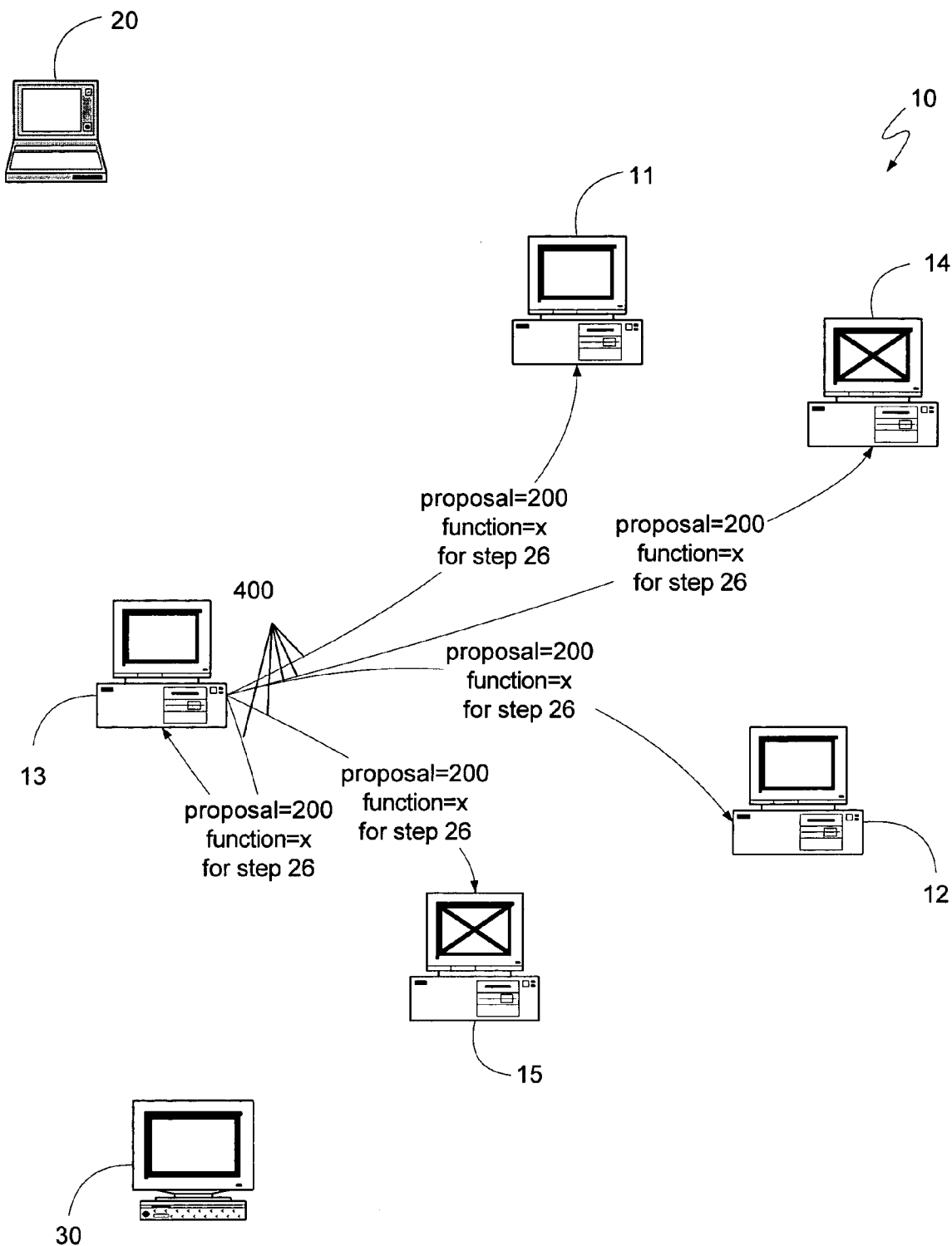
FIGS. 5a-d generally illustrate the operation of an abbreviated version of a multi-step consensus algorithm contemplated by an embodiment of the present invention.
Figure 5B:
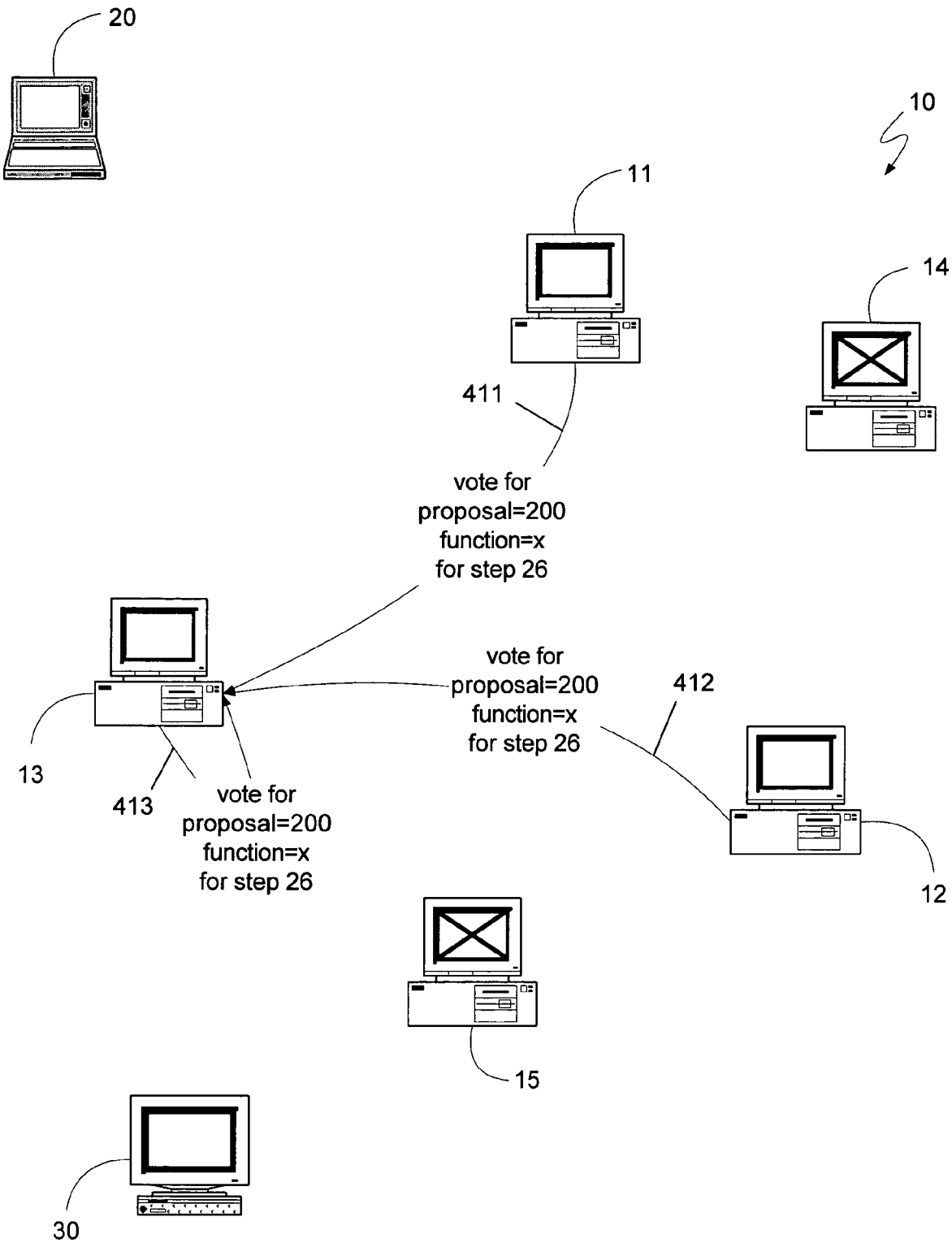
Figure 5C:
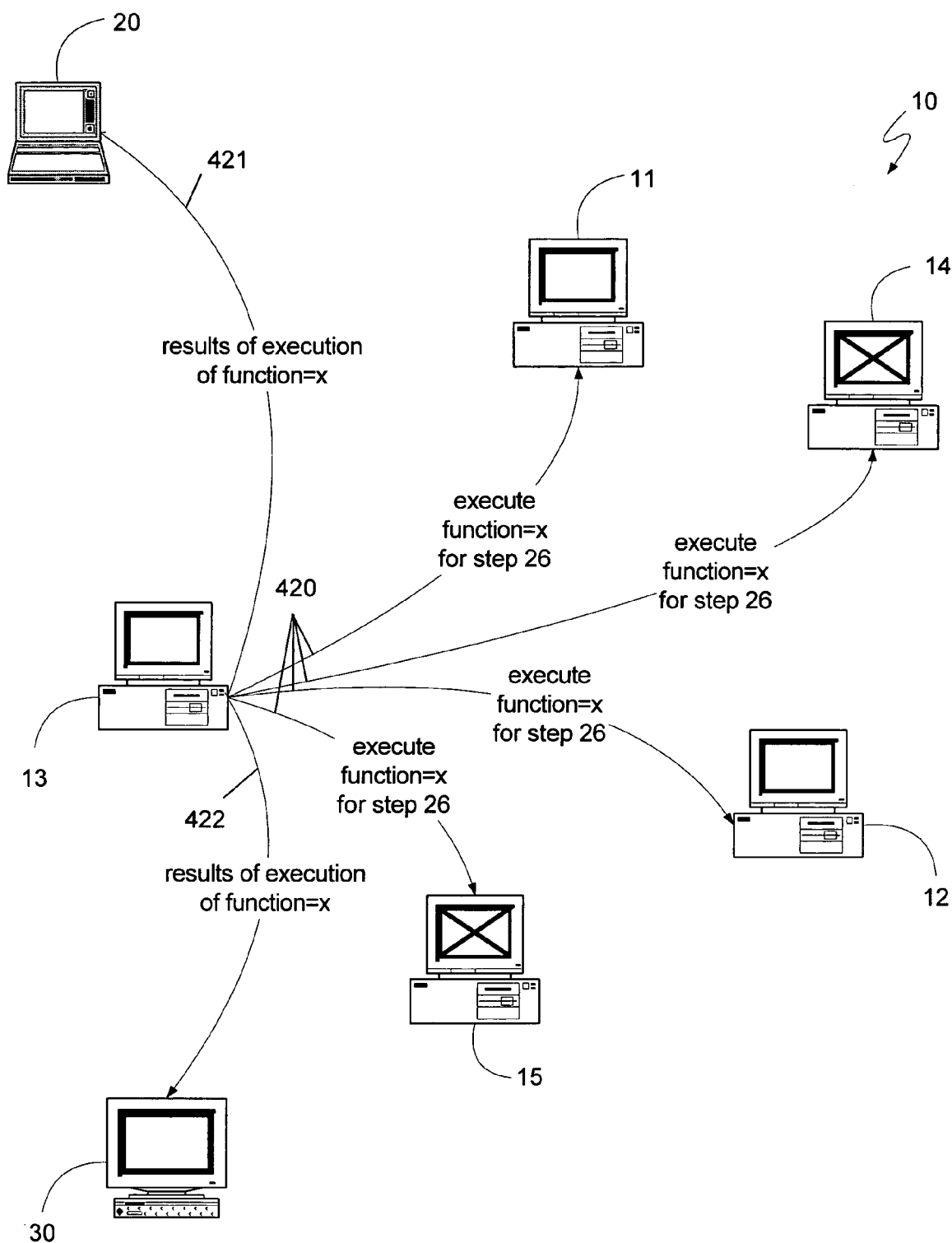

Turning to FIG. 5a, the exemplary distributed computing system 10 from FIGS. 4a-g is shown executing an additional step 26 subsequent to step 25 described in detail above. As a result of the first phase of the Paxos algorithm, as illustrated in FIGS. 4a-d, and described in detail above, the leader 13 already is aware that none of the devices 11-15 has voted for any proposals above step 25 and that proposal number 200 is, therefore, safe for all proposals for steps greater than step 25. Therefore, as shown in FIG. 5a, for step 26 the leader can initiate the second phase of the Paxos algorithm, without needing to perform the first phase again, and can send a message 400 soliciting votes for the execution of the function "x", which was requested by the client in message 300. Each of the devices 11-13 can then respond with votes, as shown in FIG. 5b with messages 411-413. Devices 414 and 415 are again shown as having failed in order to illustrate the fault-tolerant nature of the Paxos algorithm. Because a quorum of device has voted for the execution of the function, the leader 13 can signal, with message 420, as shown in FIG. 5c, that the devices 11, 12, 14 and 15 execute function "x" for step 26. In addition, because the leader 13 knows that the vote has succeeded, it can execute function "x" and can send the results of the execution of that function to the client as message 421, or to other interested computing devices, such as device 30 as message 422. Messages 421 and 422 can be sent concurrently with message 420, or even before or after message 420.

The devices implementing the steps of the Paxos algorithm described above can maintain variables storing information used in the algorithm. For example, for each step for which the devices does not know which function was chosen, the device can store the proposal number of the proposal with the largest proposal number for which they responded to, the proposal number of the proposal with the largest proposal number they voted for, the value proposed by the proposal with the largest proposal number for which they voted, and, if the device is a leader, it can additionally store the proposal number for the last proposal it issued. Additionally, devices can record which function was selected for all of the steps for which they have such information. Alternatively, as described above, a device could store a snapshot of its state at a given time, and the functions executed only since that time. Such variables can be stored in either volatile storage 130 or non-volatile storage, such as hard disk 141, floppy disk 152, or optical disk 156, shown in FIG. 2.

Additional information regarding the Paxos algorithm can be found in the paper entitled "The Part-Time Parliament" by Leslie Lamport, published in ACM Transactions on Computer Systems, volume 16, number 2 on pages 133-169, dated May 1998, which is hereby incorporated by reference in its entirety.

Fast Paxos Algorithm

As can be seen from the above detailed description of the standard Paxos algorithm, once a leader has been established, and has learned the various highest numbered proposals voted on by the devices in the quorum for all upcoming step numbers, the leader can solicit proposals for a vote without cycling through the first phase of the Paxos algorithm. While the messages shown in FIG. 5a were described as taking place after the transmission of message 360 in FIG. 4g, the leader 13 need not wait for the devices to vote for one proposal before sending another proposal for a subsequent step. Therefore, upon sending message 340, as shown in FIG. 4e, the leader 13 can send message 400 shown in FIG. 5a, and can continue, in such a manner, proposing a series of functions, using proposal number 200, for steps greater than step 26. By operating in such an asynchronous fashion, the overall distributed computing system need not be slowed down by waiting to learn of votes for previous steps.

Should another device, such as a previously non-functioning device, attempt to become a leader, it would not cause the system to perform improperly, but would only succeed in causing the first phase of the algorithm to be repeated. For example, if another device attempted to become a leader, it might suggest a proposal number that some devices would respond to. Having responded to the proposal number offered by a second leader, the devices would then inform the first leader of the higher numbered proposal when the first leader solicited a vote, or the devices might ignore the request by the first leader to vote on its proposal. When the proposal failed, because an insufficient number of devices voted for it, the first leader would attempt to pass the proposal again by initially performing the first phase again and selecting what it believes is a sufficiently large proposal number which it can suggest to the devices. In such a manner, a second leader would only delay the system, but it would not cause improper operation on the part of the distributed computing system.

To further decrease the number of message delays between the transmission of a client's request, and the transmission of a response to the client, the role of the leader in the second phase of the Paxos algorithm can be eliminated, enabling the client to communicate directly with the devices of the distributed computing system. Such an algorithm, known as the Fast Paxos algorithm, relies on the above described property of the Paxos algorithm that, once a leader has established an appropriate proposal number, it can continue to propose functions without polling the devices for any previous functions they may have voted for.

However, because the leader also determined which functions were proposed, the Paxos algorithm could rely on the leader to ensure that functions that had previously been selected by one majority were also selected by any other majority for the same step. Specifically, as described above, because every majority shared at least one device, that device would inform the leader of its previous vote and the leader could ensure that the current quorum voted for the same function for the same system step. Because the Fast Paxos algorithm can operate without a leader, an alternative mechanism can be used to ensure that two quorums do not select different functions for the same system step. One such mechanism is to define a quorum as a sufficiently large number of devices so that any two quorums share a majority of their devices. In such a manner, a function selected by a previous quorum can be determined by polling any other quorum of devices and determining if a majority of the new quorum's devices had voted for the same function.

Figure 5D:
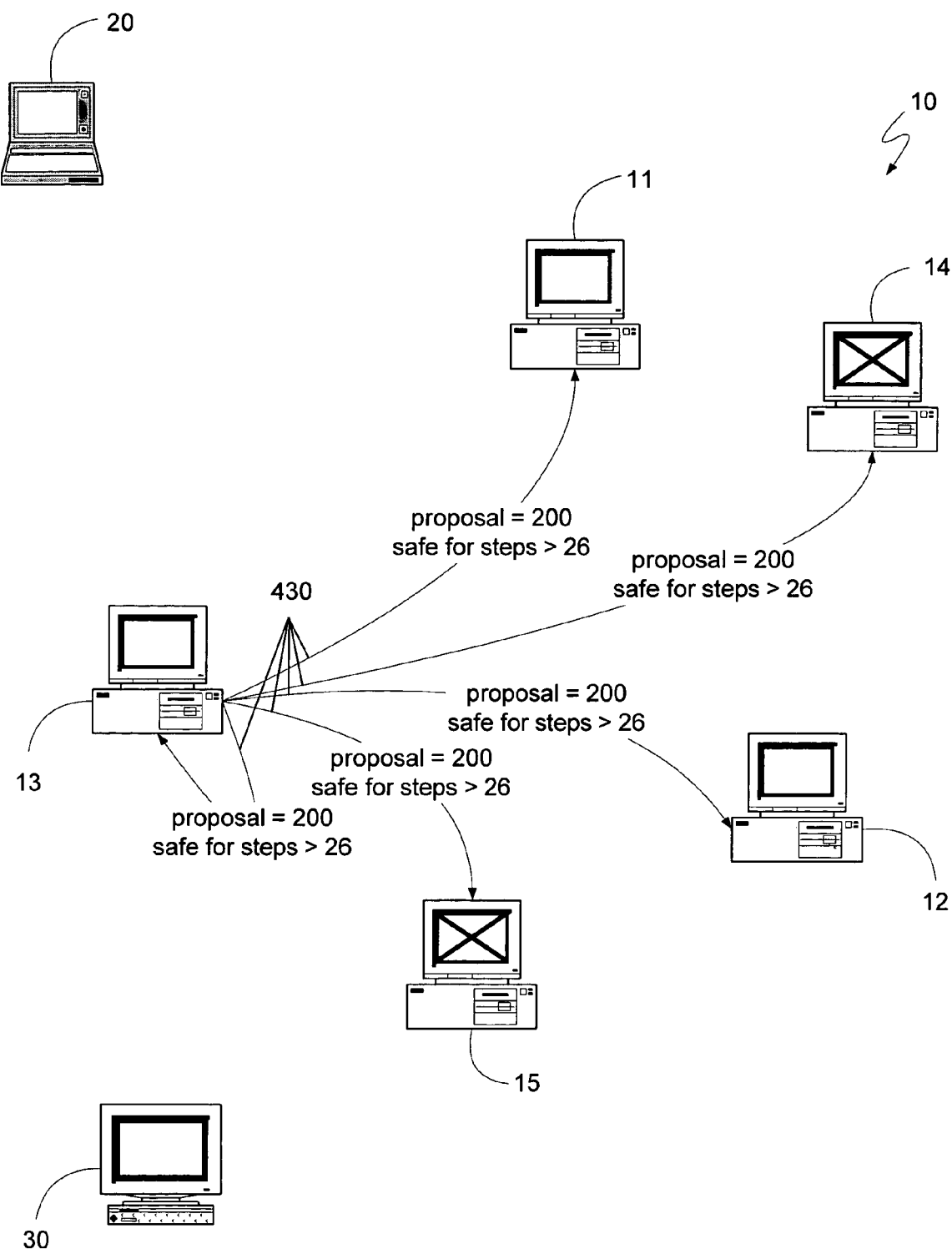

Turning to FIG. 5d, an initial step of the Fast Paxos algorithm is shown. Specifically, once the leader device 13 has determined an appropriate proposal number for which the leader is aware of no proposals having higher proposal numbers for any system step beyond the current system step, it can notify each of the devices that they should treat any further messages from client devices as a proposal, for a subsequent system step, having the determined proposal number. Thus, as shown in FIG. 5d, device 13 can send message 430 indicating that proposal number 200 is safe for all system steps greater than 26, indicating to the devices 11-15 that they should treat client requests as proposals of proposal number 200 for subsequent system steps.

Figure 6A:
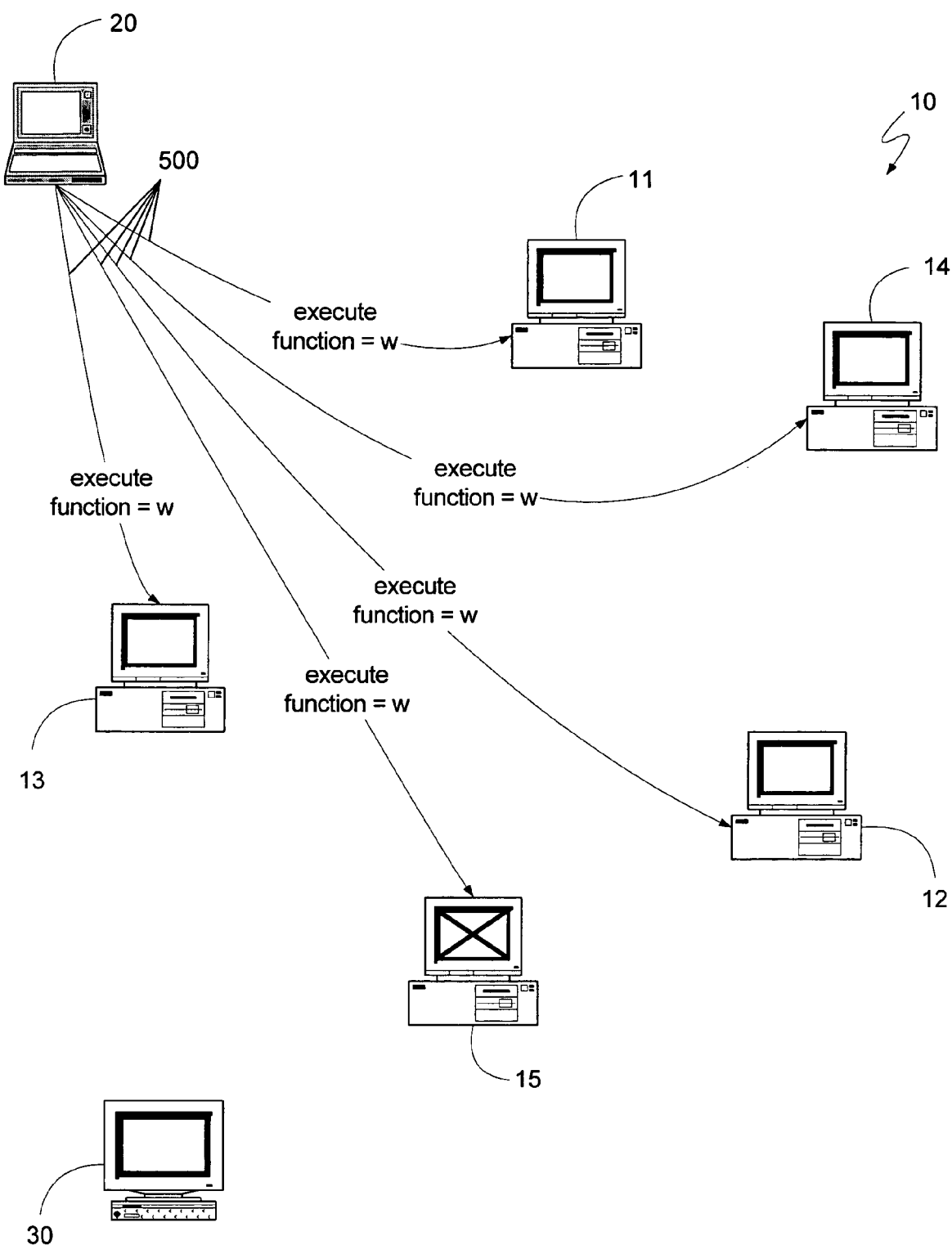
FIGS. 6a-b generally illustrate the operation of a message delay reducing consensus algorithm contemplated by an embodiment of the present invention.

Turning to FIG. 6a, the operation of the Fast Paxos algorithm is shown with reference to a request 500, from client 20 to the system 10. As can be seen, the client 20 sends request 500 directly to the devices 11-15, rather than sending it to a leader device, as was done with request 300. Each of the devices 11-15 can then treat the client's request as a proposal having a proposal number of 200 for a subsequent system step, which in the example illustrated in FIG. 6 would be step 27. Thus, each of the devices can determine whether the vote for the proposal based on any previous votes for step 27. Because, in the present example, none of the devices have voted for any other proposals, they can individually determine that the client's request of the execution of a function, represented by the variable "w" in FIG. 6a, is acceptable, and they can choose to execute the function "w".

Figure 6B:
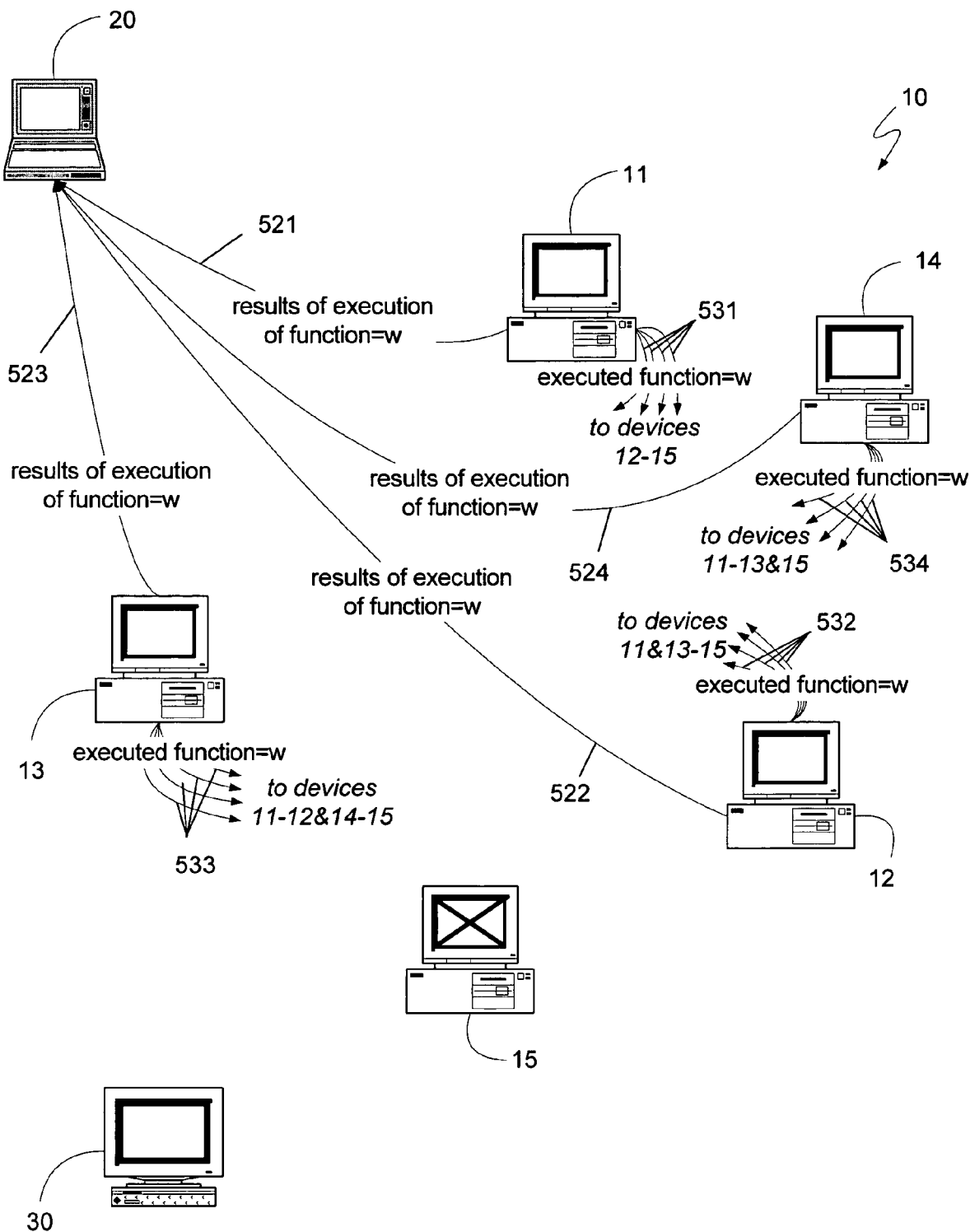

Therefore, as shown in FIG. 6b, devices 11-14 can determine that they should provisionally execute the function "w" and can return the results directly to the client 20 via messages 521-524. If a device, such as device 15, experiences a failure, it might not determine to provisionally execute the requested function or transmit results back to the client 20. However, once the client 20 receives responses from a quorum of devices, which in the exemplary environment of FIG. 6b is four devices, then the client 20 can know that the requested function was performed by the system 10, and can proceed to request another function for a further system step.

In a similar manner, each of the devices 11-14 shown in FIG. 6b can also send message 531-534 to all of the other devices, indicating that the device voted for the function "w". Therefore, once each of the devices receives votes from a quorum of devices, including that device's own vote, it can know that the function was selected by the system 10. In such a manner, some or all of the devices 11-15 can maintain a copy of the state of system 10.

As can be seen, the Fast Paxos algorithm allows devices to propose functions for execution by a distributed computing system, and receive responses without any intervening message delays. For example, as shown in FIGS. 6a and 6b, no messages were required to be sent between the transmission of the client's request 500 and the transmission of the results of the client's request 521-524. However, the Fast Paxos algorithm may operate properly only so long as a quorum of devices remains operational. Thus, if another device, such as device 14 in the example of FIGS. 6a and 6b, were to fail, the client 20 might not receive responses from a quorum of devices, and the system 10 may resort to using the standard Paxos algorithm, which can use fewer operational devices to achieve consensus, as explained in detail above.

Figure 7A:
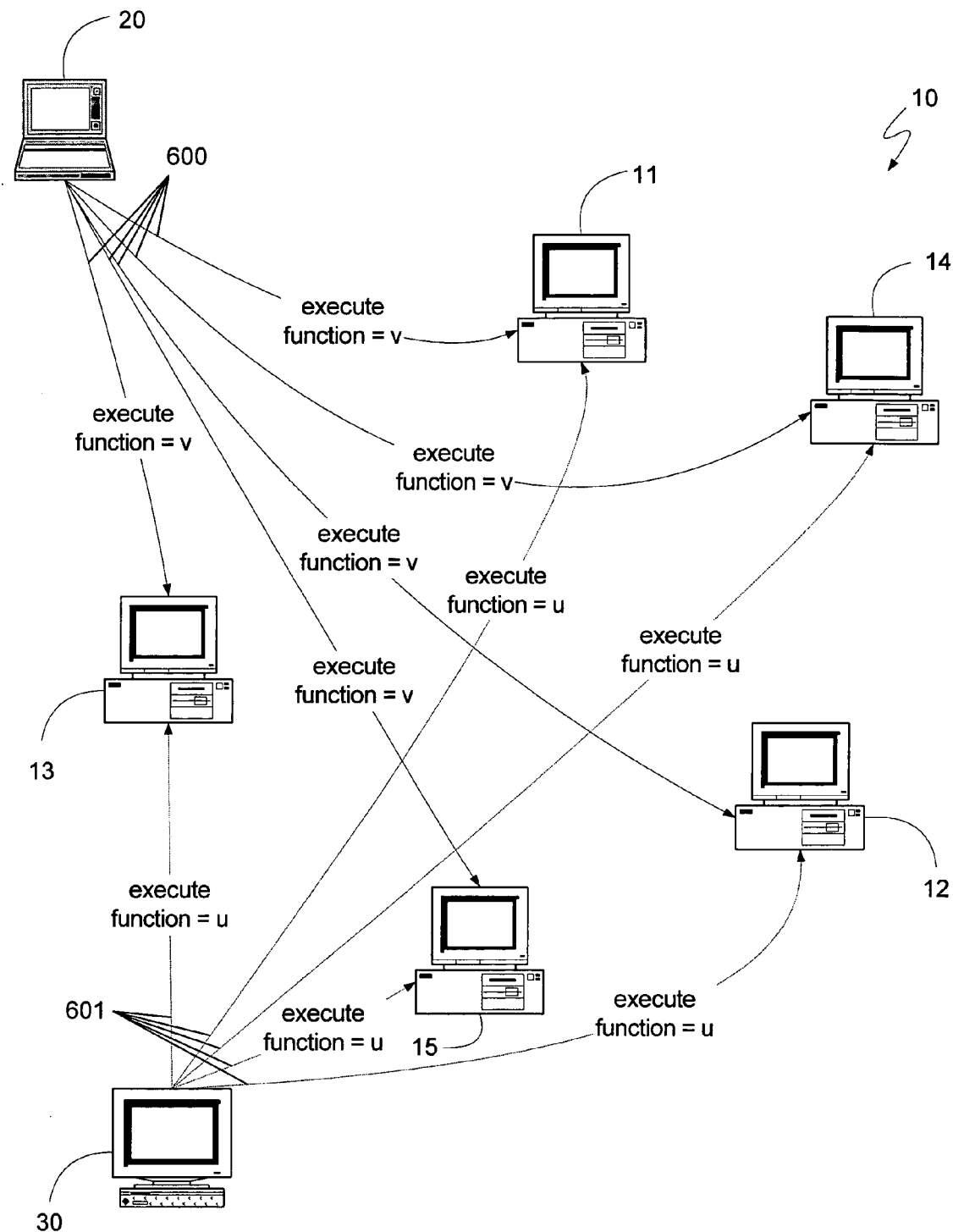
FIGS. 7a-b generally illustrate an alternative operation of a message delay reducing consensus algorithm contemplated by an embodiment of the present invention.

The Fast Paxos algorithm may also not operate properly if more than one client of the system 10 attempts to have the system execute a proposed function at approximately the same time. Turning to FIG. 7a, the client 20 is shown requesting that the system 10 execute a function, represented in the figure by the variable "v", by sending request message 600. However, at approximately the same time, device 30 also attempts to act as a client of the system 10 by sending request message 601, requesting that the system execute a function represented in the figure by the variable "u". Each of the messages 600 and 601 can arrive at the devices 11-15 at approximately the same time, with some devices receiving message 600 first, and other devices receiving message 601 first. Those devices that receive message 600 first may attempt to provisionally execute function "v", in the manner described above, while those devices that receive message 601 first may attempt to provisionally execute function "u" first.

Figure 7B:
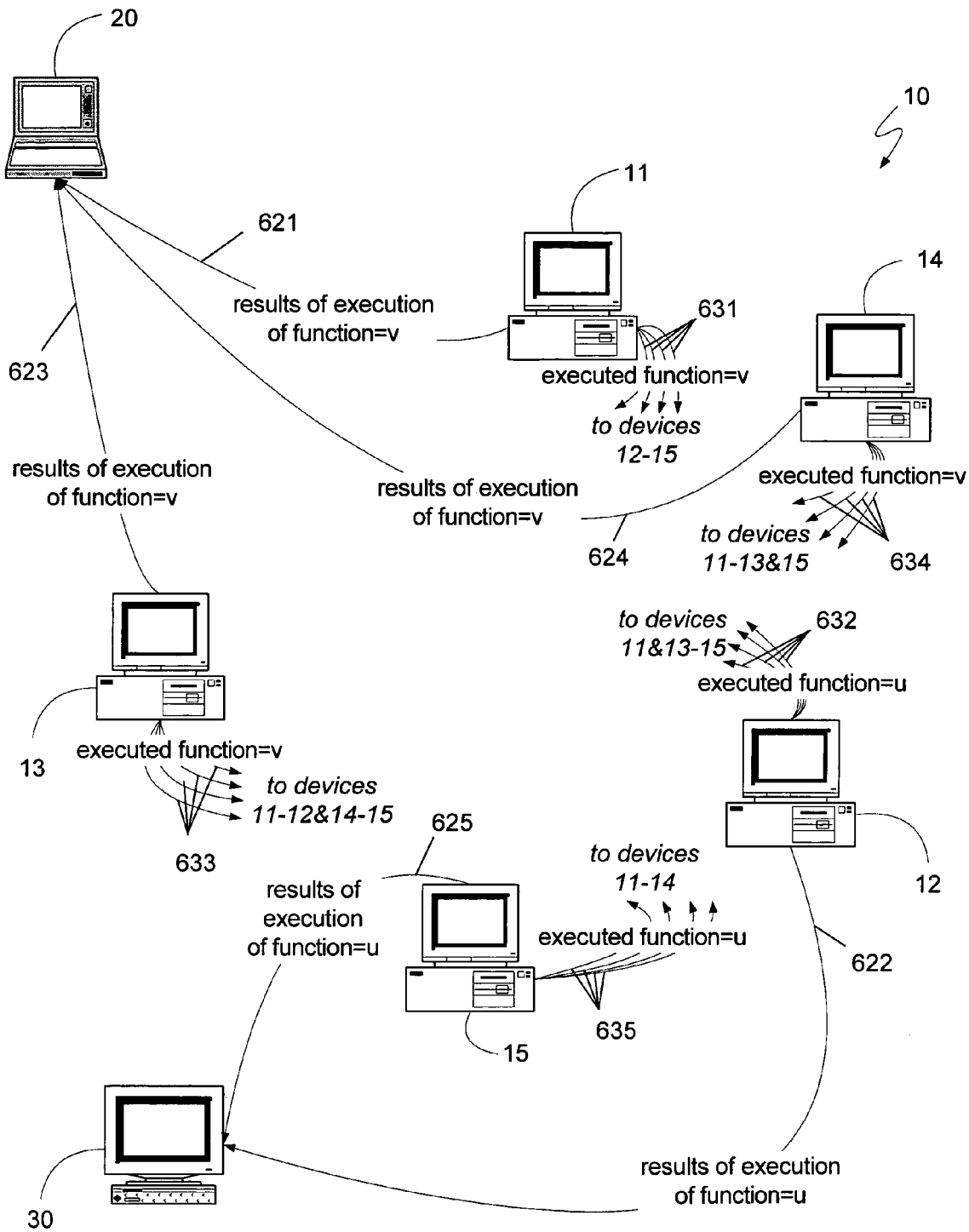

Turning to FIG. 7b, one possible outcome of the conflicting messages 600 and 601 is shown, with devices 11, 13 and 14 provisionally executing function "v" and devices 12 and 15 provisionally executing function "u". After devices 11, 13 and 14 provisionally execute function "v", they can send messages 621, 623 and 624 to client 20 providing the results of the execution of the function "v", and messages 631, 633 and 634 to the other devices informing them of the vote for function "v". Similarly, devices 12 and 15 can provisionally execute function "u" and send messages 622 and 625 to the device 30 providing the results of the execution of the function "u", and messages 632 and 635. As above, for the exemplary system 10 illustrated in the figures, a quorum of devices for the Fast Paxos algorithm can be four devices. Consequently, neither function "v" nor function "u" have been provisionally executed by a quorum of devices, and neither the client 20, nor the device 30, have received messages from a quorum of devices providing the results of the execution of their requested functions.

The Fast Paxos algorithm accounts for conflicts, such as the one illustrated in FIGS. 7a and 7b, by resorting to the standard Paxos algorithm, and learning which of the two functions may have been selected, and then attempting to achieve a consensus on that function. Thus, following the situation illustrated in FIG. 7b, a leader device could proceed with the first phase of the standard Paxos algorithm, in a manner analogous to that described above with reference to FIGS. 4a-4d. After the completion of the first phase, the leader could initiate the second phase of the standard Paxos algorithm, in a manner analogous to that described above with reference to FIGS. 4e-4g, to achieve a consensus on the proposals learned of during the first phase. Once the leader determined that no device in the system 10 had voted for any proposals for system steps greater than the current system step, it could send a message beginning another round of the Fast Paxos algorithm, in a manner analogous to that described above with reference to FIG. 5d.

As can be seen, in the event of conflicts, the Fast Paxos algorithm can, by performing the first phase of the standard Paxos algorithm, introduce more message delays than would have otherwise been present if the system 10 had been using the standard Paxos algorithm all along. Because conflicts can arise frequently in an environment in which more than once device may seek to act as a client, a reduced message delay consensus algorithm such as Fast Paxos may not provide the expected efficiencies unless it can continue operating properly in the face of conflicting client proposals.

Conflict Tolerant Reduced Message Delay Consensus Algorithm

Figure 8A:
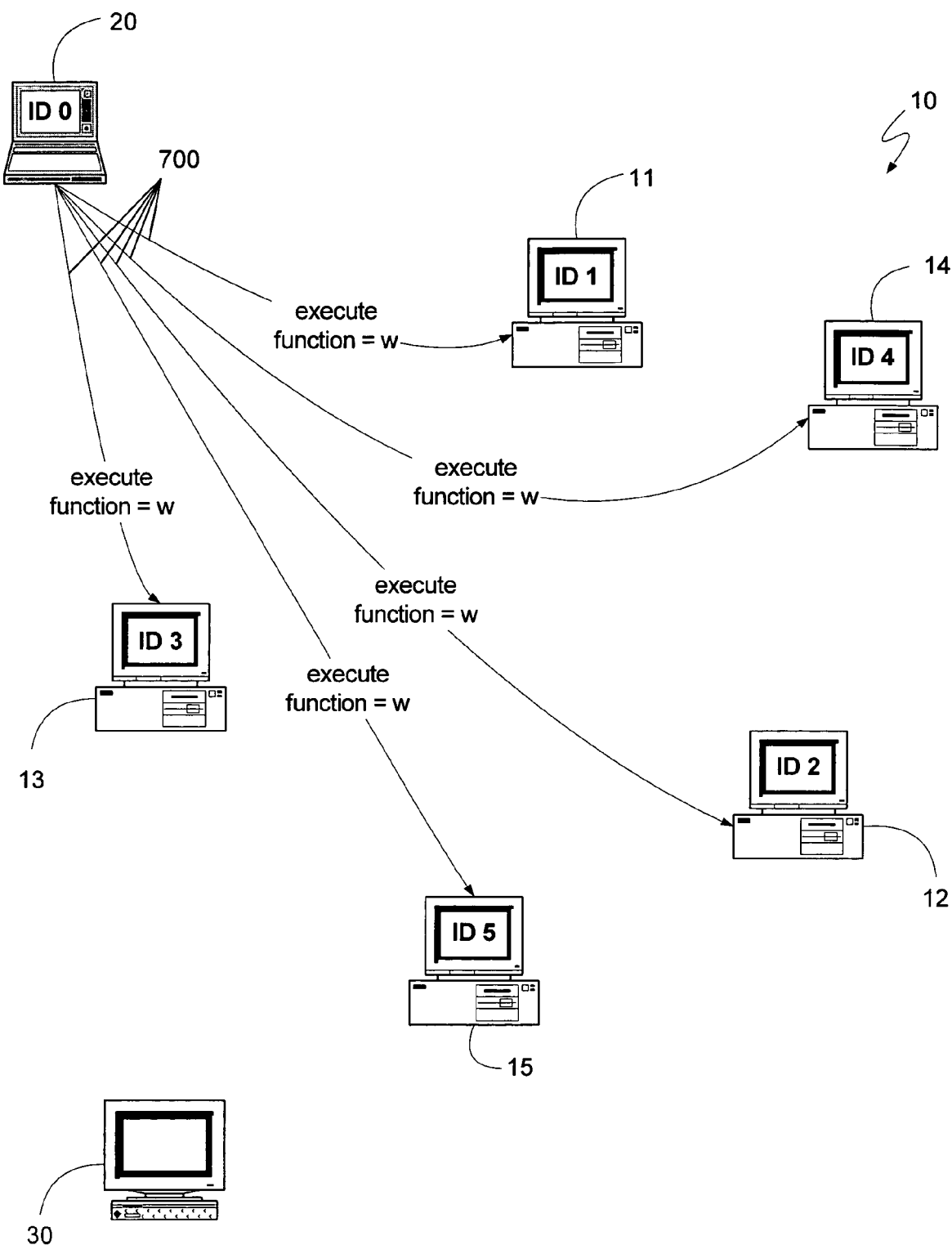
FIGS. 8a-b generally illustrate the operation of a conflict tolerant message delay reducing consensus algorithm contemplated by an embodiment of the present invention.

In one embodiment contemplated by the present invention, a system can implement a reduced message delay consensus algorithm that is conflict tolerant. Turning to FIG. 8a, an exemplary environment is shown comprising one client device 20, and additional devices 11-15 that are both the constituent devices of the distributed computing system 10, and can act as clients of the system 10. Furthermore, as shown, each of the devices 11-15 and the client 20 can be assigned a client identifier. In one embodiment contemplated by the present invention, the constituent devices of the system 10 essentially vote for a combination of a proposed function, and the particular device that proposed the function. Thus, while a device might vote for a proposed function from one device, it might not vote for the same proposed function if it was proposed by a different device. As will be shown in more detail below, a reference to the identifier of the device proposing the function can help provide conflict tolerance.

As will be known to those skilled in the art, the selection and assignment of client identifiers to the clients of the system 10 can occur through any number of mechanisms, and the embodiments of the present invention are not dependent upon, nor are they intended to be limited to, any particular mechanism. By way of example only, the class identifiers could be assigned through a registration process, such as with a central registration server. Alternatively, the class identifiers could be assigned based on unique properties of the devices, such as the exact time at which they joined the distributed computing system, their MAC address, or the like. Yet another alternative would be hard code identifiers into the software implementing the above described algorithms, or into particular hardware elements, such as the ROM 131, network interface 170, or the like.

Furthermore, as will be apparent to those skilled in the art from the following descriptions, the ordering of the client identifiers can be arbitrary. Thus, client identifiers can be ordered in the manner described below, with a numerically larger value client identifier being more dominant than a numerically lower value client identifier. Alternatively, a numerically larger value client identifier can be less dominant than a numerically lower value client identifier. Similarly, client identifiers of a particular type, such as beginning or ending with a particular value, can be more dominant than client identifiers that do not begin or end with the particular value. In whichever manner the client identifiers are ordered, the client identifier assigned to the client device 20, which does not also act as a device implementing the distributed system 10, can be the least dominant client identifier, such that the client identifiers assigned to devices 11-15 are all more dominant than the client identifier assigned to the client 20.

Figure 9A:
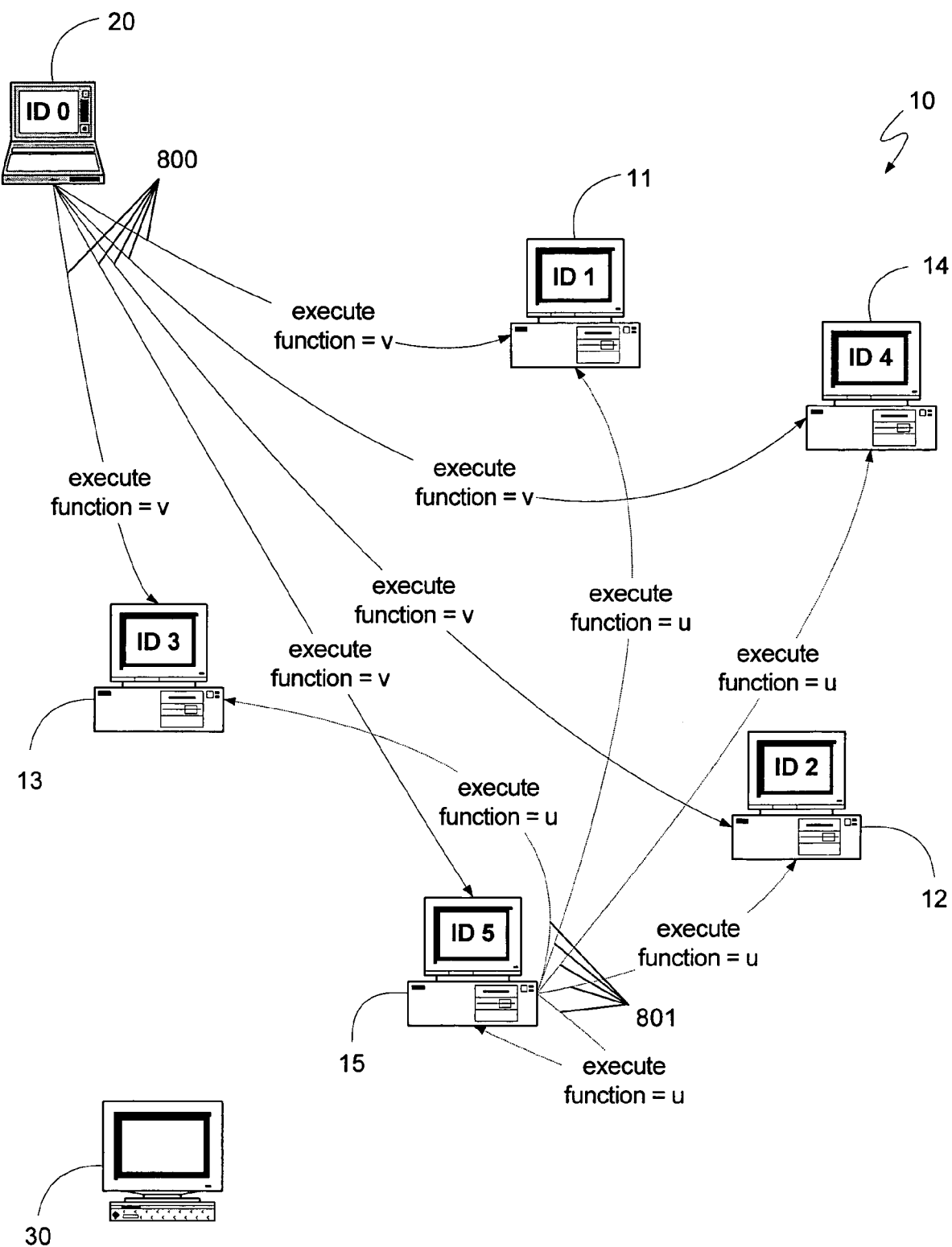
FIGS. 9a-c generally illustrate an alternative operation of a conflict tolerant message delay reducing consensus algorithm contemplated by an embodiment of the present invention.

Turning to FIG. 8a, a distributed computing system 10 is shown receiving a request 700, requesting that the system execute a function represented by the variable "w". To illustrate an operation of a conflict tolerant message delay reducing consensus algorithm contemplated by an embodiment of the present invention, the system 10 is shown in FIG. 8a in the same state as the system illustrated in FIG. 6a, and the client 20 is shown attempting to have the system 10 perform a function in a manner analogous to that illustrated in FIG. 6a. Similarly, the system of FIG. 9a is shown in the same state as the system of FIG. 7a. However, as will be made clear by the following description, the operation of a conflict tolerant message delay reducing consensus algorithm contemplated by an embodiment of the present invention is different from the Fast Paxos algorithm described with reference to FIGS. 6a-b and 7a-b which, as was illustrated above, cannot tolerate conflicts.

Once the devices 11-15 of the distributed computing system 10 receive the request 700 they can, in a manner analogous to that described above with reference to FIGS. 6a and 6b, treat the request 700 as a proposal having a proposal number which was previously determined, and which is sufficiently large such that no device had voted for any higher numbered proposal for any subsequent system step. Since none of the devices 11-15 have previously voted for any other proposal, they can vote for the proposal sent by client 20 in message 700.

Figure 8B:
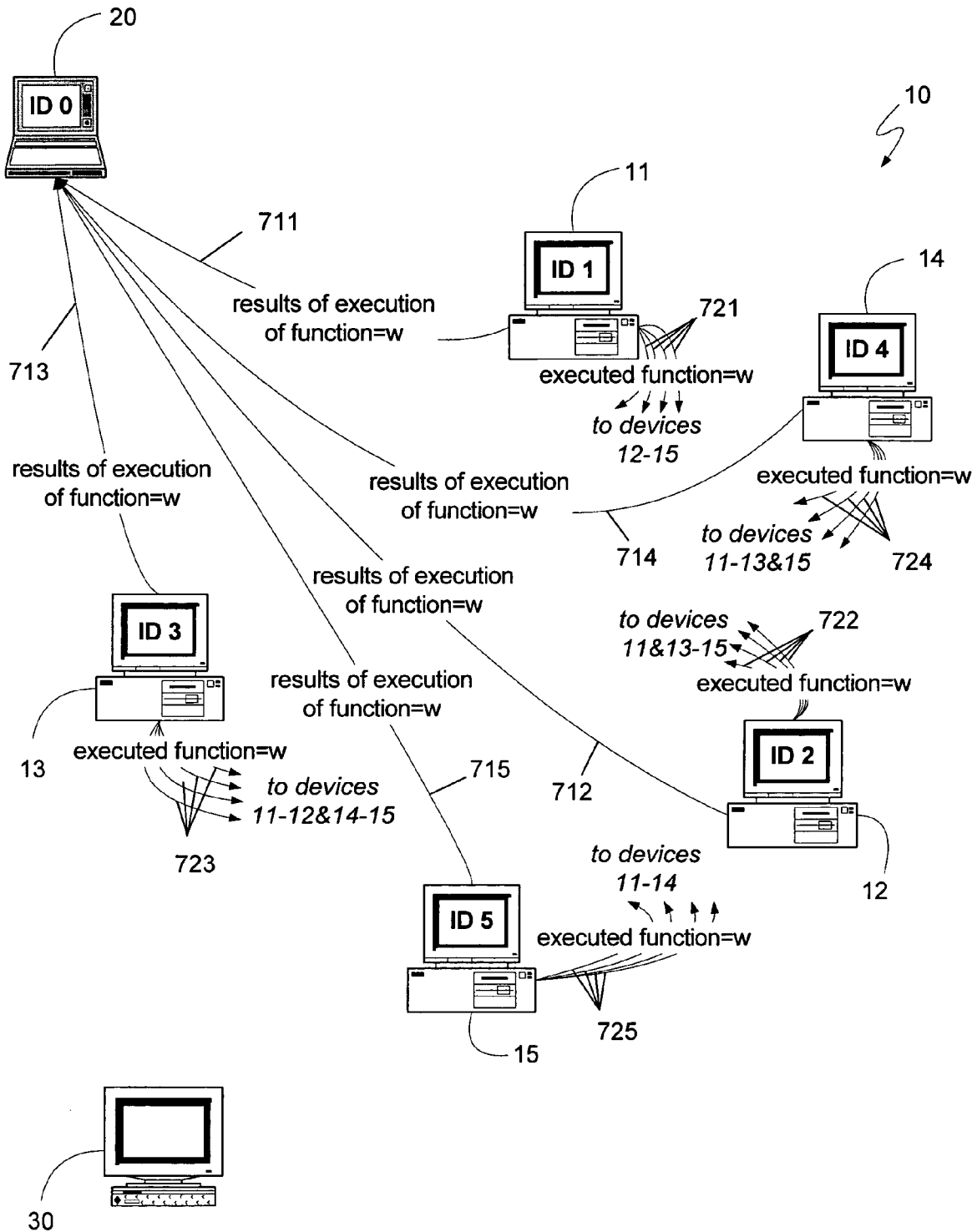

Turning to FIG. 8b, each of the devices 11-15 is shown voting for the function proposed by message 700 by provisionally executing the function "w" for step 27. Once the devices 11-15 have executed the requested function, they can transmit the results of that execution back to the client 20 via messages 711-715. Because each of the devices 11-15 of the distributed computing system 10 executed the function "w", and provided the results to the client 20, the client can know that the system 10 has executed the function, and can proceed to propose another function for a subsequent system step.

Similarly, the devices 11-15 can also each send messages, such as messages 721-725, to each of the other devices of the system 10, informing the other devices of the decision to vote for function "w". Thus, for example, device 11 can send a message 721 to devices 12-15, as shown in FIG. 8b, to inform those devices that device 11 has voted for function "w". Once a device determines that all of the devices in the system 10 have voted for the same function, then the device can know that the system 10 has selected the proposed function. For example, as shown in FIG. 8b, device 15 has voted for function "w" and it can receive messages 721-724 indicating that devices 11-14 have also voted for function "w". Consequently, device 15 can know that the system 10 has selected function "w". In such a manner, device 15 can maintain a copy of the state of the system 10. Other devices can also maintain a copy of the system in a similar manner. For example, FIG. 8b illustrates an environment in which all of the devices 11-15 implementing the distributed computing system 10 also maintain a copy of the state of the system 10.

To illustrate the conflict tolerant nature of one embodiment contemplated by the present invention, FIG. 9a illustrates a conflict between a request 800 by the client 20 to execute a function represented by the variable "v", and a request 801 by the device 15, acting as a client, to execute a function represented by the variable "u". Messages 800 and 801 can be sent at approximately the same time, and each of the devices 11-15 can receive either message 800 or message 801 first, depending on various factors, including network load, network transmission paths, and the like. As explained above, with reference to FIGS. 7a and 7b, whichever message a device receives first is likely to be the message that the device will vote for.

Figure 9B:
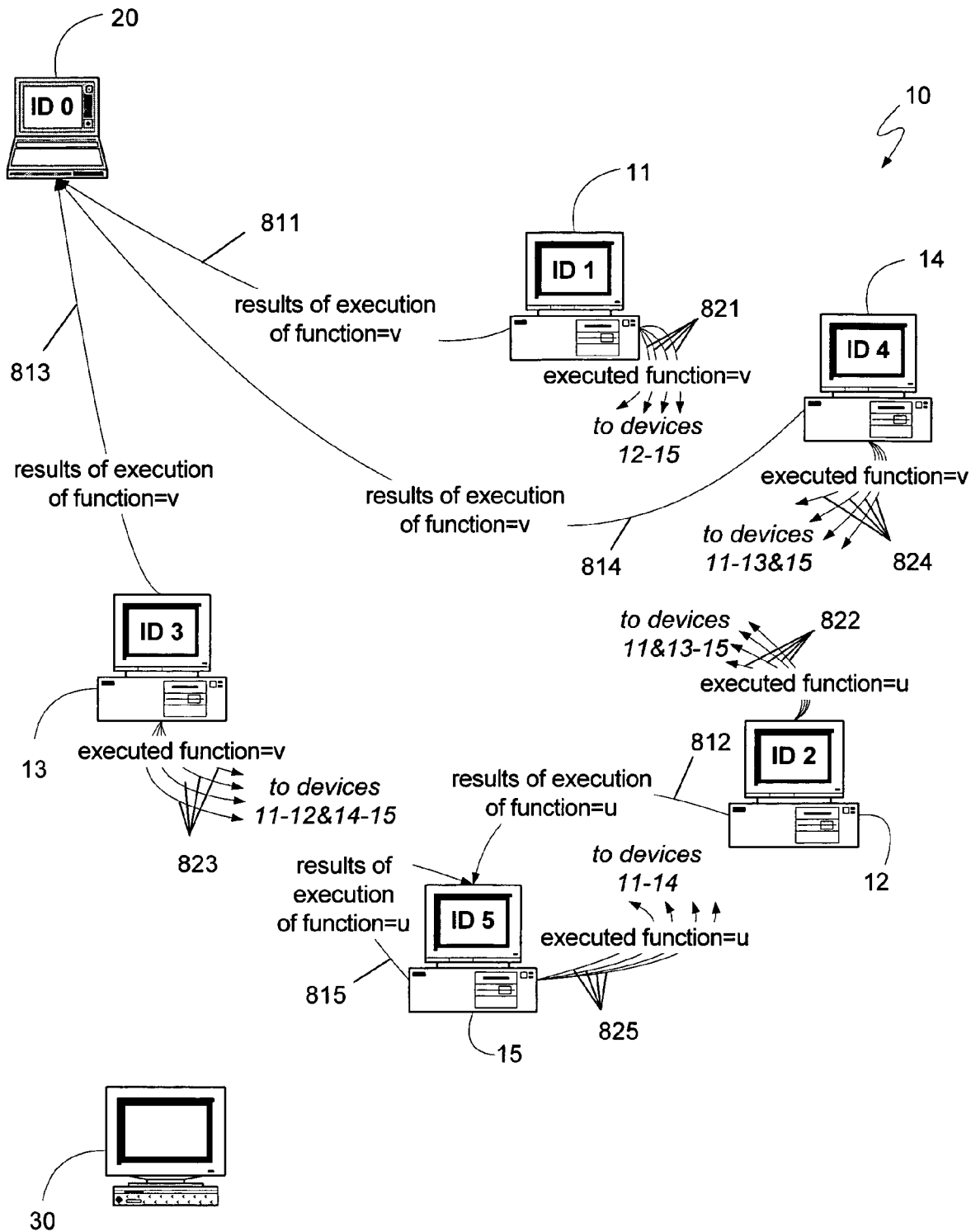

Therefore, turning to FIG. 9b, in the illustrated example, devices 11, 13 and 14 may have received message 800 before receiving message 801. In such a case, the devices 11, 13 and 14 may have voted for the proposal contained in message 800 before receiving message 801. Thus, as shown in FIG. 9b, devices 11, 13 and 14 provisionally execute the function "v" and return the results of the execution of that function to the client 20 via messages 811, 813 and 814. In a similar manner, devices 12 and 15 may have received message 801 prior to receiving message 800. Consequently, devices 12 and 15 may have voted for the proposal contained in message 801 before receiving message 800 and, as illustrated in FIG. 9b, may have provisionally executed the function "u" and sent the results of the execution of that function to device 15 via messages 812 and 815. As explained above, devices 11-15 can also send messages to one another informing each other of the function they have voted for. Thus, devices 11, 13 and 14 can send messages 821, 823 and 824 and devices 12 and 15 can send messages 822 and 825 informing the other devices of their votes.

As can be seen, the situation illustrated in FIG. 9b is analogous to that illustrated in FIG. 7b which, as was described in detail above, resulted in a conflict that was resolved by ending the Fast Paxos algorithm and reverting to the standard Paxos algorithm. However, in a conflict tolerant message delay reducing consensus algorithm contemplated by an embodiment of the present invention, such conflicts can be resolved without resorting to consensus algorithms that may introduce additional message delays. As stated above, the identifier of the client proposing a function can be used to resolve conflicts. For example, message 800 could contain not only information relevant to the proposed function "v", but also an indication that the function was being proposed by a client having a client identifier of zero. Alternatively, client identifier information can be included in message headers or similar data provided by lower level networking protocols. In a like manner, message 801 can contain information indicating that it was proposed by a client having an identifier of five. The client identifier information can then be used by each device to determine whether to vote for a new function, in essence changing its previous vote, or whether to keep its current vote.

In one embodiment of the present invention, devices can provisionally vote for, and provisionally execute, proposed functions and can subsequently change their vote if they receive a proposal from a client having a more dominant client identifier than the client that sent the first proposal. As explained above, a more dominant client identifier can depend on the ordering scheme selected for client identifiers, and does not necessarily mean merely a larger numerical value. As also explained above, any ordering scheme can be selected to implement embodiment contemplated by the present invention. Nevertheless, in the exemplary numbering and ordering scheme illustrated in FIGS. 9a-c, a client identifier having a numerically higher value is also a more dominant client identifier.

Returning to FIG. 9a, devices 11, 13 and 14 can have received both messages 800 and 801 proposing functions "v" and "u", respectively. As illustrated in FIG. 9b, those devices may have received message 800 prior to message 801, and can have already provisionally executed the function "v" and provided the results of that execution to the client 20. However, once they receive message 801, they can compare the device identifiers of the client 20, which had sent message 800, and the device 15, which, acting as a client, had sent message 801. Upon performing such a comparison, each of the devices 11, 13 and 14 can determine that the device 15, acting as a client, has a more dominant client identifier than client 20 because, in the present example, client 20 has a client identifier of zero, while device 15, acting as a client, has a client identifier of five, and the client identifiers have been ordered such that client identifiers of a numerically higher value are more dominant. Because message 801 contains a proposal from a client having a more dominant client identifier than the client that sent the proposal in message 800, the devices 11, 13 and 14 can determine that they should change their votes and vote for the proposal of message 801.

Figure 9C:
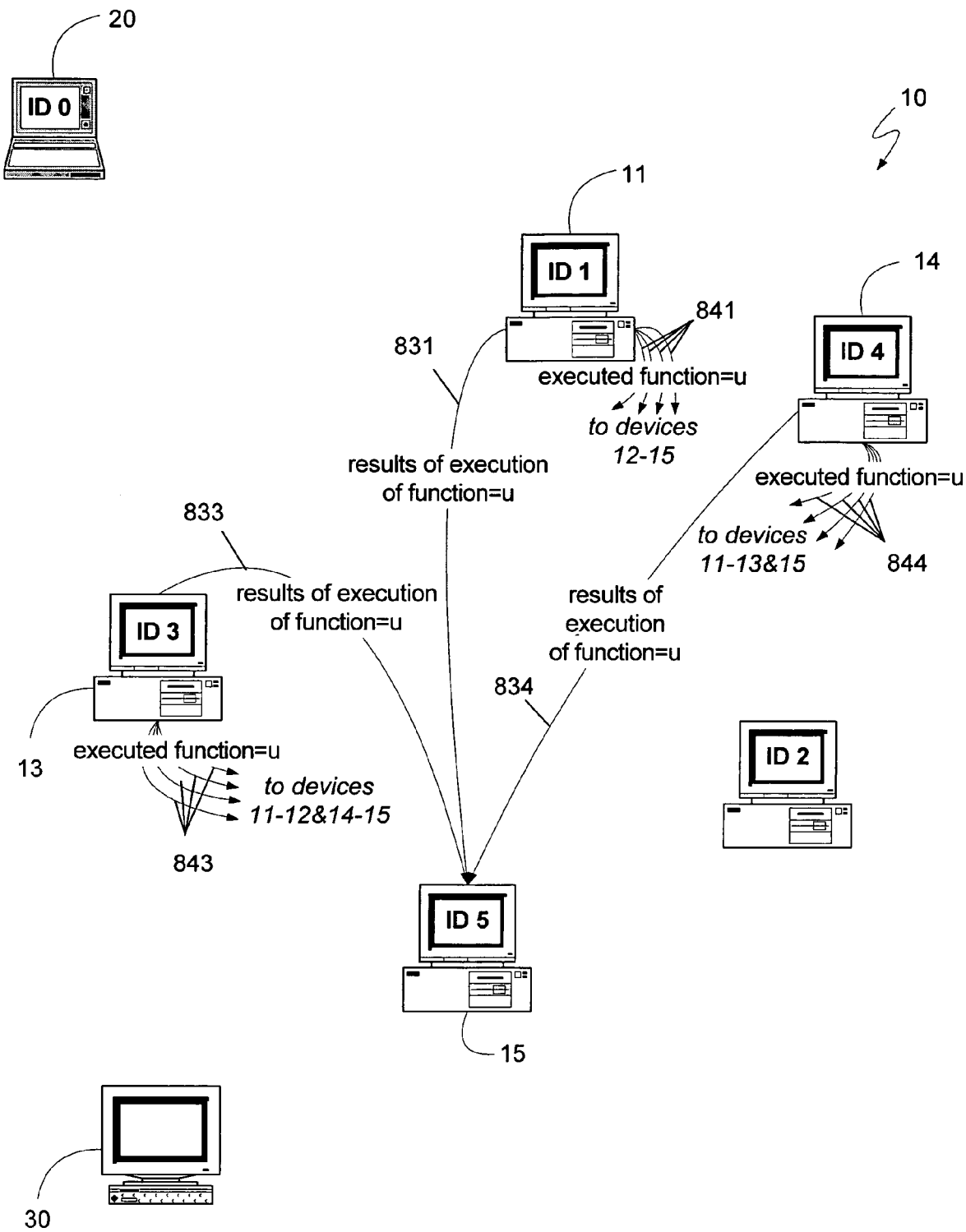

Turning to FIG. 9c, devices 11, 13 and 14 can undo the provisional execution of function "v", and perform the function "u", which was proposed by message 801. They can then send messages 831, 833 and 834 to device 15 providing the results of the execution of function "u". As stated above, devices 11, 13 and 14 can also each provide an indication to the other devices of the system 10 that they have now voted for the function "u". Thus, as shown in FIG. 9c, devices 11, 13 and 14 can each send messages, such as messages 841, 843 and 844, to the other devices of the system 10 informing them of the new vote for function "u", enabling each device to independently maintain a copy of the state of the system 10.

Devices 11, 13 and 14 may or may not explicitly perform a step that undoes the execution of function "v" prior to changing their vote and executing function "u". For example, if the function was to store some element of data, the storage could be undone by actively clearing or deleting the data. However, one alternative contemplated by an embodiment of the invention, is to provisionally execute a function in such a manner that a further action may be required to complete the execution. Thus, for example, devices 11, 13 and 14 could have provisionally executed function "v" in such a manner that the execution did not become permanent until a subsequent confirmation was made. Thus, to undo the provisional execution of function "v", devices 11, 13 and 14 may not need to perform any explicit action, but can simply not confirm the provisional execution of function "v", allowing its provisional execution to expire and, thereby, become undone.

Once device 15 has received a response indicating the results of the execution of the proposed function "u" from every device in the system 10, it can be assured that the system 10 has executed the function "u". Thus, device 15 received responses from devices 12 and 15, as shown in FIG. 9b, and from devices 11, 13 and 14, as shown in FIG. 9c, and it can determine that the system 10 has executed its proposed function. As can be seen, a quorum of devices must be all of the devices of the distributed computing system.

Because each device can provisionally execute a proposed function, and can subsequently provisionally execute a different proposed function, one mechanism for providing for a final determination by the system 10 contemplated by an embodiment of the present invention, is to allow only those devices that have not already voted to propose functions. Consequently, once all of the devices of the system 10 have voted for a proposal, the only device that could still propose another proposal would be the client 20. However, because the client 20 can have a less dominant client identifier than any of the devices 11-15, no device would change its vote because of another proposal from the client 20. Therefore, once all of the devices of the system 10 have voted for a proposal, the client that submitted the proposal can be assured that the proposal was selected and executed by the distributed computing system, and that no other proposal can be selected.

Figure 10A:
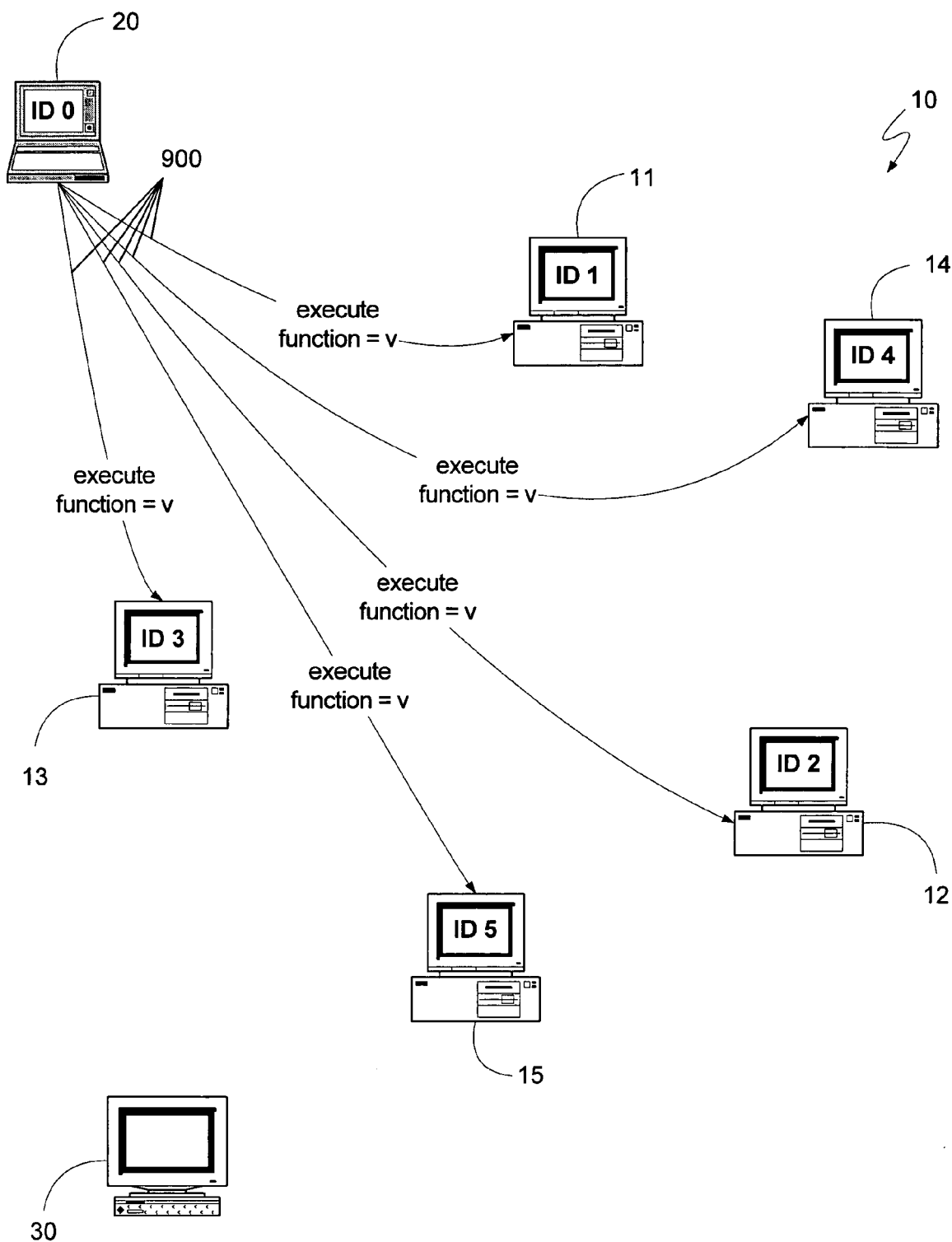
FIGS. 10a-d generally illustrate another alternative operation of a conflict tolerant message delay reducing consensus algorithm contemplated by an embodiment of the present invention.
Figure 10B:
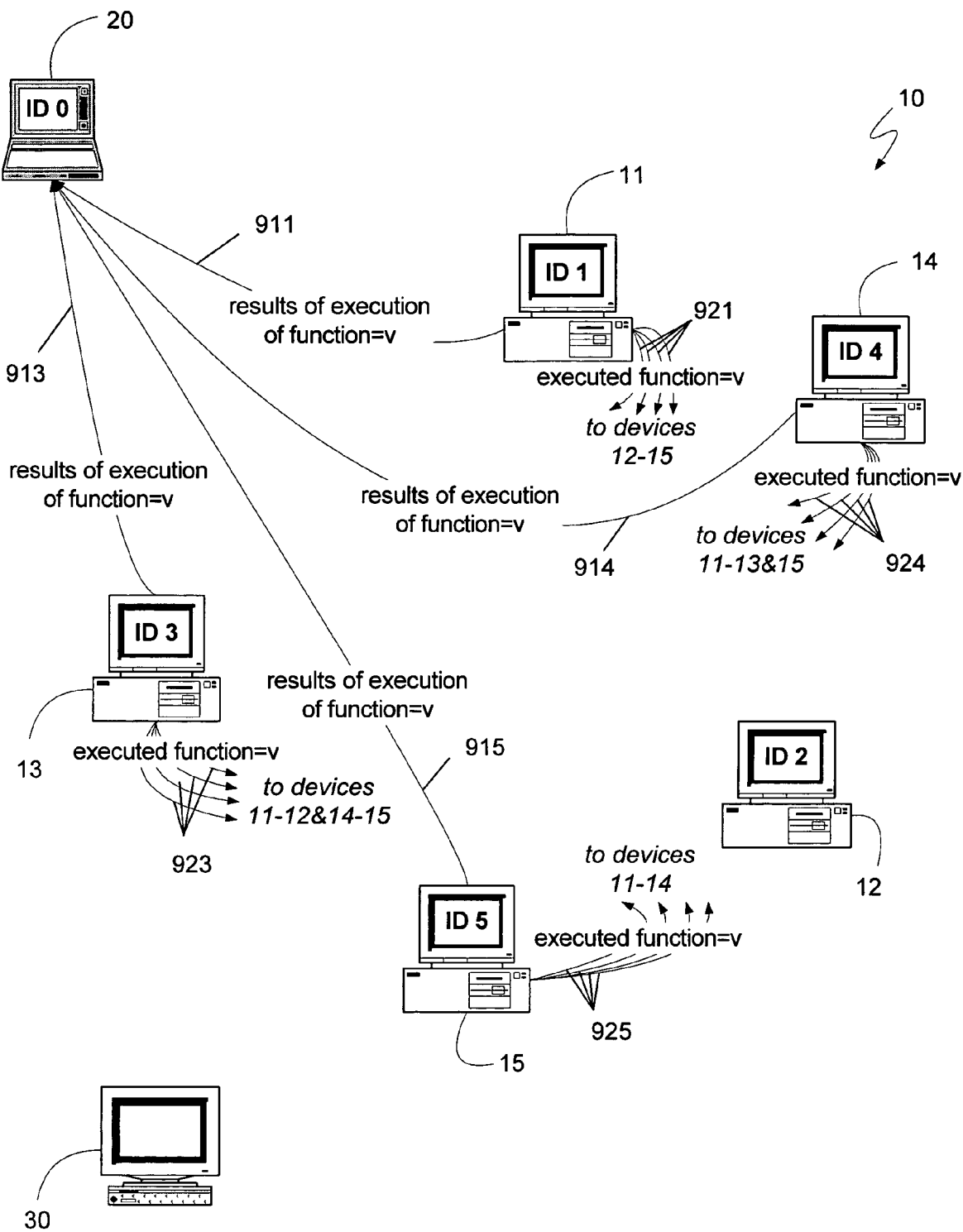
Figure 10C:
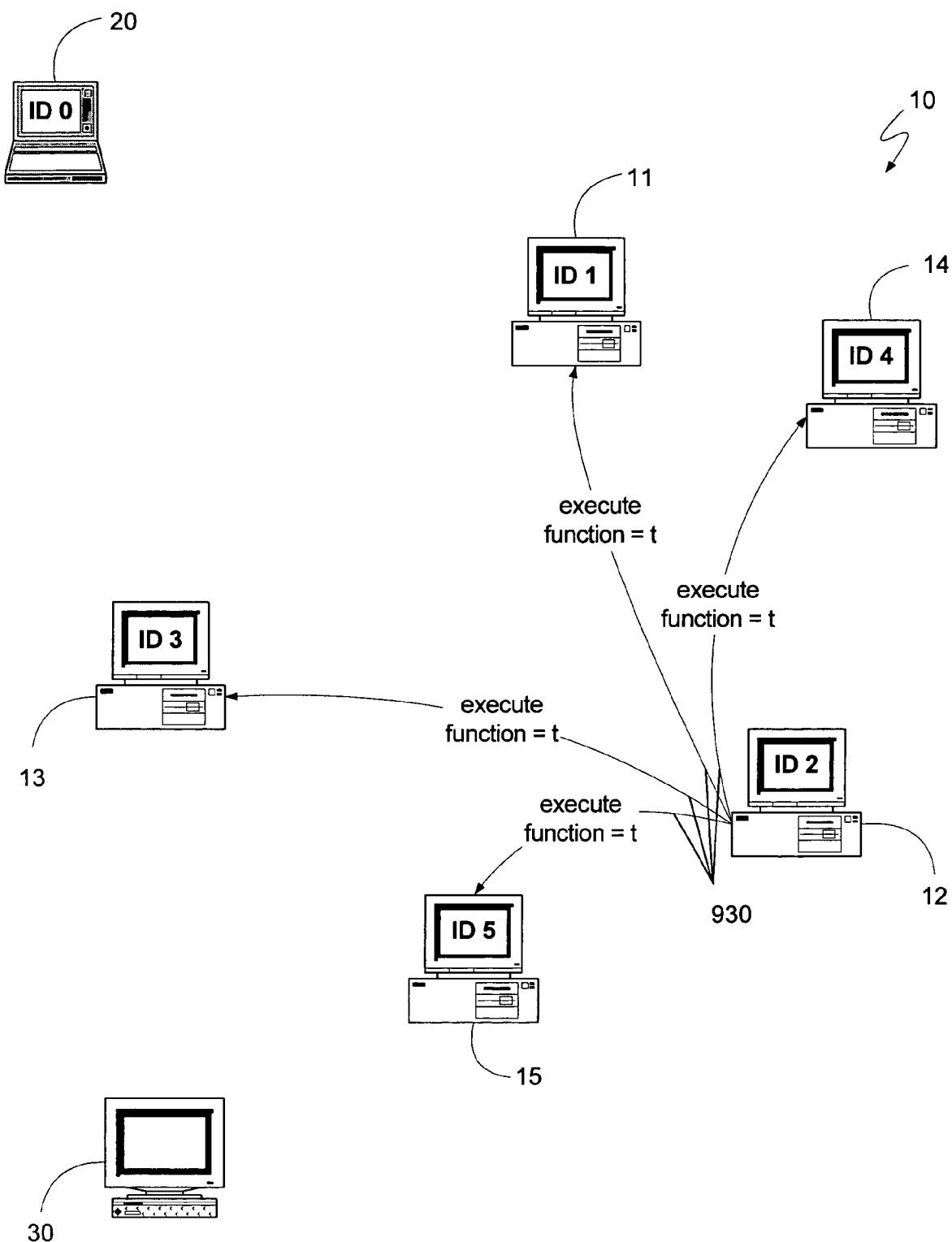
Figure 10D:
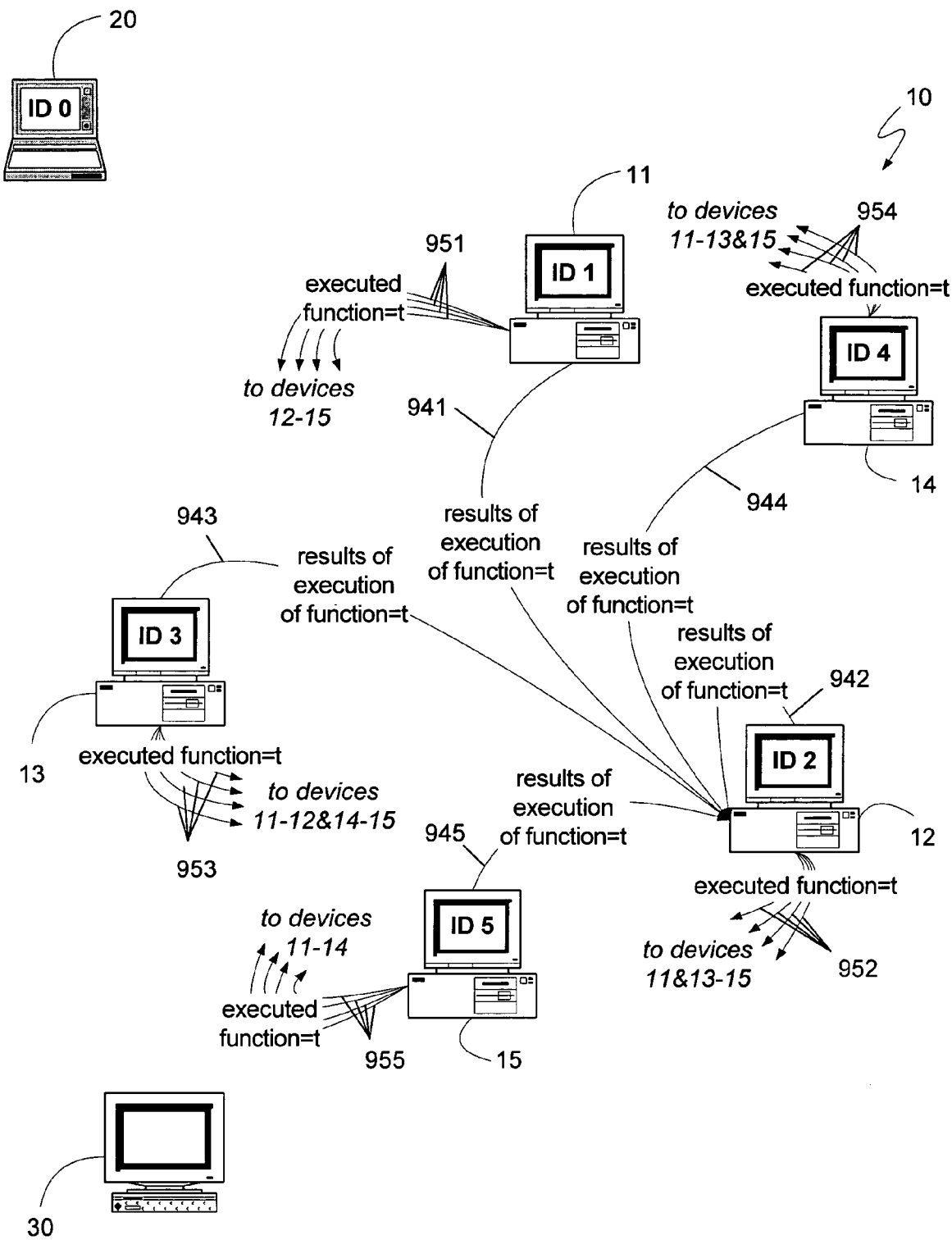
Figure 11A:
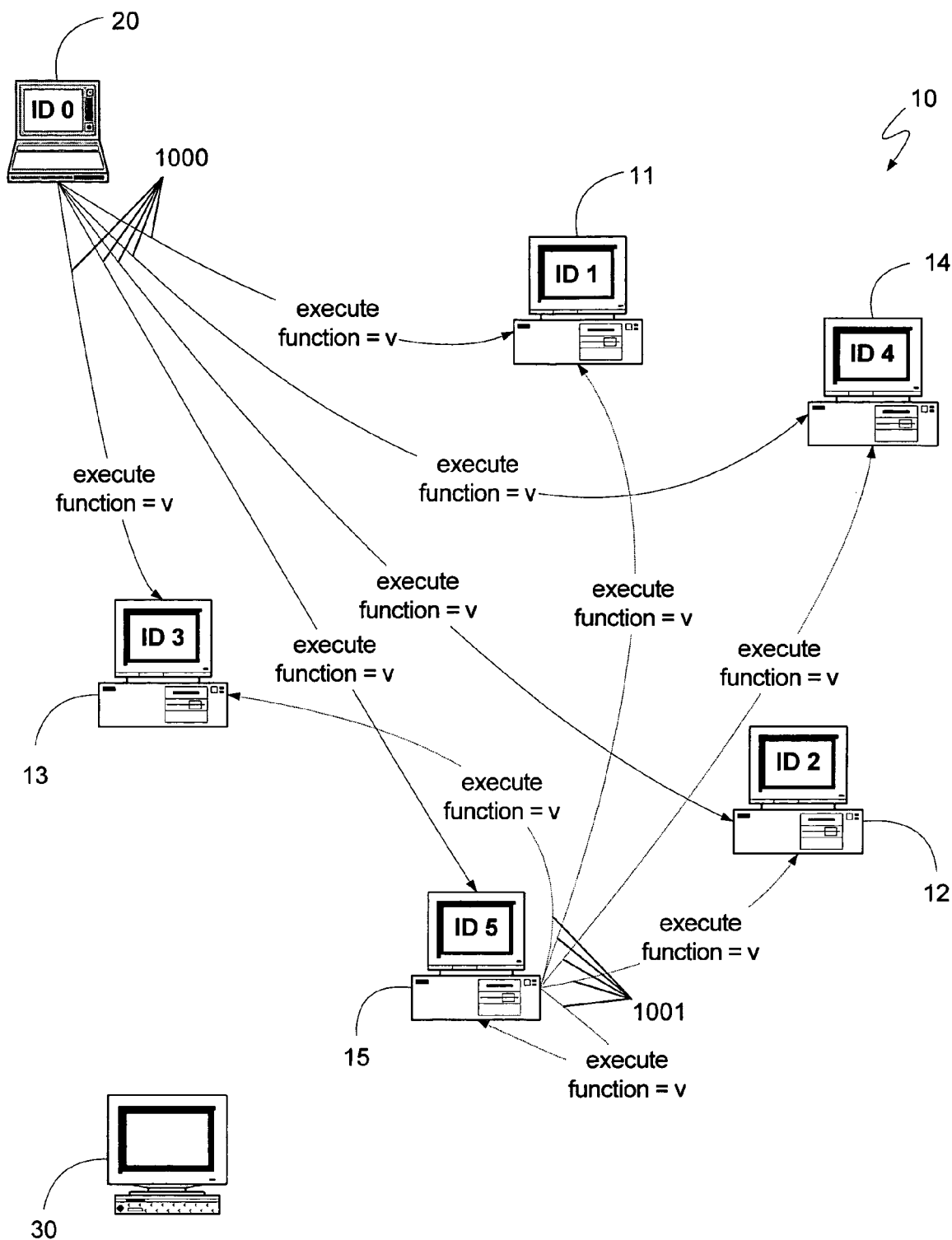
FIGS. 11a-e generally illustrate yet another alternative operation of a conflict tolerant message delay reducing consensus algorithm contemplated by an embodiment of the present invention.

To further demonstrate an embodiment of the present invention, FIGS. 11a through 10d illustrate two proposals occurring at different points in time. As described in detail above, conflicts can be tolerated by enabling devices to change their votes. However, by allowing such flexibility, one device can change the state of the system even if it sends its proposal after an earlier proposal, by a different device, has already been received, voted upon, and provisionally executed by some devices. For example, turning to FIG. 10a, which illustrates the exemplary environment comprising system 10, client 20, and device 30 shown in previous figures, the client 20 can again attempt to have the system 10 execute the function "v", as that function was not executed in the previous round illustrated by FIGS. 9a-9c. Thus, in a manner analogous to that described previously, the client 20 can send a message 900 to the devices 11-15 of system 10 requesting that they execute function "v".

Turning to FIG. 10b, devices 11 and 13-15 can determine to vote for the execution of function "v", and can provisionally execute the function and provide the results of the execution of that function to the client 20 via messages 911 and 913-915. Additionally, devices 11 and 13-15 can indicate their vote for the function "v" to the other devices of system 10 via messages 921 and 923-925, as shown. However, as also shown in FIG. 10b, device 12 may choose to not vote for the function "v". Device 12, for example, may have determined that the next function which should be executed by the system 10 is a function represented by the variable "t". Therefore, turning to FIG. 10c, device 12 can, even after receipt of request 900, send a message 930, requesting that the system 10 execute the function "t". When each of the devices 11 and 13-15 receives the message 930, they can, in a manner analogous to that described above, determine the client identifier of device 12 acting as a client, and compare it to the client identifier for the client 20. In the example illustrated in FIG. 10c, each of the devices 11 and 13-15 can determine that message 930 was sent by a client having a client identifier of two, while message 900 was sent by a client having a client identifier of only zero. Consequently, even though devices 11 and 13-15 have already voted for and provisionally executed function "v", they can now determine to vote for function "t" because function "t" was proposed by a client having a more dominant client identifier than the identifier of the client that proposed function "v".

Therefore, turning to FIG. 10d, each of the devices 11 and 13-15 can undo function "v" and provisionally execute function "t", and then send messages 941-945 to device 12 indicating the results of the execution of function "t". Additionally, devices 11-15 can send messages 951-955 to each of the other devices, indicating their vote for the function "t". As was described above, devices 11 and 13-15 may or may not necessarily perform an active step to undo function "v". Because each of the devices has now voted for and provisionally executed the proposed function, device 12, acting as a client, can determine that the system 10 has selected and executed function "t". Similarly, any of the devices 11-15 can also determine that the system 10 has selected and executed function "t" and can, thereby, maintain a current copy of the system's state.

As described above, because a device acting as a client may not propose a function for the current system step after it has already voted for a function for the current step, a client that has received messages from all of the devices in a system can determine that no other proposal from clients having higher client identifiers can be made. Consequently, once a client has received messages from all of the devices in the system, it can determine that no other function can be selected . . . Therefore, as shown in FIG. 10d, once device 12 received messages 951-955, it can determine that the function it proposed has been selected. Conversely, client 20 could not make such a determination at the exemplary stage illustrated in FIG. 10b because it had not received a message from device 12, meaning that device 12, acting as a client, could still propose an alternative function and change the vote of devices 11 and 13-15.

Because clients can operate independently, one embodiment contemplated by the present invention can use function identifiers to allow the devices of the distributed computing system to avoid executing the same function multiple times, even when it is proposed by multiple clients, or over the course of multiple system steps. Such identifiers can be useful in situations where performing the same function multiple times can result in unintended circumstances. For example, if a distributed computing system were to implement a banking database, functions such as "remove $500 from account 12345" would result in an overcharge to the target account if they were executed multiple times.

Turning to FIG. 11a, the operation of system 10 when two clients of the system request the same function is shown according to one embodiment contemplated by the present invention. Specifically, as illustrated by the example shown in FIG. 11a, the client 20 and the device 15, acting as a client, can both request the execution of the function "v" via messages 1000 and 1001, respectively. Such a situation could arise from a number of possible circumstances. For example, device 15 could have been monitoring previously requested functions that were not executed and could, therefore, attempt to have the system 10 execute function "v" for client 20 while client 20 simultaneously also attempts to have the system 10 execute the same function. Alternatively, two devices, such as client 20 and device 15 can independently determine that the system should execute a given function, and can independently request the execution of that function, each unaware that the other device has also requested execution of the same function.

Figure 11B:
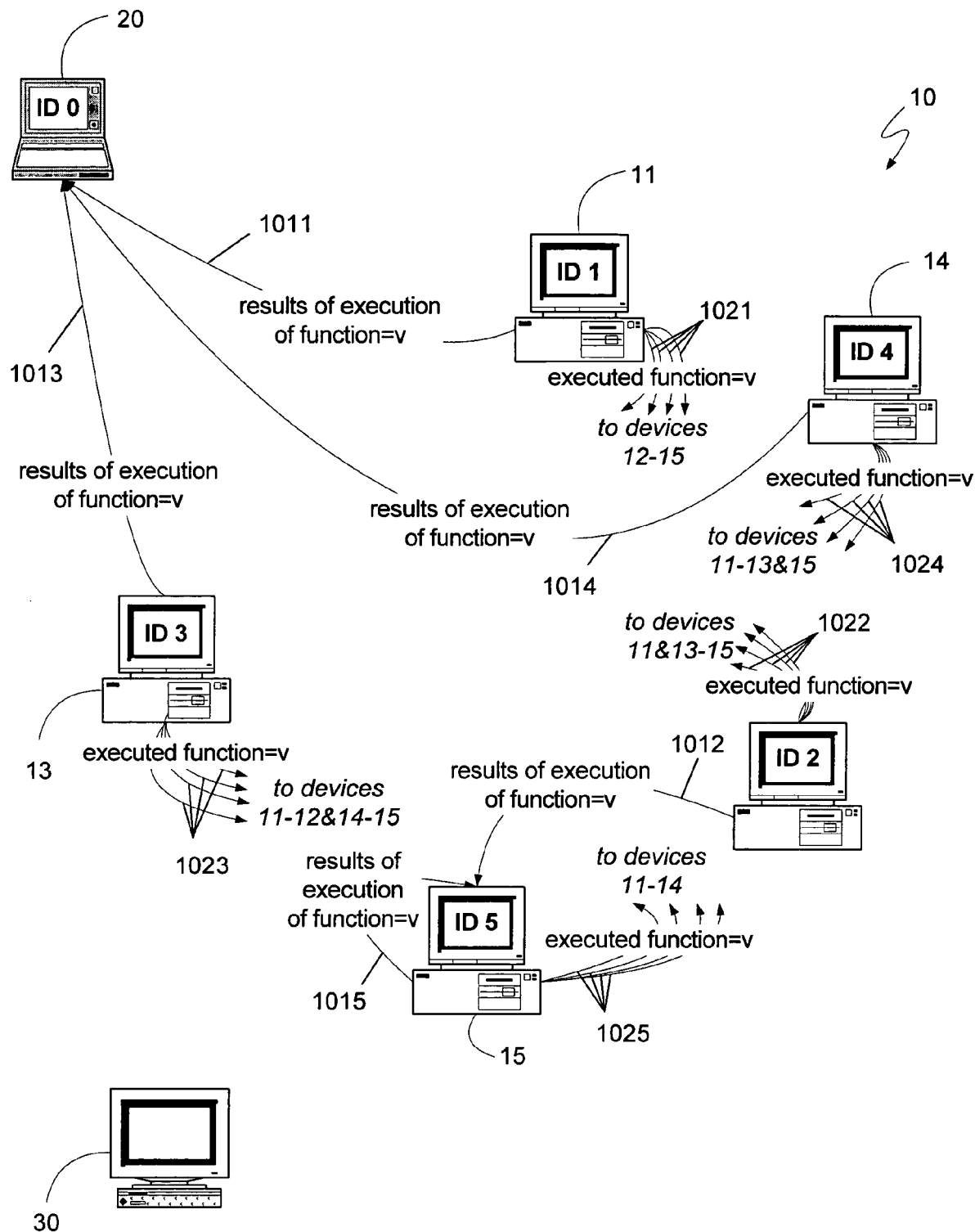

The devices 11-15 can treat messages 1000 and 1001 in a manner similar to that described above. For example, turning to FIG. 11b, in the exemplary environment illustrated, devices 11, 13 and 14 may have received message 1000 first and devices 12 and 15 may have received message 1001 first. Because both messages 1000 and 1001 requested the execution of the function "v", devices 11-15 can all determined that they would vote for the execution of function "v", and can provisionally execute it. Once devices 11-15 have provisionally executed the function "v", they can return the results to the client which requested the function. Since devices 11, 13 and 14 may have received message 1000 first, they can send their replies, 1011, 1013 and 1014, respectively, to the client 20. Devices 12 and 15, which may have received message 1001 first can send their replies 1012 and 1015 to device 15. In addition, devices 11-15 can each send a message to the other devices of the system 10 informing the other devices of the vote for function "v". Thus, as shown in FIG. 11b, devices 11-15 can exchange messages 1021-1025.

At some point in time, each of the devices 11-15 can receive the other message, of messages 1000 and 1001, which they did not receive originally. Thus, devices 12 and 15 can receive message 1000 and devices 11, 13 and 14 can receive message 1001. Upon receiving message 1000, devices 12 and 15 can compare the client identifiers of the client 20, which sent message 1000, and the device 15, acting as a client, which sent message 1001. As can be seen from the figure, the client identifier of client 20 is less dominant than the client identifier of device 15. Consequently, devices 12 and 15 need not perform any action. Conversely, upon receiving message 1001, devices 11, 13 and 14 can determine that the client identifier of device 15, acting as a client, is more dominant than device 20, and devices 11, 13 and 14 can determine that they should vote for the proposal of message 1001.

Figure 11C:
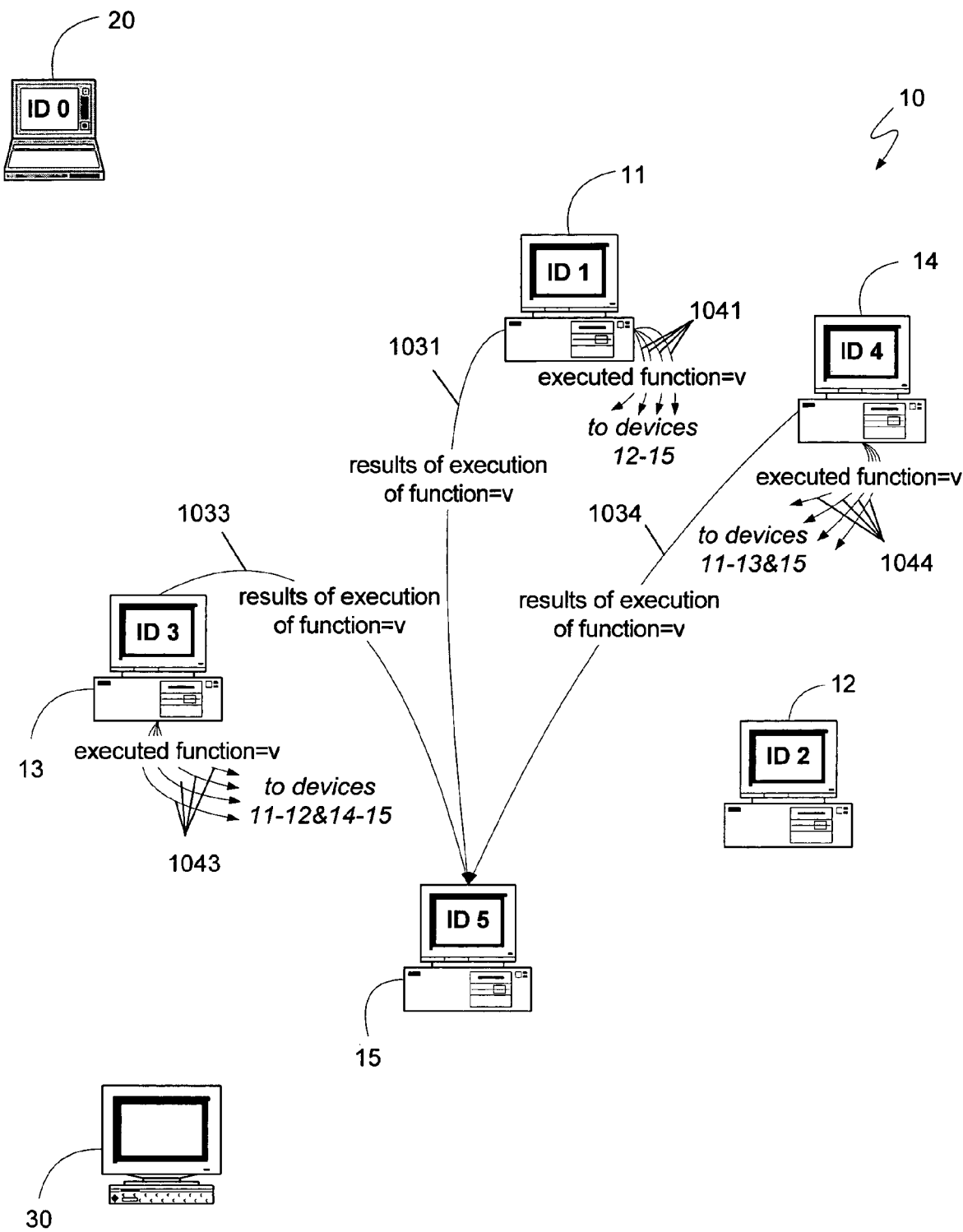

Turning to FIG. 11c, devices 11, 13 and 14 are shown transmitting the results of the execution of function "v" to the requesting client that sent message 1001, namely device 15 acting as a client. Although not specifically illustrated in the figure, requests 1000 and 1001 could have used function identifiers. As a result, devices 11,13 and 14 can determine that the function "v" requested by message 1001 is the same function as function "v" requested by message 1000. Furthermore, devices 11, 13 and 14 can determine that they have already executed the same function "v" requested by message 1001 in response to message 1000. Thus, without provisionally executing function "v" again, devices 11, 13 and 14 can send messages 1031, 1033, and 1034 to the device 15, which was the client that sent message 1001, transmitting the results of the execution of function "v". Having received messages from all of the devices in the system 10, device 15 can be assured that function "v" has been executed by the system. In addition, because devices can vote for a function-client identifier pair, devices 11, 13 and 14 can send messages 1041, 1043 and 1044 indicating that they have voted for the function "v" proposed by device 15 acting as a client. In such a manner the other devices can continue to maintain the system's state. In an alternative contemplated by an embodiment of the present invention, devices 11, 13 and 14 need not send messages 1041, 1043 and 1044, since their initial messages 1021, 1023 and 1024 could have been sufficient to enable each device to determine that the system 10 has executed the function "v" irrespective of which client had originally proposed the function.

Figure 11D:
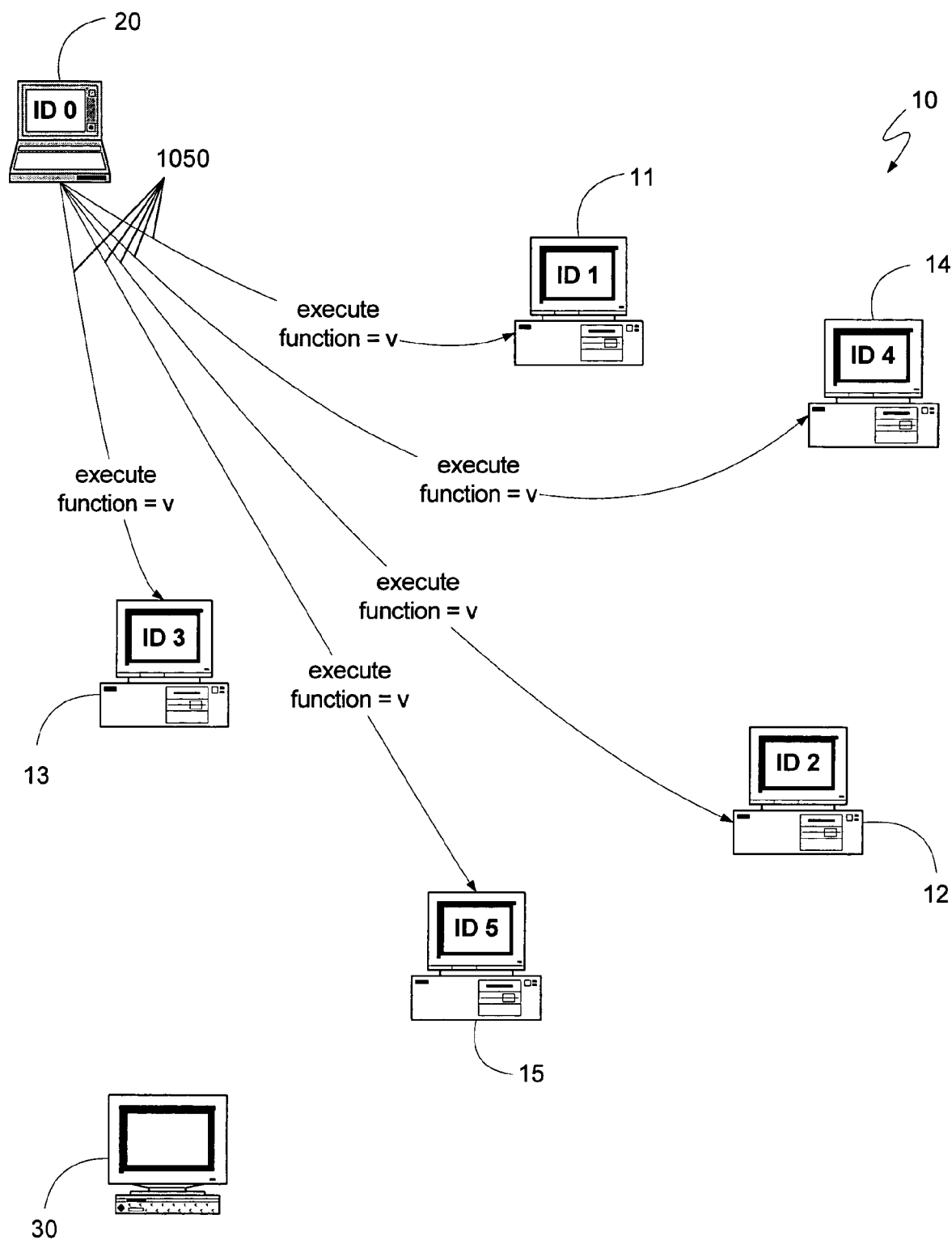

However, despite the exchange of messages described above, client 20 may still not know that function "v" has been executed. Consequently, client 20 can send another request 1050, as shown in FIG. 11d, again requesting that the system 10 execute the function "v". Each of the devices 11-15 can then determine, by reference to the function identifiers, that they have already provisionally executed function "v". Consequently, as before, devices 11-15 do not need to provisionally execute function "v" again and the system 10 may not have changed its state.

However, because each of the devices can have already received messages 1022, 1025, 1041, 1043 and 1044 from other devices indicating that each of the other devices of the system 10 has already provisionally executed function "v", each of the devices can know that the system 10 has already executed the function "v", and can inform the client 20. FIG. 1e illustrates messages 1061-1065 which any one or more of the devices 11-15 can send to the client 20 indicating that the function "v" has already been executed for a previous step, and also providing the results of the execution of the function "v". As will be known by those skilled in the art, a single device can send a message, such as the messages 1061-1065, to avoid redundancy. For example, the message could be sent by a leader device, or a device that, acting as a client, had previously requested the function, such as device 15.

In another alternative contemplated by an embodiment of the present invention, the distributed computing system may be operating in an environment in which functions are "idempotent". As will be known by those skilled in the art, an idempotent function can be a function that can be executed any number of times without causing unintended results. For example, if the system 10 were implementing a weather database, a function such as "enter the 1:00 pm temperature of location XYZ as 50 degrees" can be idempotent because such a function can be carried out multiple times and the net result will be the same as if the function was only carried out once: the database will contain a single entry for the 1:00 pm temperature of location XYZ, and it will be 50 degrees.

Figure 11E:
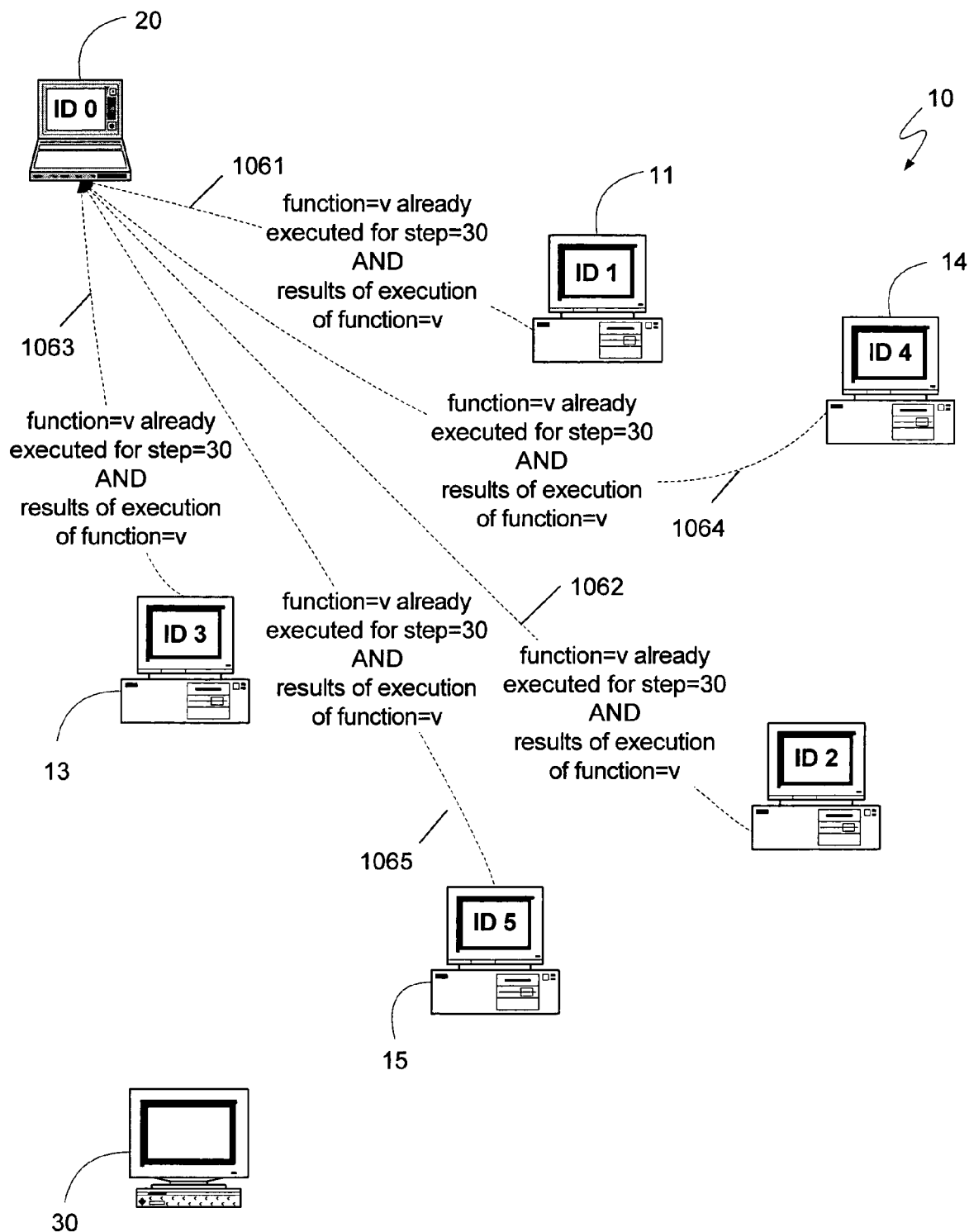

If a distributed computing system were operating in an environment in which each function was idempotent, then function identifiers need not be used. Thus, for example, if the function "v" referenced above in connection with FIGS. 11a through 11e were an idempotent function, the devices 11, 13 and 14 could simply have provisionally executed it again prior to sending messages 1031, 1033 and 1034, shown in FIG. 11c. Similarly, each of the devices 11-15 could have provisionally executed function "v" yet again prior to sending messages 1061-1065, shown in FIG. 11e.

As can be seen from the above descriptions, a distributed computing system can implement a conflict tolerant message delay reducing consensus algorithm by receiving votes from all of the devices in the distributed computing system. If one or more of the devices of the distributed computing system were to fail, however, it may not be possible to complete the conflict tolerant message delay reducing consensus algorithm described above because the requesting client might not receive messages from all of the devices. In such a case, the client, or any other device monitoring the system, could request that the system cease using the conflict tolerant message delay reducing consensus algorithm and use any alternative consensus algorithm. One example of a consensus algorithm that could be used is the standard Paxos algorithm described in detail above. Alternative consensus algorithms could also be used, as nothing about the above described conflict tolerant message delay reducing consensus algorithm requires the use of a particular consensus algorithm in the event of failures. However, as will be understood by those skilled in the art, the selection of which consensus algorithm to use in the case of failures can be based in part on the message delays introduced by the consensus algorithm, and can also be based in part on the ability of the consensus algorithm to tolerate failures among the devices implementing the distributed computing system.

Because a client of a distributed computing system may not be in a position to know if any other client has succeeded in having the system execute a requested function, a monitoring device can be used to determine when to initiate an alternative consensus algorithm, such as in the event of a failure of one of the devices of the distributed computing system. For example, in the environment illustrated in FIG. 11c, the device 30 can determine that device 15, acting as a client, has received responses from all of the devices 11-15 of the system 10, and that the system 10 is operating properly, even though client 20 did not receive responses from all of the devices 11-15. However, if one of the devices 11-15 had failed, such a failure could be detected by the monitoring device 30. In one embodiment contemplated by the present invention, device 30 can use a time-out mechanism, such that a device of the system 10 that has not responded to any request within a predetermined amount of time can be deemed to have failed. Alternatively, the device 30 can use an active monitoring system, such as pinging, or otherwise attempting to contact, a device that may have failed prior to determining that the device has, in fact failed.

Whichever mechanism is used to detect failures, once a failure is detected, device 30 can initiate a fault tolerant consensus algorithm by either joining the system 10 and attempting to implement the selected fault tolerant consensus algorithm, or by instructing one of the devices 11-15, of the system 10 to implement the selected fault tolerant consensus algorithm. For example, if device 30 had determined that device 12 had failed, it could contact device 15 and request that device 15 begin using a fault tolerant consensus algorithm, such as the Paxos algorithm described above. Device 15 could then act as the leader of the Paxos algorithm and poll the other devices for previous votes, in a manner analogous to that described in detail above. Once each of the remaining devices 11, 13 and 14 is contacted by device 15 implementing the standard Paxos algorithm, the devices 11, 13 and 14 can cease operation using the conflict tolerant message delay reducing consensus algorithm and can use the fault tolerant consensus algorithm being used by device 15. Such a halt to the conflict tolerant message delay reducing consensus algorithm can be implemented irrespective of which fault tolerant consensus algorithm is used.

To ensure that the distributed computing system does not select and execute one function using a conflict tolerant message delay reducing consensus algorithm, and then execute a different function for the same system step using a fault tolerant consensus algorithm, the fault tolerant consensus algorithm selected in case of failures can include a step that polls the devices of the distributed computing system for their last vote. Any individual device can be selected for polling, or a group, or even all of the devices can be polled. Once a device is polled, it can refrain from casting any further votes in the conflict tolerant message delay reducing consensus algorithm. As a result of polling one or more devices in this fashion, a function that may have been executed by the distributed computing system using the conflict tolerant algorithm can be determined by learning of the functions provisionally executed by the polled devices. If the last vote of all polled devices was for the same function, then that function may have been executed. Otherwise, no function can have been executed.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for selecting a value in a distributed computing system using a fault tolerant consensus algorithm, the method comprising:
   receiving at a computing device from a first client a first message comprising a first proposed value and a first client identifier corresponding to the first client;
   provisionally voting at the computing device for the first proposed value;

transmitting from the computing device a first indication of the provisional voting for the first proposed value to one or more devices;

transmitting from the computing device a first result of the provisional voting for the first proposed value to the first client, wherein the voting for the first proposed value, the transmitting the first indication of the voting for the first proposed value, and the transmitting the first result are not performed if a second message had previously been received at the computing device from a second client, the second message comprising a second proposed value and a second client identifier corresponding to a second client, the second client identifier being more dominant than the first client identifier, and the second proposed value having been previously provisionally voted for;

receiving a message, the message being part of a fault tolerant consensus algorithm;

ignoring additional proposed values from the first client; and participating in the fault tolerant consensus algorithm, wherein participating in the fault tolerant consensus algorithm comprises transmitting a possibly selected proposed value if a proposed value was previously voted for, and wherein the possibly selected proposed value was previously voted for and was proposed by a client having a most dominant client identifier among all clients whose proposals were received and who proposed values for a current system step.

2. The method of claim 1, wherein the first proposed value comprises a first function, and wherein the voting for the first proposed value comprises provisionally executing the first function in the first system step.

3. The method of claim 1, wherein the voting for the first proposed value comprises changing a previous vote for the second proposed value if the second proposed value was previously voted for and if the second client identifier is less dominant than the first client identifier.

4. The method of claim 1, wherein the first proposed value comprises a first function identified by a first function identifier, and wherein the voting for the first proposed value comprises executing the first function in the first system step unless the first function identifier is equivalent to a second function identifier that identifies a second function, wherein the second function was executed in a second system step that preceded the first system step.

5. The method of claim 1, wherein the first proposed value comprises a first idempotent function, and wherein the voting for the first proposed value comprises executing the first idempotent function in the first system step even if the first idempotent function is equivalent to a second idempotent function that was executed in a second system step that preceded the first system step.

6. The method of claim 1 further comprising:

transmitting one or more polling messages to initiate a fault tolerant consensus algorithm;

receiving one or more vote indication messages in response to the one or more polling messages; and selecting, as a third proposed value, any value if the one or more vote indication messages indicate that at least one device has not previously voted or if the one or more vote indication messages indicate two or more different possibly selected proposed values, or selecting, as the third proposed value, a common possibly selected proposed value if all possibly selected proposed values indicated by the one or more vote indication messages are equivalent to the common possibly selected proposed value, wherein a possibly selected proposed value was previously voted for by a device and was proposed by a client having a most dominant client identifier among all clients whose proposals were received by the device, and wherein further the third proposed value is proposed using the fault tolerant consensus algorithm.

7. A computer-readable storage medium having computer-executable instructions stored thereon that, if executed by a computing system, cause the computing system to perform operations comprising:

receiving at a computing device from a first client a first message comprising a first proposed value and a first client identifier corresponding to the first client;

provisionally voting at the computing device for the first proposed value;

transmitting from the computing device a first indication of the provisionally voting for the first proposed value to one or more devices;

transmitting from the computing device a first result of the provisional voting for the first proposed value to the first client, wherein the voting for the first proposed value, the transmitting the first indication of the voting for the first proposed value, and the transmitting the first result are not performed if a second message had previously been received at the computing device from a second client, the second message comprising a second proposed value and a second client identifier corresponding to the second client, the second client identifier being more dominant than the first client identifier and the second proposed value having been previously voted for, and receiving a message, the message being part of a fault tolerant consensus algorithm;

ignoring additional proposed values from the first client; and participating in the fault tolerant consensus algorithm, wherein participating in the fault tolerant consensus algorithm comprises transmitting a possibly selected proposed value if a proposed value was previously voted for, and wherein the possibly selected proposed value was previously voted for and was proposed by a client having a most dominant client identifier among all clients whose proposals were received and who proposed values for a current system step.

8. The computer-readable storage medium of claim 7, wherein the first proposed value comprises a first function, and wherein the voting for the first proposed value comprises provisionally executing the first function in the first system step.

9. The computer-readable storage medium of claim 7, wherein the voting for the first proposed value comprises changing a previous vote for the second proposed value if the second proposed value was previously voted for and if the second client identifier is less dominant than the first client identifier.

10. The computer-readable storage medium of claim 9, wherein the second proposed value comprises a second proposed function, and wherein the changing the previous vote comprises undoing a previous execution of the second proposed function.

11. The computer-readable storage medium of claim 9, wherein the second proposed value comprises a second proposed function, and wherein the changing the previous vote comprises allowing a previous provisional execution of the second proposed function to expire.

12. The computer-readable storage medium of claim 7, wherein the first proposed value comprises a first function identified by a first function identifier, and wherein the voting for the first proposed value comprises executing the first function in the first system step unless the first function identifier is equivalent to a second function identifier that identifies a second function, wherein the second function was executed in a second system step that preceded the first system step.

13. The computer-readable storage medium of claim 7, wherein the first proposed value comprises a first idempotent function, and wherein the voting for the first proposed value comprises executing the first idempotent function in the first system step even if the first idempotent function is equivalent to a second idempotent function that was executed in a second system step that preceded the first system step.

14. The computer-readable storage medium of claim 7 having further computer-executable instructions stored thereon that, if executed by a computing system, cause the computing system to perform operations comprising:
   transmitting from the computing device one or more polling messages to initiate a fault tolerant consensus method;
   receiving at the computing device one or more vote indication messages in response to the one or more polling messages; and
   selecting, as a third proposed value, any value if the one or more vote indication messages indicate that at least one device has not previously voted or if the one or more vote indication messages indicate two or more different possibly selected proposed values, or selecting, as the third proposed value, a common possibly selected proposed value if all possibly selected proposed values indicated by the one or more vote indication messages are equivalent to the common possibly selected proposed value, wherein a possibly selected proposed value was previously voted for by a device and was proposed by a client having a most dominant client identifier among all clients whose proposals were received by the device, and wherein further the third proposed value is proposed using the fault tolerant consensus method.

15. A computing device adapted to select a value in a distributed computing system using a fault tolerant consensus algorithm, the computing device comprising:
   a processing unit programmed to perform operations comprising:
      comparing at a computer device a first client identifier to a second client identifier if a second proposed value, proposed in a message receives from a second client and comprising the second client identifier and the second proposed value, was previously voted for in a first system step; and
      provisionally voting for a first proposed value in the first system step if the first client identifier is more dominant than the second client identifier and the second proposed value was previously voted for; and
   a network interface programmed perform operations comprising:
      receiving at the computing device from the first client a first message comprising the first proposed value and a first client identifier corresponding to the first client;
      transmitting from the computing device a first indication of the voting for the first proposed value to one or more devices also operating as part of the distributed computing system;
      transmitting from the computing device a first result of the voting for the first proposed value to the first client;
      wherein the voting for the first proposed value, the transmitting the first indication of the voting for the first proposed value, and the transmitting the first result are not performed if the second client identifier corresponding to the second client is more dominant than the first client identifier and the second proposed value has been previously voted for, and
   wherein the network interface is programmed to perform further operations comprising:
      receiving a message, wherein the message is part of the fault tolerant consensus method; and
   wherein the processing unit is programmed to perform further operations comprising:
      ignoring additional proposed values from the first client; and
      participating in a fault tolerant consensus method;
   wherein the participating in the fault tolerant consensus method comprises transmitting a possibly selected proposed value if a proposed value was previously voted for, wherein the possibly selected proposed value was previously voted for and was proposed by a client having a most dominant client identifier among all clients who proposed values to the computing device for a current system step.

16. The computing device of claim 15, wherein the first proposed value comprises a first function, and wherein the voting for the first proposed value comprises provisionally executing the first function in the first system step.

17. The computing device of claim 15, wherein the voting for the first proposed value comprises changing a previous vote for the second proposed value if the second proposed value was previously voted for and if the second client identifier is less dominant than the first client identifier.

18. The computing device of claim 17, wherein the second proposed value comprises a second proposed function, and wherein the changing the previous vote comprises undoing a previous execution of the second proposed function.

19. The computing device of claim 17, wherein the second proposed value comprises a second proposed function, and wherein the changing the previous vote comprises allowing a previous provisional execution of the second proposed function to expire.

20. The computing device of claim 15, wherein the first proposed value comprises a first function identified by a first function identifier, and wherein the voting for the first proposed value comprises executing the first function in the first system step unless the first function identifier is equivalent to a second function identifier that identifies a second function, wherein the second function was executed in a second system step that preceded the first system step.

21. The computing device of claim 15, wherein the first proposed value comprises a first idempotent function, and wherein the voting for the first proposed value comprises executing the first idempotent function in the first system step even if the first idempotent function is equivalent to a second idempotent function that was executed in a second system step that preceded the first system step.

22. The computing device of claim 15, wherein the processing unit performs further steps comprising:
   selecting, as a third proposed value, any value if one or more vote indication messages indicate that at least one device has not previously voted or if the one or more vote indication messages indicate two or more different possibly selected proposed values, or selecting, as the third proposed value, a common possibly selected proposed value if all possibly selected proposed values indicated by the one or more vote indication messages are equivalent to the common possibly selected proposed value, wherein a possibly selected proposed value was previously voted for by a device and was proposed by a client having a most dominant client identifier among all clients whose proposals were received by the device, and wherein further the third proposed value is proposed using the fault tolerant consensus method; and wherein the network interface performs further steps comprising: transmitting one or more polling messages to initiate the fault tolerant consensus algorithm; and receiving the one or more vote indication messages in response to the one or more polling messages.

23. The computing device of claim 15, wherein the operating as part of the distributed computing system comprises operating as a client of the distributed computing system.

24. The computing device of claim 15, wherein the distributed computing system is comprised of devices that are also clients of the distributed computing system.

25. A conflict tolerant message delay reducing consensus method for use in a computing environment comprising at least one dedicated client device and a distributed computing system implemented by one or more devices, the conflict tolerant message delay reducing consensus method comprising:

transmitting one or more proposed values from one or more clients, each of the one or more proposed values being transmitted in a message comprising one of the one or more proposed values and a client identifier corresponding to one of the one or more clients;

voting, at one or more of the one or more devices implementing the distributed computing system, for a proposed value from among the one or more proposed values, wherein the proposed value was proposed by a client having a most dominant client identifier from among the one or more clients proposing values;

transmitting to one or more of the one or more devices implementing the distributed computing system an indication of the vote for the proposed value; and transmitting, to the client having the highest client identifier, a result of the vote for the proposed value wherein the voting for the first proposed value, the transmitting the indication of the vote for the proposed value, and the transmitting the result are not performed if the proposed value was proposed by a client not having a most dominant client identifier from among the one or more clients proposing values, receiving a message, the message being part of a fault tolerant consensus algorithm;

ignoring additional proposed values from a first client; and participating in the fault tolerant consensus algorithm, wherein participating in the fault tolerant consensus algorithm comprises transmitting a possibly selected proposed value if a proposed value was previously voted for, and wherein the possibly selected proposed value was previously voted for and was proposed by a client having a most dominant client identifier among all clients whose proposals were received and who proposed values for a current system step.

26. The conflict tolerant message delay reducing consensus method of claim 25, wherein the one or more devices implementing the distributed computing system also act as clients of the distributed computing system.

27. The conflict tolerant message delay reducing consensus method of claim 25, wherein the dedicated client device is identified by a least dominant client identifier.

28. The conflict tolerant message delay reducing consensus method of claim 25 further comprising: determining that the distributed computing system has selected the proposed value when each of the one or more devices implementing the distributed computing system has voted for the proposed value.

29. The conflict tolerant message delay reducing consensus method of claim 25, wherein the proposed value comprises a function, and wherein the voting for the proposed value comprises provisionally executing the function in a system step.

30. The conflict tolerant message delay reducing consensus method of claim 25, wherein the voting for the proposed value comprises changing a previous vote if the previous vote was for a previously proposed value, proposed by a previous client having a client identifier that is less dominant than the client proposing the proposed value.

31. The conflict tolerant message delay reducing consensus method of claim 25 further comprising: ending the conflict tolerant message delay reducing consensus method and commencing a fault tolerant consensus method if a failure is detected.

32. The conflict tolerant message delay reducing consensus method of claim 31, wherein the failure is detected by a monitoring device, and wherein the computing environment further comprises the monitoring device.

33. The conflict tolerant message delay reducing consensus method of claim 31, wherein the commencing the fault tolerant consensus method comprises identifying a possibly selected proposed value, wherein the possibly selected proposed value is any value if at least one of the one or more devices implementing the distributed computing system did not previously vote or, if at least one of the one or more devices implementing the distributed computing system previously voted, then the possibly selected proposed value was previously voted for by at least one of the one or more devices implementing the distributed computing system and was proposed by the client having the most dominant client identifier from among the one or more clients proposing values, for a current system step, to the at least one of the one or more devices implementing the distributed computing system.

* * * * *

UNITED STATES PATENT AND TRADEMARK OFFICE
CERTIFICATE OF CORRECTION

PATENT NO. : 8,005,888 B2
APPLICATION NO. : 10/750601
DATED : August 23, 2011
INVENTOR(S) : Leslie B. Lamport It is certified that error appears in the above-identified patent and that said Letters Patent is hereby corrected as shown below:

In column 33, line 59, in Claim 15, after "programmed" insert -- to --.

Signed and Sealed this
Eighteenth Day of October, 2011

David J. Kappos
*Director of the United States Patent and Trademark Office*